(12) United States Patent
Beshai

(10) Patent No.: US 7,317,726 B2
(45) Date of Patent: Jan. 8, 2008

(54) SCHEDULING IN A FAST OPTICAL SWITCH

(75) Inventor: Maged E. Beshai, Stittsville (CA)

(73) Assignee: Nortel Networks Limited (CA)

( * ) Notice: Subject to any disclaimer, the term of this patent is extended or adjusted under 35 U.S.C. 154(b) by 917 days.

(21) Appl. No.: 10/410,169

(22) Filed: Apr. 10, 2003

(65) Prior Publication Data

US 2003/0193955 A1 Oct. 16, 2003

Related U.S. Application Data

(60) Provisional application No. 60/371,758, filed on Apr. 11, 2002.

(51) Int. Cl.
*H04J 3/16* (2006.01)

(52) U.S. Cl. .................... 370/395.4; 370/458; 370/498

(58) Field of Classification Search ........... 370/395.41, 370/498, 229–232, 235, 357, 360, 363–365, 370/369–373, 375–376, 412–419, 422, 428, 370/429, 395.4, 458, 397; 718/104
See application file for complete search history.

(56) References Cited

U.S. PATENT DOCUMENTS

| | | | |
|---|---|---|---|
| 5,889,600 A | 3/1999 | McGuire | |
| 6,034,960 A * | 3/2000 | Beshai et al. | 370/395.4 |
| 6,154,583 A | 11/2000 | Kuroyanagi et al. | |
| 6,335,992 B1 | 1/2002 | Bala et al. | |
| 6,477,144 B1 * | 11/2002 | Morris et al. | 370/230.1 |
| 6,570,872 B1 | 5/2003 | Beshai et al. | |
| 6,778,536 B1 * | 8/2004 | Ofek et al. | 370/395.4 |
| 6,934,295 B2 * | 8/2005 | Ikematsu | 370/416 |
| 6,977,935 B2 * | 12/2005 | Kamiya et al. | 370/395.4 |
| 7,046,661 B2 * | 5/2006 | Oki et al. | 370/388 |
| 7,058,063 B1 * | 6/2006 | Cavendish | 370/395.41 |
| 7,161,943 B2 * | 1/2007 | Kamiya et al. | 370/395.4 |
| 7,167,485 B2 * | 1/2007 | Hrabik et al. | 370/461 |
| 7,190,900 B1 * | 3/2007 | Best et al. | 398/54 |
| 2003/0021266 A1 * | 1/2003 | Oki et al. | 370/388 |
| 2003/0112750 A1 * | 6/2003 | Hrabik et al. | 370/229 |

OTHER PUBLICATIONS

U.S. Appl. No. 10/054,509, filed Nov. 13, 2001, Beshai et al.

* cited by examiner

*Primary Examiner*—Doris H. To
*Assistant Examiner*—Habte Mered
(74) *Attorney, Agent, or Firm*—M$^c$Guinness & Manaras LLP

(57) ABSTRACT

In a fast optical switch comprising a plurality of star couplers, channel switching, Time Division Multiplex (TDM) switching, or both may be provided. The operation of the fast optical switch is enabled by a fast scheduler comprising at least two scheduler modules. The throughput of the optical switch may be increased through a process of bimodal pipelined connection-packing.

25 Claims, 42 Drawing Sheets

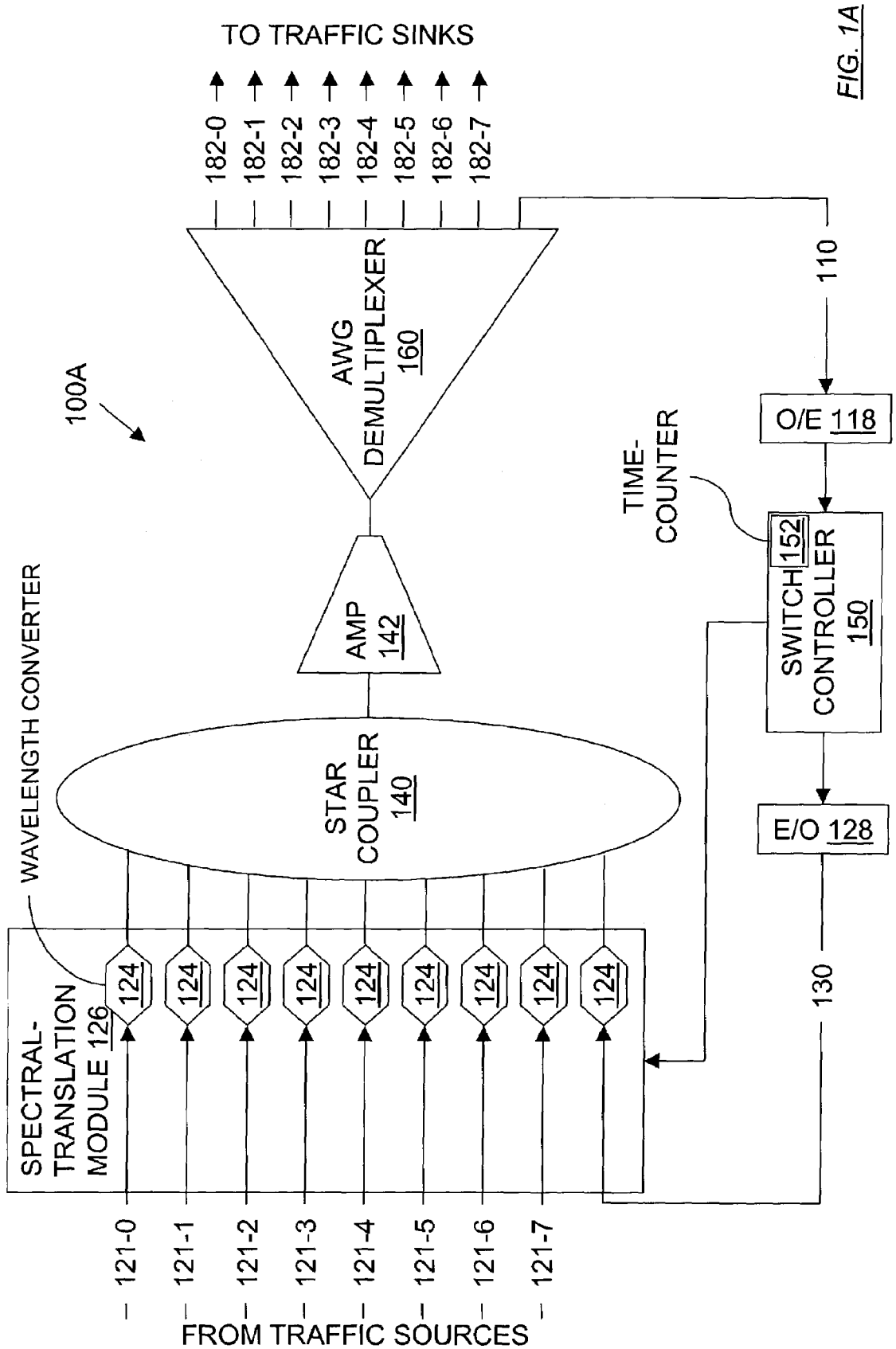

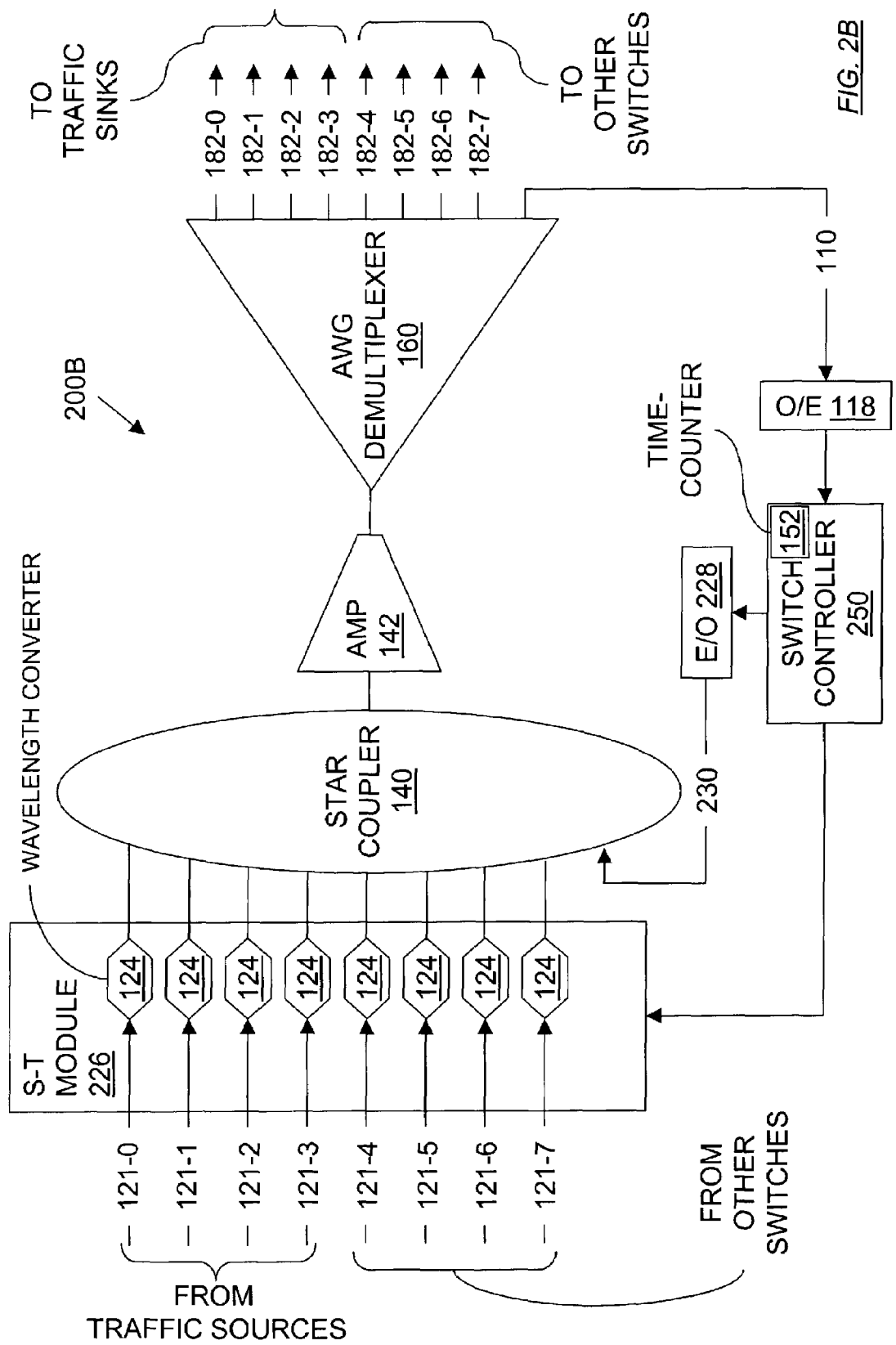

FIG. 13

CONNECTION-REQUEST MATRIX: CHANNEL-SWITCHING NODE

1300

OUTPUT WDM LINK INDEX

| | 0 | 1 | 2 | 3 | 4 | 5 | 6 | 7 |
|---|---|---|---|---|---|---|---|---|
| 0 |   | 2 |   |   |   |   |   |   |
| 1 |   |   |   | 1 | 2 | 2 | 2 | 2 |
| 2 | 3 |   | 2 | 2 | 1 | 2 | 2 |   |
| 3 |   |   | 2 | 4 | 5 |   | 3 |   |
| 4 | 3 | 3 | 2 | 1 |   |   |   | 1 |
| 5 | 1 | 1 | 2 |   |   |   | 1 | 1 |
| 6 | 1 | 1 | 2 |   |   | 4 |   | 1 |
| 7 |   |   |   |   |   |   |   | 4 |

INPUT WDM LINK INDEX

CONNECTION-REQUEST MATRIX:
TDM-SWITCHING NODE

OUTPUT WDM LINK INDEX

| | 0 | 1 | 2 | 3 | 4 | 5 | 6 | 7 |
|---|---|---|---|---|---|---|---|---|
| 0 | | 256 | | | | | | |
| 1 | | | | | 256 | 212 | 246 | |
| 2 | 370 | | 242 | 108 | 105 | 250 | 228 | 214 |
| 3 | | 109 | | 254 | | | 378 | |
| 4 | | | 212 | 507 | 615 | | | |
| 5 | 371 | 337 | | 107 | | | 118 | 107 |
| 6 | 113 | 28 | 193 | | | 482 | | 19 |
| 7 | 128 | 120 | 256 | | | | | 460 |

INPUT WDM LINK INDEX

FIG. 14

WAVELENGTH ASSIGNMENT MATRIX

| Output WDM Link Index \ Star Coupler Index | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 0 | 1 | 2 | 3 | 4 | 5 | 6 | 7 |
| 2 | 7 | 0 | 1 | 2 | 3 | 4 | 5 | 6 |
| 3 | 6 | 7 | 0 | 1 | 2 | 3 | 4 | 5 |
| 4 | 5 | 6 | 7 | 0 | 1 | 2 | 3 | 4 |
| 5 | 4 | 5 | 6 | 7 | 0 | 1 | 2 | 3 |
| 6 | 3 | 4 | 5 | 6 | 7 | 0 | 1 | 2 |
| 7 | 2 | 3 | 4 | 5 | 6 | 7 | 0 | 1 |
|   | 1 | 2 | 3 | 4 | 5 | 6 | 7 | 0 |

$\Lambda(m, k)$

FIG. 16

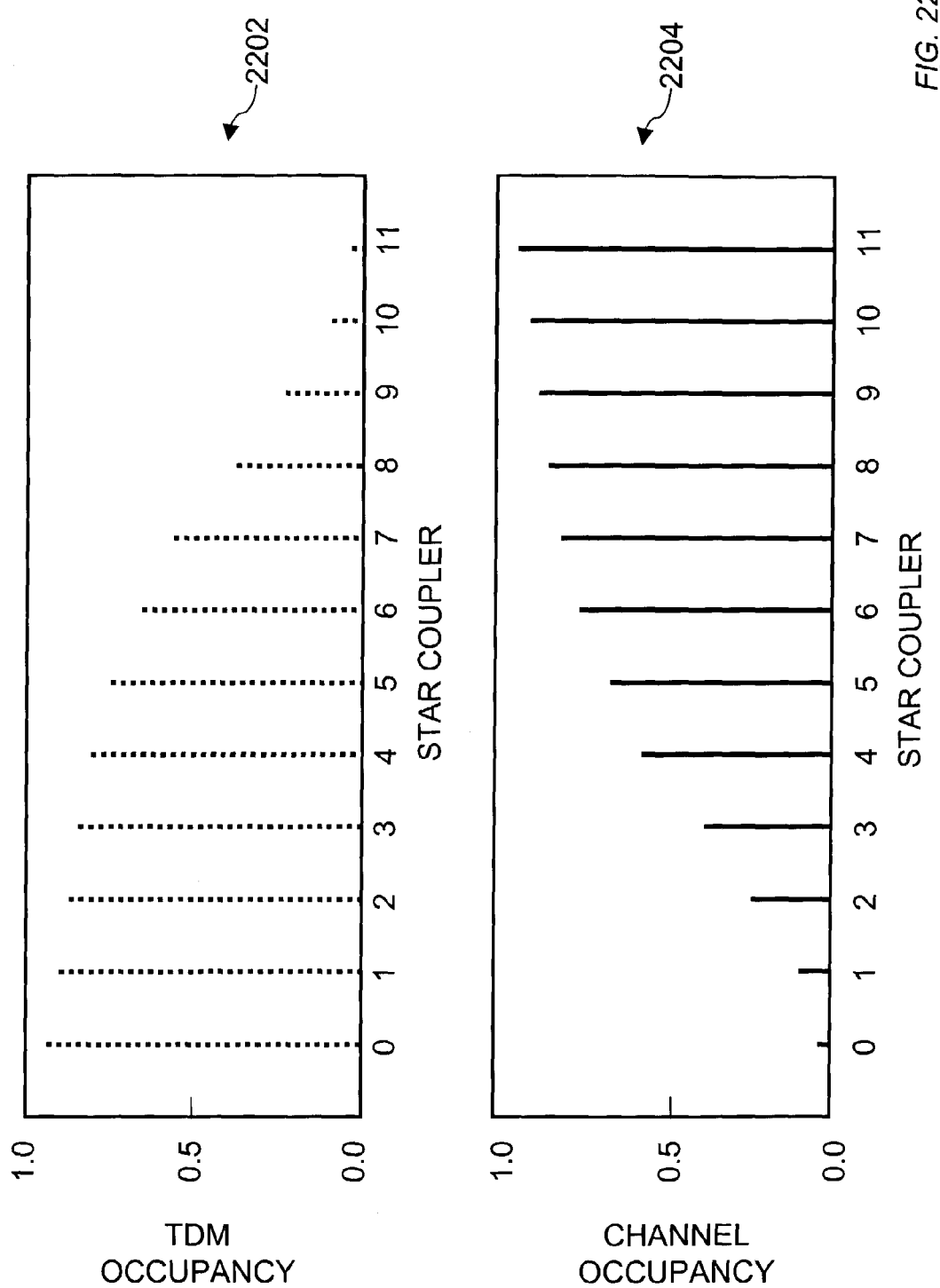

SCHEDULING IN A FAST OPTICAL SWITCH

CROSS-REFERENCE TO RELATED APPLICATIONS

This application claims priority to provisional application 60/371,758, which was filed Apr. 11, 2002.

FIELD OF THE INVENTION

The present invention relates to optical switching and, specifically, to scheduling in a fast optical switch.

BACKGROUND

Fast-switching, high-capacity, optical switches are needed to realize an agile optical-core network. That is, an optical-core network that may adjust swiftly to changes in desired connectivity between edge nodes. Switching latency in a given optical node may preclude the use of the given optical node for time-sharing schemes such as Time Division Multiplexing (TDM) switching or burst switching. In the absence of such time-sharing schemes, the given optical node becomes a channel-switching cross-connector and a network based on such an optical node may be forced to perform multiple edge-to-edge hops to inter-connect particular edge nodes. This performing of multiple hops can significantly increase the complexity of, and degrade the performance of, a network.

In a channel-switching scheme, an optical switch may be arranged to switch an input channel to an output channel. The input channel may be defined by an input link in which the input channel is received as well as the wavelength that is modulated to carry the information transmitted on the input channel. Similarly, the output channel may be defined by an output link in which the output channel is transmitted as well as the wavelength that is modulated to carry the information transmitted on the output channel.

In a TDM-switching scheme, the information arriving on a given input channel may be destined for a number of different output channels. A TDM frame of a predetermined duration is defined to be divided into a number of equal duration time slots. An edge node continually sends TDM frames to an optical switch arranged to perform TDM-switching. In each time slot of an input channel may be information destined for a different output channel. The optical switch must be arranged to switch the input channel to the appropriate output channel for each time slot. Furthermore, a mechanism must be in place by which the optical switch can anticipate exactly when to expect the beginning of each TDM frame to arrive from an edge node.

McGuire (U.S. Pat. No. 5,889,600, issued Mar. 30, 1999) discloses a modular switch operated in a channel switching mode comprising a plurality of star couplers, connecting to a plurality of input Wavelength Division Multiplexed (WDM) links and a plurality of output WDM links. Each WDM link comprises a number of wavelength channels equal to the number of star couplers. Each input WDM link is demultiplexed into the constituent wavelength channels and each of the constituent wavelength channels connects to an input port of one of the star couplers. Wavelength converters are provided at the output ports of the star couplers. Each output WDM link carries an optical signal that is made up of wavelength channels received from an output port of each star coupler multiplexed together. The modular switch allows a wavelength channel from any input port to connect to any wavelength channel in a subset of the output ports of the star couplers. For example, using 32×32 star couplers, 32 WDM input links and 32 WDM output links, each input link and each output link carrying 32 wavelength channels, a specific wavelength channel in an input link can be switched to any one of a subset of 32 output ports of the 1,024 output ports of the 32 star couplers.

Multi-stage, optical switch structures that switch channels are known. For example, Kuroyanagi (U.S. Pat. No. 6,154,583, issued Nov. 28, 2000) describes an optical switch configured as a multi-stage circuit, with each of the stages including a plurality of space switches. An arrangement of optical amplifiers is also described. Such structures, however, are limited to channel switching granularity, which may be considered too coarse for future applications.

Bala et al. (U.S. Pat. No. 6,335,992, issued Jan. 1, 2002) describe a scalable, multi-stage, optical cross-connect. The multi-stage optical cross connect comprises a plurality of first stage switch matrices, a plurality of middle stage switch matrices, and a plurality of last stage switch matrices. Each of the first stage switch matrices has a number of input ports, each input port receiving an input communication signal, and a larger number of output ports, where the first stage switch matrices switch the input communication signals to selected output ports. The input ports of the middle stage switch matrices are coupled to the output ports of the first stage switch matrices for receiving communication signals output from the first stage switch matrices. The middle stage switch matrices switch communications signals received at their input ports to their output ports. The input ports of the last stage switch matrices are coupled to the output ports of the middle stage switch matrices for receiving communication signals output from the middle stage switch matrices. The last stage switch matrices switch communications signals received at their input ports to their output ports. In addition, the middle stage itself can be recursively a multi-stage switch.

Neither of the above approaches suggests the use of a time-sharing scheme, such as TDM, in a bufferless modular switching node. A node structure that permits scalability and can employ time-sharing techniques is required, and methods of circumventing the difficulty of scheduling signal transfer are needed to enable the realization of such nodes and, ultimately, the realization of an efficient agile network that scales to capacities of the order of several petabits/second.

SUMMARY

A fast optical switch may be constructed of some wavelength converters, a star coupler, an Arrayed Waveguide Grating (AWG) device used as a wavelength demultiplexer and may include at least one optical amplifier. The switching latency is decided by the speed of the wavelength converters. Further, a high-capacity switching node can be constructed using several such switches. The optical switch, and, it follows, the switching node, can be used for wavelength-channel switching, TDM switching or mixed channel-TDM switching. Methods and apparatus for scheduling both channel-switched and TDM-switched connections are disclosed.

In its simplest form, the optical switch interconnects a number of input wavelength channels to a number of output wavelength channels through a star coupler, where the star coupler has a plurality of input ports and a single output port. The output port of the star coupler transmits a star coupler output signal that is a combination of all optical signals received at its input ports. The star coupler output signal may then be amplified and presented to an AWG demultiplexer.

Where the optical switch is adapted to channel switching, a switch controller may receive connectivity-change requests and other control signals from an edge node through a dedicated upstream signaling channel. The switch controller may send control signals to an edge node through a dedicated downstream signaling channel. Where the optical switch is adapted to TDM switching, a switch controller may exchange connectivity-change requests, together with other control signals, with edge nodes in designated time slots in the TDM frame.

The switch controller may control the admission of new connections with a high-speed scheduler, which allocates wavelength channels and/or time slots in a TDM frame.

In an expanded structure, a switching node may be constructed from a set of star coupler-based switches. This structure necessitates that each input WDM link, which provides the input wavelength channels, carry only input wavelength channels originating from a single edge node and that each output WDM link only carry output wavelength channels destined to a single edge node.

A mesh switching network may be constructed of switch nodes, where each switch node has the expanded structure discussed hereinbefore. The mesh switching network relaxes the restriction that input and output WDM links originate and terminate at single edge nodes. Indeed, the mesh switching network allows any channel in an input WDM link to connect to any channel in an output WDM link during any time slot.

According to an aspect of the present invention, there is provided a method of bimodal pipelined scheduling in a scheduling system, the scheduling system including at least two scheduler modules arranged in a predetermined order between a first scheduler module and a last scheduler module. The method includes receiving a first scheduling request specifying a first amount of resources, at a selected scheduler module, starting with the first scheduler module, attempting to allocate resources to satisfy the first scheduling request and, where the attempting at the selected scheduler module fails to completely satisfy the first scheduling request, selecting a subsequent scheduler module according to the predetermined order. The method also includes receiving a second scheduling request specifying a second amount of resources, at an other selected scheduler module, starting with the last scheduler module, attempting to allocate resources to satisfy the second scheduling request and, where the attempting, at the other scheduler module, fails to completely satisfy the second scheduling request, selecting a preceding scheduler module according to the predetermined order.

According to another aspect of the present invention, there is provided a pipelined scheduling system. The system includes at least two scheduler modules arranged in a predetermined order between a first scheduler module and a last scheduler module and a pool of resources exclusively associated with each of the scheduler modules. The system is operable to: receive scheduling requests of a first type, each specifying a first amount of resources, attempt, at the scheduler modules selected in the predetermined order, to allocate resources, from the associated pool of resources, to satisfy the scheduling requests of the first type, receive scheduling requests of a second type, each specifying a second amount of resources and attempt, at the scheduler modules selected in a reverse order of the predetermined order, to allocate resources, from the associated pool of resources, to satisfy the scheduling requests of the second type.

According to a further aspect of the present invention, there is provided a method of scheduling connections in an optical switching node, the optical switching node including a plurality of star couplers. The method includes receiving a connection request, the connection request specifying connection parameters, selecting, based on the connection parameters, an output link of the optical switching node, selecting a candidate star coupler from the plurality of star couplers and attempting to find an available path through the candidate star coupler to an output wavelength channel in the selected output link.

According to a still further aspect of the present invention, there is provided a method of scheduling connections in an optical switching node, the optical switching node including a plurality of star couplers. The method includes receiving a connection request and determining, from the connection request, an input link from among a plurality of input links, an output link from among a plurality of output links, a required number of continuous channels to be switched and a required number of time slots to be switched. Where the required number of continuous channels is greater than zero, the method includes selecting a star coupler, from the plurality of star couplers, to be a channel-switching candidate star coupler, attempting to find a number of allocable channels, not exceeding the required number of continuous channels, to the output link through the channel-switching candidate star coupler and repeating the selecting the channel-switching candidate star coupler and the attempting to find a number of allocable channels, where the selecting the channel-switching candidate star coupler is performed according to a first predetermined order. Where a number of found allocable channels equals the required number of continuous channels, and the required number of time slots exceeds zero, the method includes selecting a star coupler, from the plurality of star couplers, to be a time-slot-switching candidate star coupler, attempting to find a number of allocable time slots, not exceeding the required number of time slots, to the output link through the time-slot-switching candidate star coupler and repeating the selecting the time-slot-switching candidate star coupler and the attempting to find a number of allocable time slots, where the selecting the time-slot-switching candidate star coupler is performed according to a second predetermined order.

According to still another aspect of the present invention, there is provided a method of bimodal pipelined scheduling in a scheduling system, the scheduling system including at least two scheduler modules arranged in a predetermined order between a first scheduler module and a last scheduler module. The method includes receiving a first scheduling request specifying a first amount of resources and, at the first scheduler module, determining a first part of a first subset of allocable resources for satisfying the first scheduling request and passing a first internal scheduling request, specifying an amount of resources equivalent to the first amount of resources reduced by the amount of resources in the first subset of allocable resources, to a subsequent scheduler module, the subsequent scheduler module selected according to the predetermined order. The method also includes receiving a second scheduling request specifying a second amount of resources and, at the last scheduler module, determining a first part of a second subset of allocable resources for satisfying the second scheduling request; and passing a second internal scheduling request, specifying an amount of resources equivalent to the second amount of resources reduced by the amount of resources in the second subset of allocable resources, to a preceding scheduler module, the preceding scheduler module selected according to the predetermined order.

According to still another aspect of the present invention, there is provided a pipelined scheduling system including at least two scheduler modules arranged in a predetermined order between a first scheduler module and a last scheduler module. The first scheduler module is operable to: receive a first scheduling request specifying a first amount of resources; determine a first part of a first subset of allocable resources for satisfying the first scheduling request; and pass a first internal scheduling request, specifying an amount of resources equivalent to the first amount of resources reduced by the amount of resources in the first subset of allocable resources, to a subsequent scheduler module, the subsequent scheduler module selected according to the predetermined order. The last scheduler module is operable to: receive a second scheduling request specifying a second amount of resources; determine a first part of a second subset of allocable resources for satisfying the second scheduling request; and pass a second internal scheduling request, specifying an amount of resources equivalent to the second amount of resources reduced by the amount of resources in the second subset of allocable resources, to a preceding scheduler module, the preceding scheduler module selected according to the predetermined order.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 1A illustrates an arrangement of a single-stage optical switch using a star coupler according to an embodiment of the present invention;

FIG. 2B illustrates the arrangement of the single-stage optical switch of FIG. 2A wherein various traffic sources are identified according to an embodiment of the present invention;

FIG. 13 illustrates a wavelength-channel-based connection-request matrix received at a controller of a switching node of the type of the switching node of FIG. 10, for use in an embodiment of the present invention;

FIG. 14 illustrates time-slot-based connection-request matrix received at a controller of a switching node of the type of the switching node of FIG. 10, for use in an embodiment of the present invention;

FIG. 16 is a matrix representation of the wavelength assignment of FIG. 15;

FIG. 22 illustrates unimodal occupancy histograms of exemplary star couplers in exemplary unimodal optical switching nodes;

DETAILED DESCRIPTION

Figure 1B:
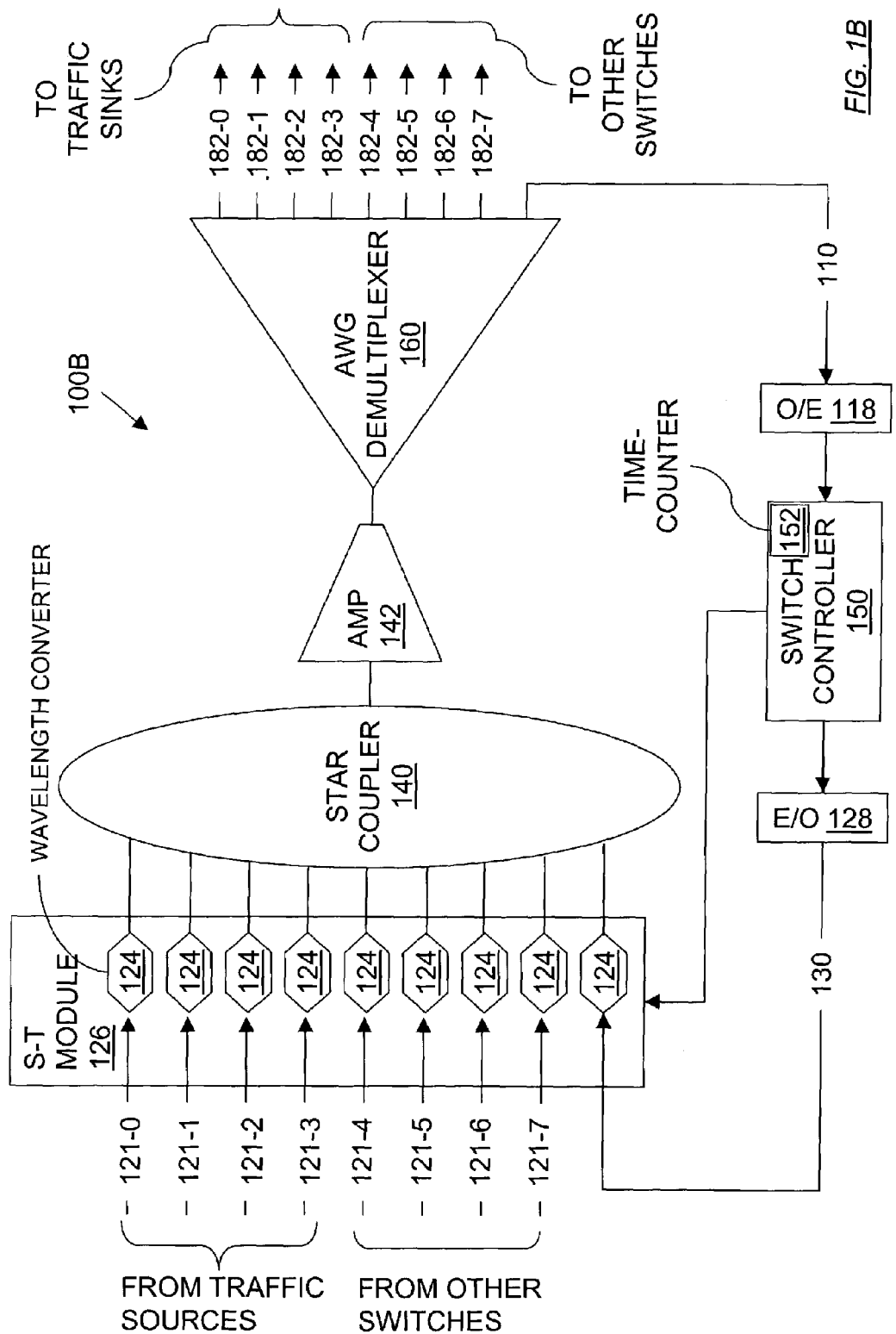
FIG. 1B illustrates the arrangement of the single-stage optical switch of FIG. 1A wherein various traffic sources are identified according to an embodiment of the present invention.

Before describing embodiments of the present invention, a description of the concept and realization of time locking is provided.

A first node X is said to be time-locked to a second node Y along a given path if, at any instant of time, the reading of a time counter at node X equals the sum of a reading of an identical time counter at node Y and the propagation time, normalized to the time-counter period, along the given path from node X to node Y. The time counters at nodes X and Y have the same period. There may be several paths connecting the first node to the second node, and the paths may be defined by individual wavelengths in a fiber link or several fiber links. Due to the difference in propagation delays of different paths connecting the same node pair, time-locking must be realized for the different paths individually. Due to dispersion, time-locking of individual wavelength channels within the same WDM link may be required. When a first node is time-locked to a second node along a given path, the given path is said to be time-locked.

It is noted that the methods and apparatus of the present invention apply to both channel switching and TDM switching.

The time-locking process in a time-shared network is described with the help of a two-node model. To realize time-locking of a first node to a second node in a network, the first node is provided with a first controller that includes a first time counter and the second node is provided with a slave controller and a master controller that includes a master time counter. The second node has several input ports and output ports and the master controller is connected to one of the input ports and one of the output ports. The first controller sends an upstream control signal to an input port of said second node during a designated time interval, the upstream control signal including a reading of the first time counter. The upstream control signal is sent in-band, together with payload data destined to output ports of the second node. The slave controller must be able to direct the upstream control signal to the master controller during a pre-scheduled time interval. The master controller has a device for acquiring and parsing upstream control signals. The master controller compares the reading of the first time counter with a reading of the master time counter. An agreement of the two readings, or a negligible discrepancy, ascertains time alignment. The second controller reports reading discrepancies to the first controller which resets its time counter accordingly.

Time-locking an edge node to a reference node is realized by time-locking a time counter at the edge node to a time counter at the reference node. A time counter can be a conventional clock-driven counter. A time counter at an edge node is preferably an up-counter and a time-counter at a reference node is preferably a down counter, the two counters have the same cycle duration. Using a 28-bit time counter, for example, driven by a clock of a clock period of 20 nanoseconds, the duration of the time-counter cycle would be about 5.37 seconds ($2^{28}$ times 20 nanoseconds). The reading of an up-counter at an edge node increases, with each clock trigger, from 0 to 268,435,455 (0 to $2^{28}-1$) and the reading of a time counter at a reference node decreases, with each clock trigger, from 268, 435, 455 to 0. If the edge-node controller sends a timing message, when its reading is $K_1$, to a reference node, and the reading of the down-counter of the reference node at the instant of receiving the timing message is $K_2$, then the edge-node controller must reset its up-counter to zero when the up-counter reading reaches $[K_2+K_1]$ modulo $2^B$, B being the wordlength of the time counter (B=28 in the above example). If $K_2+K_1=2^B-1$, the edge node is already time-locked to the reference node.

Thus, within a network, all time counters have the same period and time-coordination can be realized through an exchange of time-counter readings between each source node and a reference node to which the source node is connected. In a TDM (time-division multiplexing) switching network, the time-counter readings may be carried in-band, alongside payload data destined to sink nodes, and sending each time-counter reading must be timed to arrive at a corresponding reference node during a designated time interval.

FIG. 1A illustrates a single-stage optical switch 100A including a star coupler 140 having a plurality of input ports and a single output port. Optical switch 100A receives optical signals through input wavelength channels 121-0 to 121-7 (referenced individually or collectively as 121). One of the input ports may be used for receiving control signals, but may otherwise be identical to the other input ports. Each of the input ports receives an input wavelength channel 121 from an external source. The star coupler output signal transmitted at the single output port of the star coupler 140 includes optical signals from all the input wavelength channels 121-0 to 121-7.

The star coupler output signal is amplified by an amplifier 142 to compensate for an inherent power loss in the star coupler 140. An Arrayed Waveguide Grating (AWG) demultiplexer 160 is then used to demultiplex the amplified star coupler output signal into constituent wavelength channels 182-0 to 182-7 (referenced individually or collectively as 182). Wavelength channels 182 are the output wavelength channels of the switch. Hereinafter, the terms 'constituent wavelength' and 'output wavelength' are used interchangeably. All but one of the output ports of the AWG demultiplexer 160 transmit the constituent wavelength channels 182 to external traffic sinks or edge nodes. The remaining output port of the AWG demultiplexer 160 transmits one of the constituent wavelength channels 182 as an input control channel to a switch controller 150 via an input control channel 110 and an optical-to-electrical (O/E) converter 118. The switch controller 150 includes a time counter 152 for use in time-locking as discussed hereinbefore.

Wavelength conversion of the input wavelength channel may be required prior to reception at an input port of the star coupler 140. A wavelength converter 124 is therefore provided associated with each input port. A given wavelength converter 124 shifts a wavelength band of an incoming channel to another wavelength band under control of the switch controller 150. Multiple wavelength converters 124 are packaged together in a spectral-translation module (S-T module) 126.

An optical input control signal channel is received over the input control channel 110 by the switch controller 150. The optical input control signal channel carries control information that is received, as an electrical input control signal, at a control input port after optical-to-electrical conversion at an optical-to-electrical converter 118. The switch controller 150 transmits an electrical output control signal from a control output port.

The electrical output control signal is converted from electrical to optical at an electrical-to-optical converter 128 and is transmitted, as an optical output control signal channel, to a wavelength converter 124 via an output control link 130 for wavelength conversion before being received by a control input port of the star coupler 140. After amplification, by the amplifier 142, as part of the star coupler output signal, the optical output control signal channel is directed by the AWG demultiplexer 160 to a particular edge node or an external traffic sink.

FIG. 1B illustrates the arrangement of the single-stage optical switch 100A of FIG. 1A wherein some input ports receive optical signals directly from traffic sources through input wavelength channels 121-0 to 121-3, other input ports receive optical signals from other switches through input wavelength channels 121-4 to 121-7, some output ports directly transmit optical signals to traffic sinks through wavelength channels 182-0 to 182-3, and other output ports transmit optical signals to other switches through wavelength channels 182-4 to 182-7. The optical switch of FIG. 1B is referenced as 100B. Where a distinction between the optical switch 100A of FIG. 1A and the optical switch 100B of FIG. 1B is not required, either is referenced as 100.

Figure 2A:
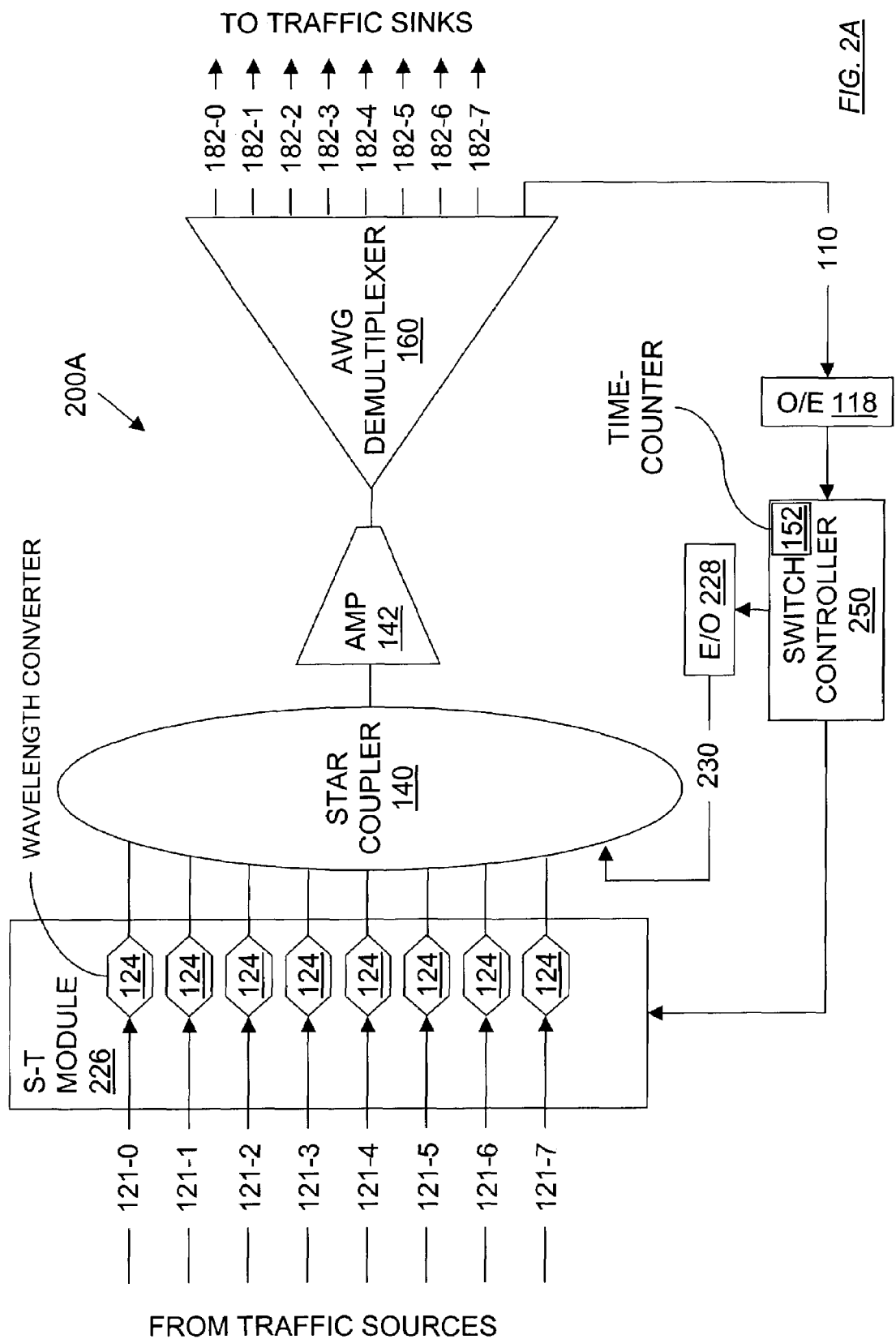
FIG. 2A illustrates an alternative arrangement of the single-stage optical switch of FIG. 1A according to an embodiment of the present invention.

An alternative single-stage optical switch 200A to the single-stage optical switch 100A of FIG. 1A is illustrated in FIG. 2A. In FIG. 2A, a switch controller 250, similar to the switch controller 150 of FIG. 1A, communicates with the control input port of the star coupler 140 directly rather than via a wavelength converter in the spectral-translation module 126. Consequently, a spectral-translation module 226 with one fewer wavelength converter is used. Additionally, an electrical-to-optical converter 228 includes tunable-laser capabilities and connects to the control input port of the star coupler 140 over an output control link 230. A control signal carried over control link 230 is tuned to steer the control signal to a given output wavelength channel.

FIG. 2B illustrates a single-stage optical switch 200B identical to the single-stage optical switch 200A of FIG. 2A wherein various traffic sources are identified. In particular, the input wavelength channels may be divided into inlet wavelength channels 121-0 to 121-3 and inbound wavelength channels 121-4 to 121-7. The input wavelength channels may be distinguished in that the inlet wavelength channels originate at traffic sources (edge nodes) directly subtending to the optical switch and the inbound wavelength channels originate at other, similar, optical switches. Likewise, the output wavelength channels 182 may be divided into outlet wavelength channels 182-0 to 182-3 transmitted to traffic sinks (edge nodes) directly subtending to the single-stage optical switch 200B and outbound wavelength channels 183-4 to 182-7 transmitted to other optical switches. Where a distinction between the optical switch 200A of FIG. 2A and the optical switch 200B of FIG. 2B is not required, either is referenced as 200.

Figure 3A:
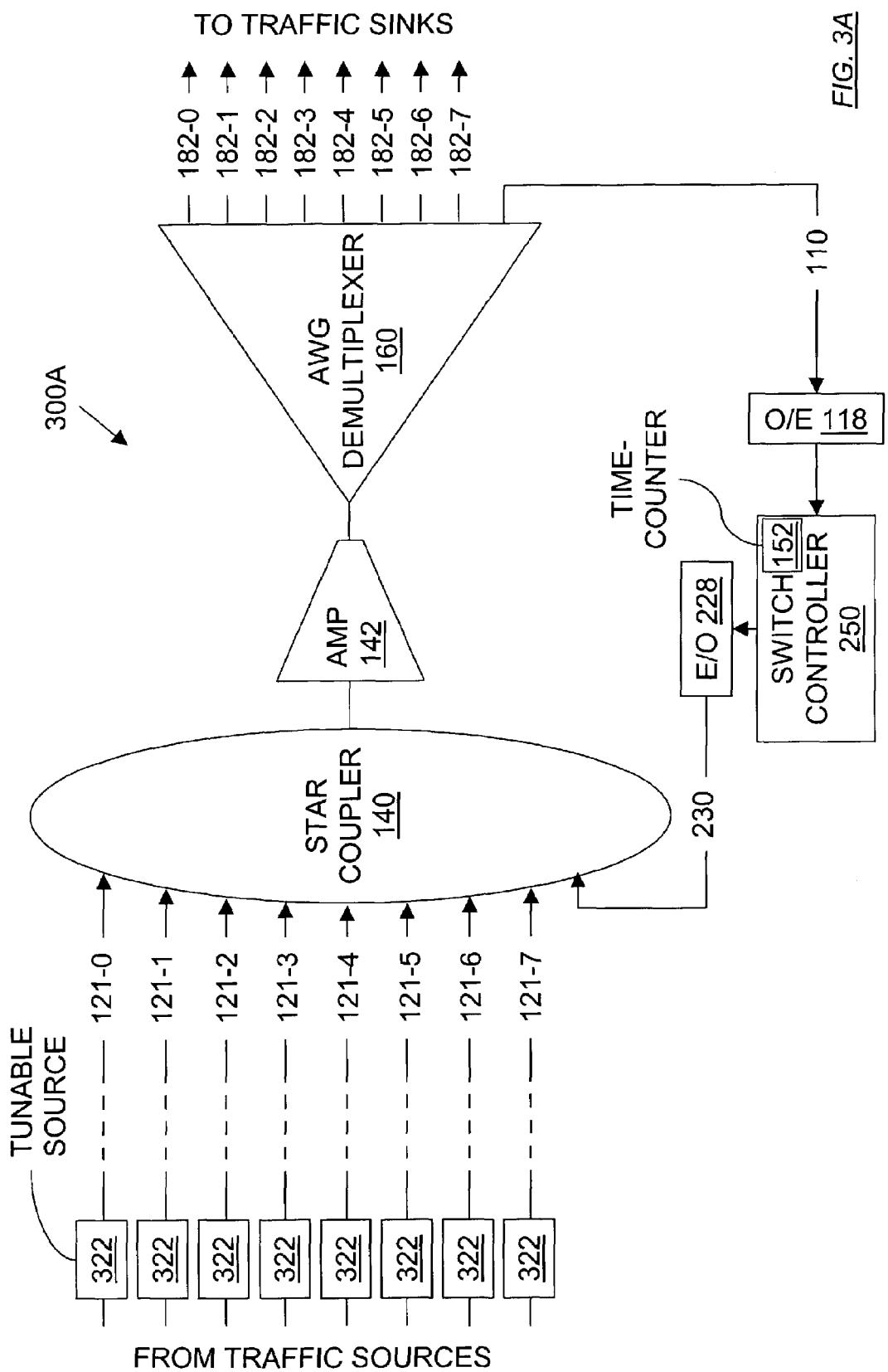
FIG. 3A illustrates a further alternative arrangement of the single-stage optical switch of FIG. 1A including remote tunable sources according to an embodiment of the present invention.

In a single-stage optical switch 300A illustrated in FIG. 3A, the wavelength tuning of the input to the star coupler 140 happens not locally, at the switch 300, but remotely, at the traffic sources 322, which are tunable. A tunable source may, for instance include a tunable laser.

Figure 3B:
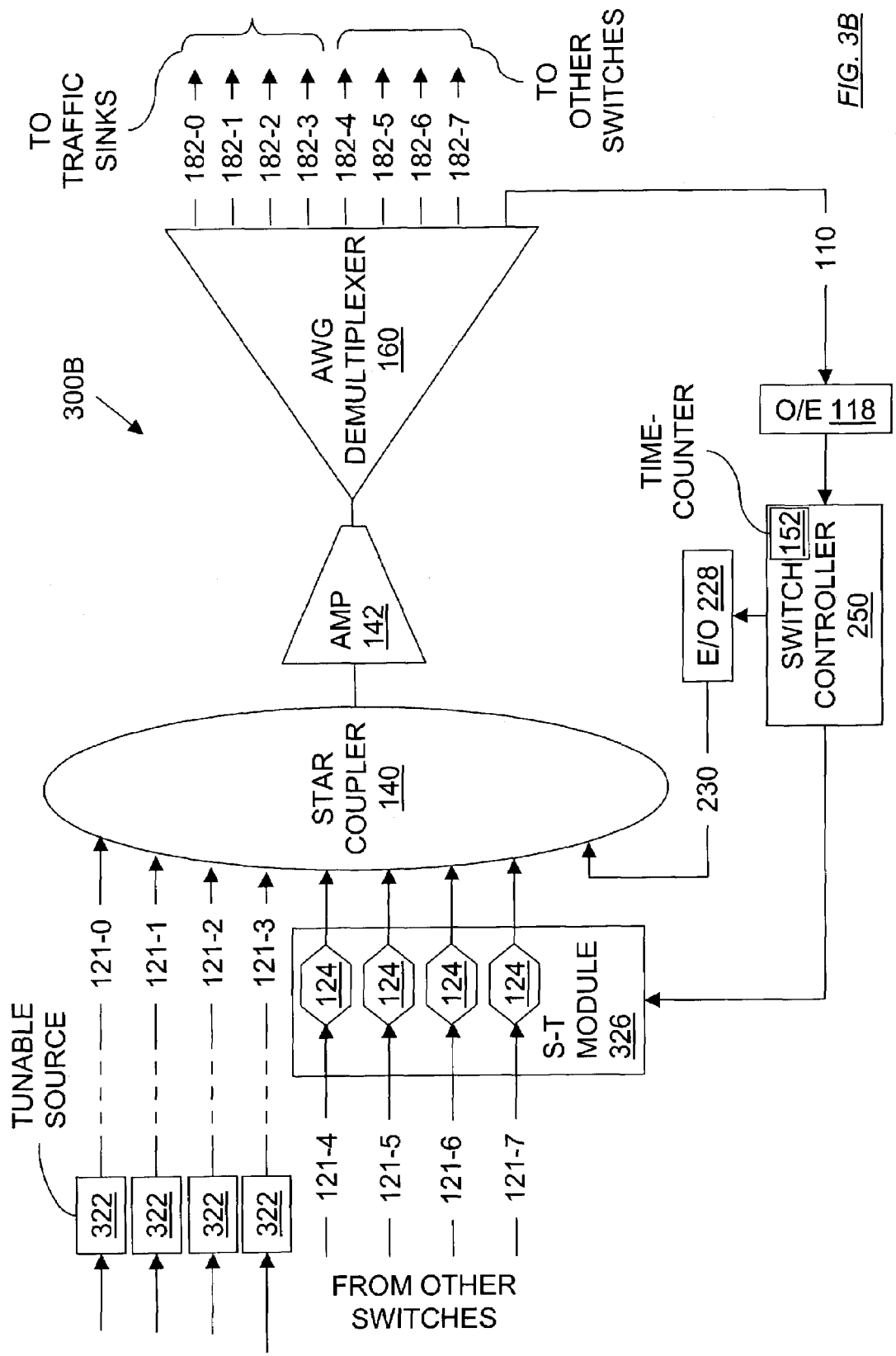
FIG. 3B illustrates a further alternative arrangement of the single-stage optical switch of FIG. 1A, according to an embodiment of the present invention, wherein the elements of the alternatives illustrated in FIGS. 2B and 3A are incorporated.

FIG. 3B illustrates a single-stage optical switch 300B wherein the elements of the alternatives illustrated in FIGS. 2B and 3A are incorporated. As such, the traffic sources are the tunable sources 322 of FIG. 3A. However, the other switches do not have the wavelength tuning capabilities that the traffic sources have and the single-stage optical switch 300B illustrated in FIG. 3B must rely on a spectral-translation module 326 with wavelength converters 124 to appropriately perform wavelength conversion on inbound wavelength channels.

In operation, the AWG demultiplexer 160 of the single-stage optical switch 100A of FIG. 1A distinguishes the constituent wavelength channels 182 by wavelength band. Thus, the internal wavelength channel at the output of an associated wavelength converter 124 determines the destination of the information signal modulating that wavelength. Note that the wavelength channel at the output of the tunable source 322 in FIGS. 3A and 3B also determines the destination of the associated information signal. The wavelength converter 124 receives control signals from the spectral-translation module 126, which, in turn receives control signals from the switch controller 150.

A first edge node may be preset to transmit an input wavelength channel to the optical switch 100 in a particular transmission wavelength band. The first edge node may also be preset to receive a constituent wavelength channel 182 from the optical switch 100 in a particular reception wavelength band. Similarly, the switch controller 150 may have an associated control reception wavelength band.

To indicate to the first edge node a time at which the first edge node may send control signals, the switch controller 150 may instruct the wavelength converter 124 associated with the control input port of the star coupler 140 to convert the optical output control signal channel to the particular reception wavelength band associated with the first edge node and, thereby, send a timing signal to the first edge node. At the time at which the switch controller 150 expects control signals from the first edge node, the switch controller 150 instructs the spectral-translation module 126 to have the wavelength converter associated with the input wavelength channel from the first edge node translate the control signal received from the first edge node to the control reception wavelength band. Consequently, after passing through the star coupler 140 and the amplifier 142, the AWG demultiplexer will direct the control signal received from the first edge node to the switch controller 150 over the input control channel.

The information signal received by the switch controller 150 from the first edge node may be a control signal. Such a control signal may include a "connection request" requesting that an input wavelength channel from the first edge node be directed to a second edge node, where the second edge node may be reached through at least one of the output ports. A connection request will generally specify an input wavelength channel and an output wavelength channel. Alternatively, a connection request specifies a source edge node and a destination edge node and it is the task of the switch controller 150 to determine a corresponding input wavelength channel and a corresponding output wavelength channel.

The switch controller 150 may then direct the spectral-translation module 126 to have the wavelength converter 124 associated with an input wavelength channel from the first edge node translate the optical signal received on that input wavelength channel to the reception wavelength band associated with an output port leading to the second edge node. The switch controller 150 may then confirm the new configuration by way of a confirmation control message to the first edge node.

Thus, in a channel-switching mode, the switch controller 150 determines the wavelength band of the internal wavelength channel required at each input port (inlet port or inbound port) of the star coupler 140 in order to steer a corresponding information signal to a specified output port of the AWG demultiplexer 160 and, therefore, to a specified destination.

In a TDM-switching mode, a determination is made for the wavelength band of the internal wavelength channel required at each input port of the star coupler 140 in order to steer a corresponding information signal to a specified output port of the AWG demultiplexer 160 for every time slot. The latency of the switching is then dependent on the speed with which the wavelength converters 124 can change configuration. The duration of the time slots will then be dependent on the switching speed of the optical switch 100.

As mentioned hereinbefore, for TDM-switching to be effective, the optical switch 100 must be aware of when to expect each TDM frame received from each edge node to begin. To achieve such awareness, control signals may be exchanged between the optical switch 100 and a given edge node. Both the optical switch 100 and the given edge node have time counter of identical periods. The edge node "time-locks" to the optical switch 100 by sending a signal to the optical switch 100 including a reading of a time counter at the edge node. The optical switch 100 replies by sending the reading of its own time counter 152 corresponding to the instant at which it receives the reading of the edge-node time counter. Each of the time counters preferably has a period equal to an integer multiple of the duration of a TDM frame.

In response to receiving the corresponding reading from the optical switch controller 150, the given edge node may adjust its time counter. Such an exchange of control signals is herein called time-locking.

A time-locking technique is introduced in Applicant's U.S. patent application Ser. No. 09/286,431 filed on Apr. 6, 1999 and titled "Self-Configuring Distributed Switch", and further detailed in Applicant's copending U.S. patent application Ser. No. 10/054,509, filed on Nov. 13, 2001 and titled "Time-Coordination in a Burst-Switching Network". With time locking, all edge nodes subtending to a bufferless switch can time their transmission to arrive at the bufferless switch at any predefined instant of time. Time locking is not required in a path traversing nodes having input-signal buffers. Time locking is feasible when a path between two electronic edge nodes traverses only a single bufferless switch. This enables adaptive channel switching at the bufferless switch without the need to allow large idle periods between successive path changes.

Figure 4A:
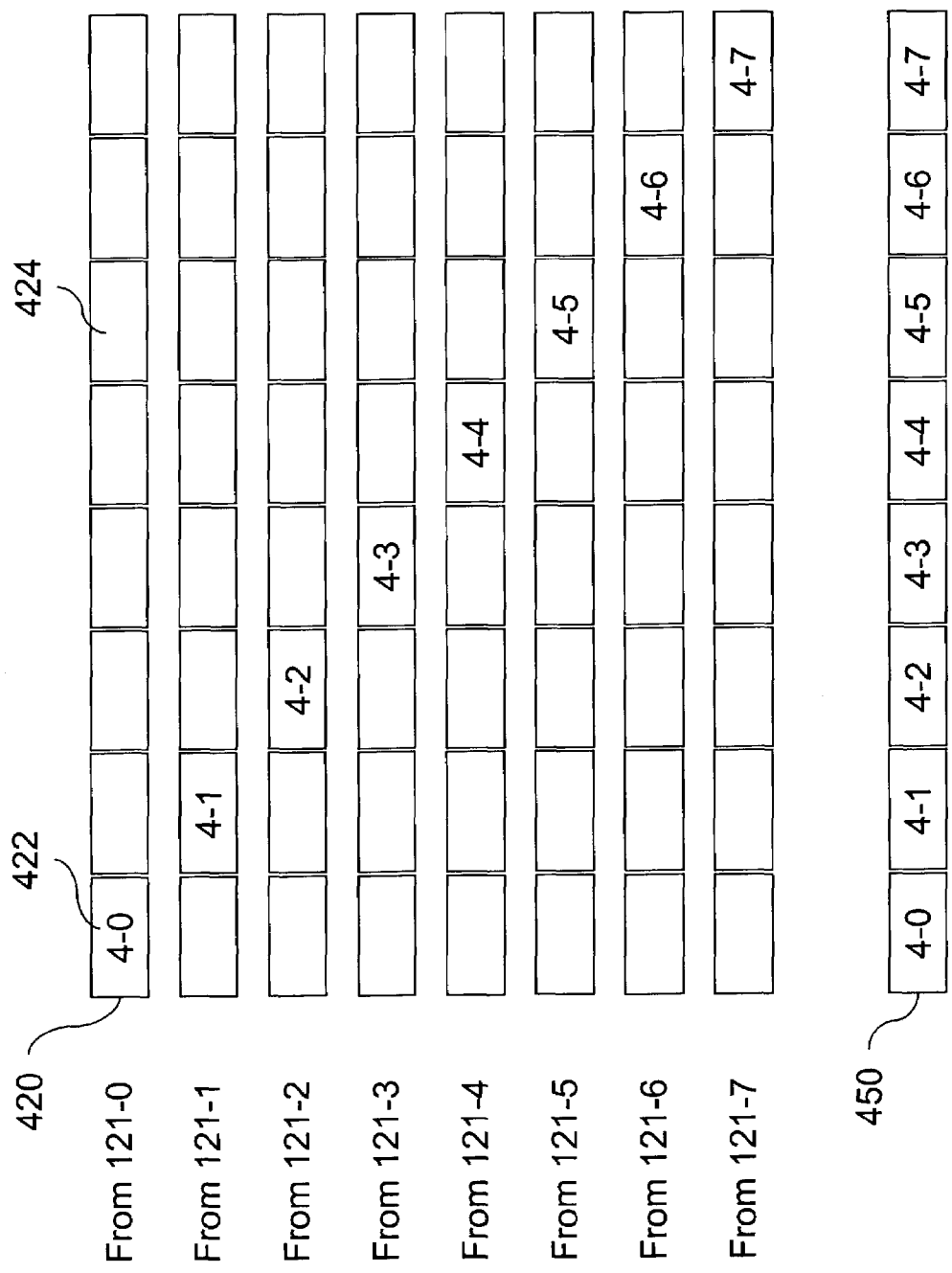
FIG. 4A illustrates an organization of optical signals received at the input ports of the optical switch of FIGS. 1A, 1B, 2A, 2B, 3A or 3B into time-slotted frames each having a control time slot in accordance with an embodiment of the present invention.

FIG. 4A illustrates optical signals received at the input ports of a star coupler 140 of FIGS. 1A through 3B from traffic sources. The optical signals are time slotted and arranged in time frames 420 each having the same duration and the same number of time slots. One time slot in each time frame, hereinafter called a control time slot 422, is dedicated to carry control information from a corresponding traffic source. Each other time slot 424 may carry payload information destined to a traffic sink through a wavelength channel 182. Each control time slot 422 carries an identifier of a traffic source or a corresponding input port. The control time slots 422 of the input optical signals, labeled 4-0 to 4-7, are non-coincident and are directed to the controller 150 or 250 through the input control channel 110. The optical signals during all control time slots have the same carrier wavelength and the control signals 4-0 to 4-7 are received at the controller 150 or 250 in consecutive time slots as indicated in a received time frame 450.

The number of time slots per time frame preferably equals or exceeds the number of received optical signals. If the number of time slots per time frame is less than the number of received optical signals, then more than one input control channel 110 would be required for the traffic sources to communicate with the controller 150 or 250. When the required ratio of control information to payload information is much smaller than the inverse of the number of traffic sources subtending to the optical switch 100 or 200, the time frame may be selected to include a number of time slots significantly exceeding the number of traffic sources. For example, if the optical switch 100 or 200 has 32 subtending traffic sources, a time frame of 256 time slots may be used with one time slot per time frame carrying control information from a corresponding traffic source. Thus, the control overhead consumes 1/256 of the capacity of each wavelength channel.

Figure 4B:
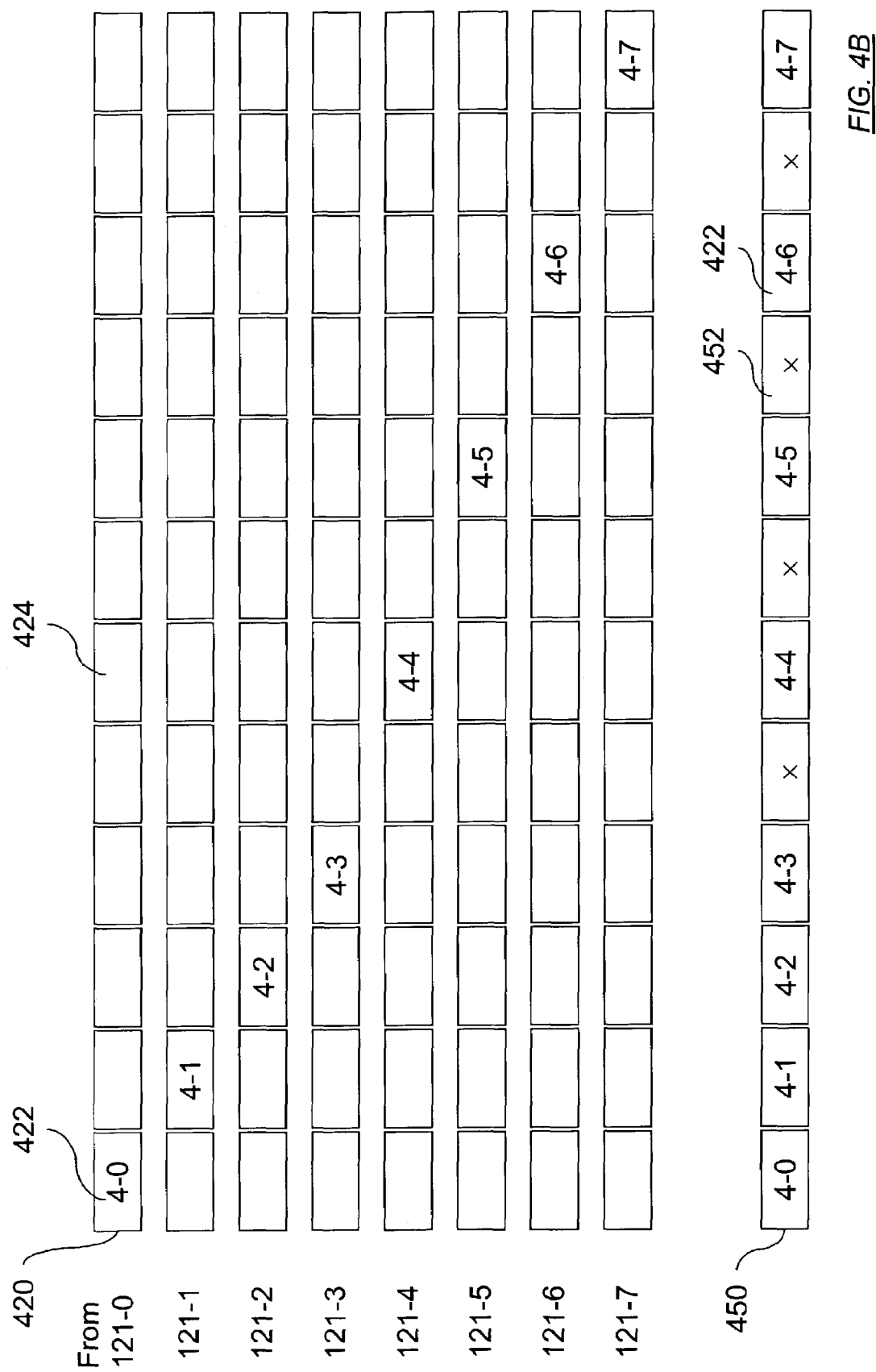
FIG. 4B illustrates an alternate organization of the optical signals of FIG. 4A having a larger number of time slots per frame.

In FIG. 4A, a time frame 420 comprising eight time slots is used and a single control time slot 422 per time frame is used. The optical signals during all control time slots have the same carrier wavelength and the control signals 4-0 to 4-7 are received at the controller 150 or 250 in consecutive time slots. FIG. 4B illustrates a time frame having 12 time slots with the control time slots distributed as indicated and received at the controller 150 or 250 at the time slots indicated. A time slot not carrying information is marked 'x' in FIG. 4B.

Likewise, the optical signal (not illustrated) along each wavelength channel 182 leading to a traffic sink is organized in time frames each having the same number of time slots with one time slot per frame dedicated to carry control information back to traffic sinks. Each traffic sink is associated with one of the traffic sources with which it is collocated.

Figure 5A:
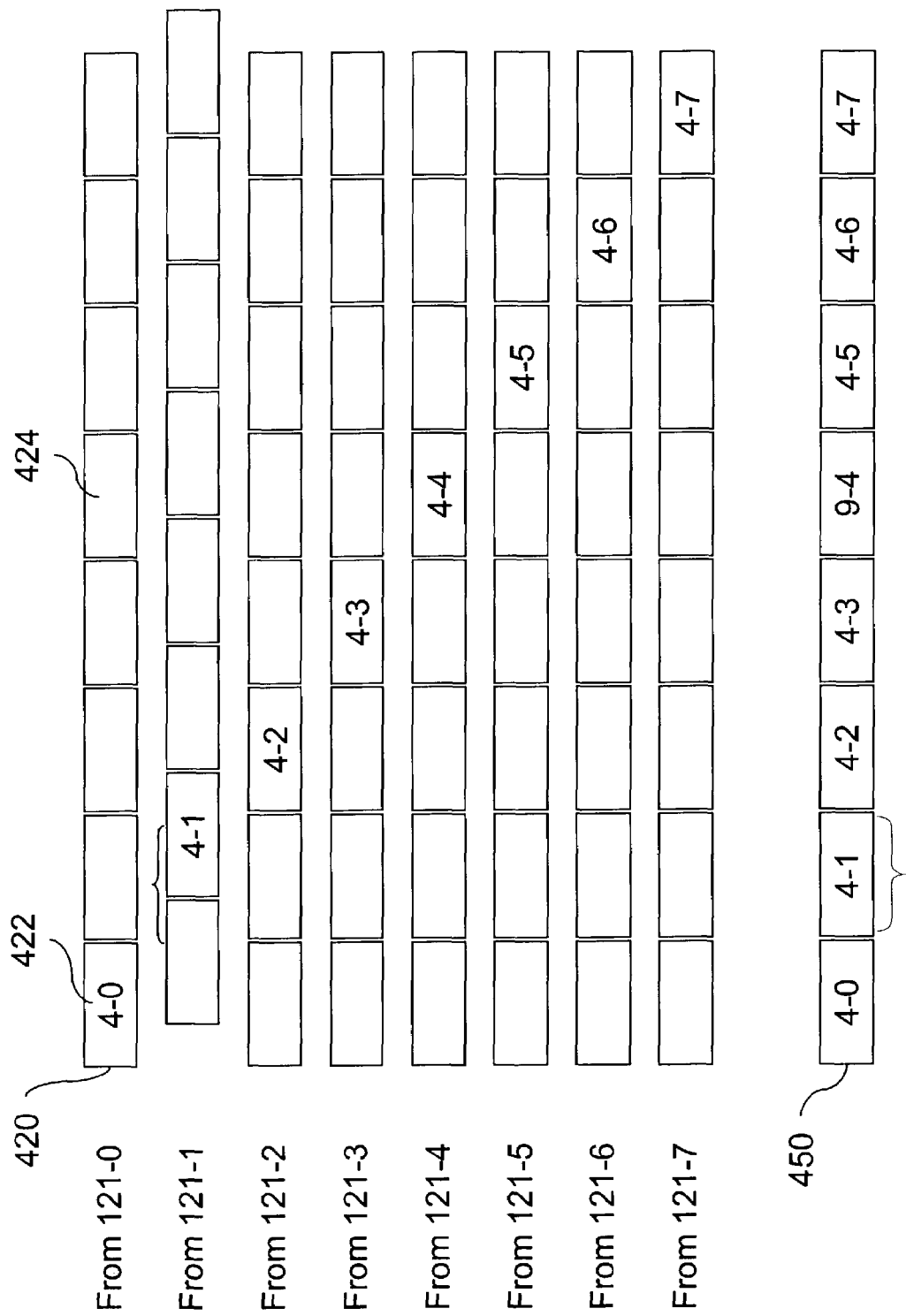
FIG. 5A illustrates the optical signals of FIG. 4A where one of the optical signals is not time-locked to the optical switch.

The optical signals received at the input ports of the star coupler 140 are received in alignment, as indicated, each being time-locked to the time counter 152 of the controller 150 or 250. FIG. 5A illustrates a case where the optical signal received from the second traffic source through input wavelength channel 121-1 is not time locked to the time counter 152 of the optical switch. Controller 150 or 250 associates a reference identifier of a corresponding traffic source or input port with each time slot in the slotted time frame. As mentioned above, each control time slot carries an identifier of the traffic source or the corresponding input port. The controller 150 or 250 receives control information from the second traffic source through inlet wavelength channel 121-1 during the corresponding time slot 4-1 and ascertains time locking by comparing the identifier read during the second control time slot with the corresponding reference indication. If the received identifier differs from the reference identifier, the controller 150 or 250 initiates a time-locking recovery process.

Figure 5B:
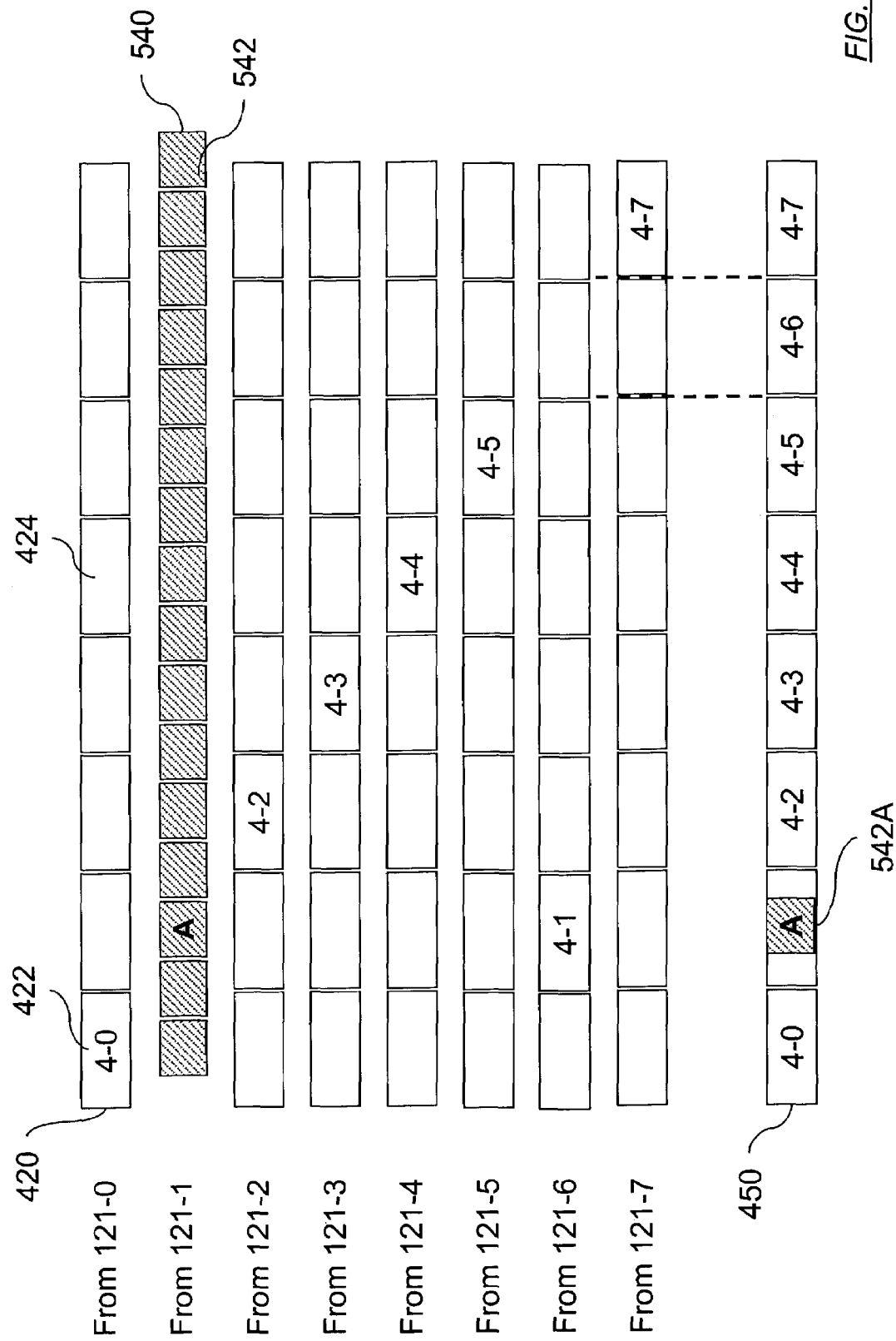
FIG. 5B illustrates the organization of an optical signal during a process of time locking in accordance with an embodiment of the present invention.

In the optical switch 100 or 200, a time-lock recovery process (for an active source), or a time-lock acquisition process (for a new source), starts by sending a message to the second traffic sink, which is collocated with the second traffic source, over the second output wavelength channel 182-1 leading to second traffic sink. The message instructs the second traffic source to send a continuous stream of recovery data packets 542, each recovery data packet 542 including the source identifier and the reading of the time counter of the second source. Each recovery data packet 542 must have a time duration not exceeding half a time slot in order to enable its acquisition by the controller 150 or 250 as illustrated in FIG. 5B where the recovery packet "A" is acquired. Upon acquiring a recovery packet, the controller 150 or 250 appends a reading of its own time counter 152 to the acquired recovery packet and returns the appended packet to the second traffic source, which would then reset its own time counter. A similar time-lock acquisition or recovery process can be applied to the optical switch to be described below with reference to FIG. 8.

It is known that the power loss in the star coupler 140 increases with the number of input ports. The capacity of an optical switch of the type of the optical switch 100A illustrated in FIG. 1A is, therefore, limited by the number of input ports that can be supported. Using a 64×1 star coupler and a 1×64 AWG demultiplexer, yields a 64×64 switch with 63 input/output ports used for information switching and one input port and one output port used for control. With 10 Gb/s wavelength channels, the total capacity of such a 64×64 optical switch, i.e., the total payload bit rate that can be transferred across the optical switch, is 630 Gb/s.

The number of input wavelength channels 121 may differ from the number of output wavelength channels 182, and the wavelength bands of the input wavelength channels 121 may differ from the wavelength bands of the output wavelength channels 182; there need not be a one-to-one correspondence between the input wavelength bands and the output wavelength bands. If all wavelength bands have the same width, each corresponding to a carrier modulated at 10 Gb/s for example, and if the number of input channels exceeds the number of output channels, the optical switch 100 of FIG. 1A functions as a concentrator, where the mean occupancy of the input wavelength channels 121 exceeds the mean occupancy of the output wavelength channels 182. On the other hand, if the number of output wavelength channels 182 exceeds the number of input wavelength channels 121, the mean occupancy of the input wavelength channels 121 exceeds the mean occupancy of the output wavelength channels 182, thus providing inner expansion, also called dilation, to help reduce or eliminate mismatch blocking in subsequent switching stages.

Figure 6A:
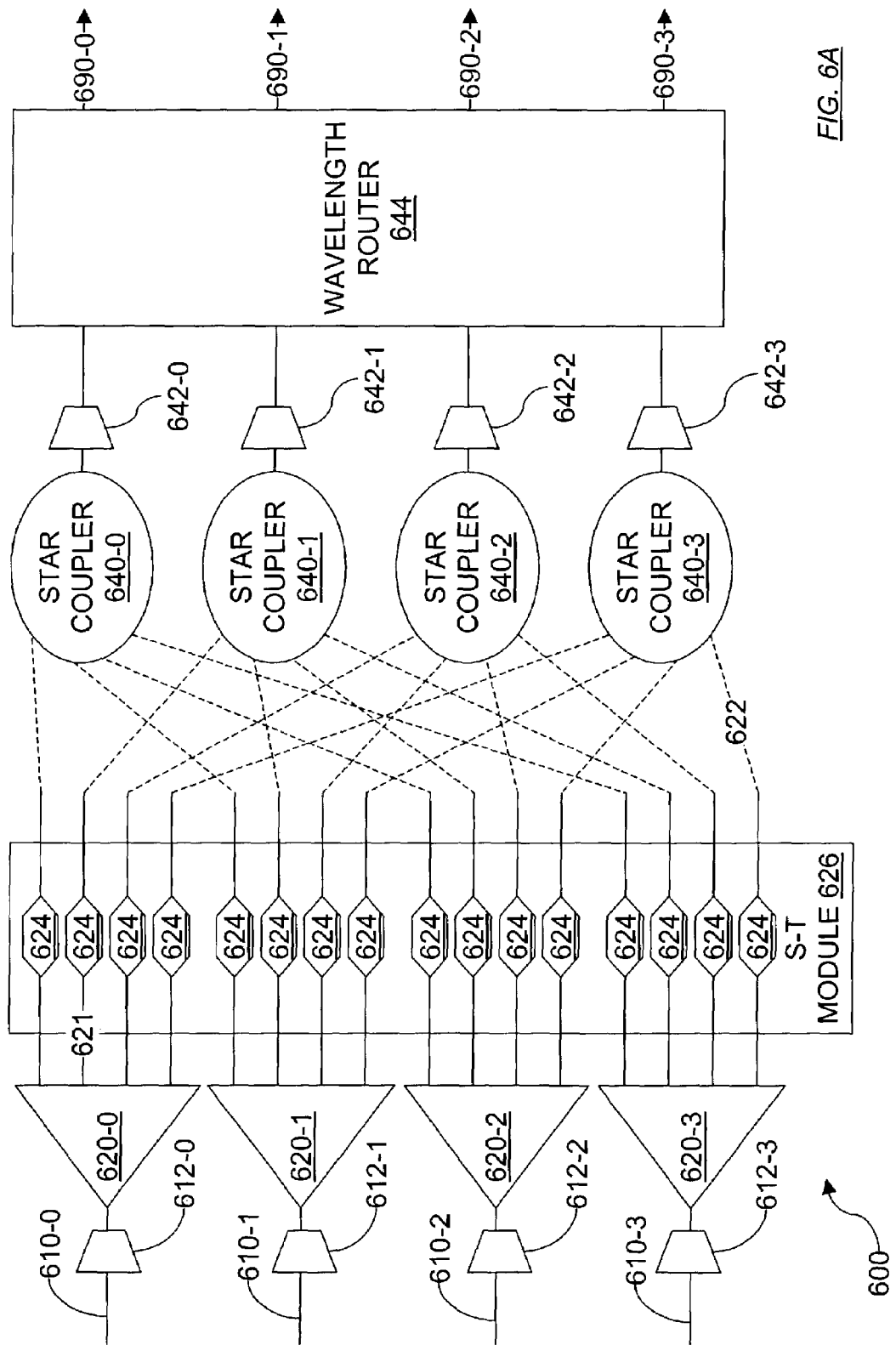
FIG. 6A illustrates an optical switching node employing several optical switches of the type illustrated in FIG. 1A according to an embodiment of the present invention.

FIG. 6A illustrates an optical switching node 600 having four WDM input links 610-0, 610-1, 610-2, 610-3 (referred to individually or collectively as 610) each carrying a WDM optical signal comprising four input wavelength channels, each input wavelength channel corresponding to a modulated wavelength. Associated with the four input links 610 are four input amplifiers 612-0, 612-1, 612-2, 612-3 (referred to individually or collectively as 612) and four input Arrayed Waveguide Grating (AWG) demultiplexers 620-0, 620-1, 620-2, 620-3 (referred to individually or collectively as 620).

The optical signal in each input link 610 is first amplified by the associated input amplifier 612 then demultiplexed into input wavelength channels, an exemplary one of which is identified as 621, by an associated input AWG demultiplexer 620. A wavelength converter 624 is associated with each input wavelength channel. A given wavelength converter 624 may shift an incoming wavelength band to another as determined by controller 850, to be described with reference to FIG. 8. The wavelength-band shift is implemented by spectral-translation module 626. A channel stemming from a wavelength converter 624 is hereinafter called an inner wavelength channel. Each inner wavelength channel at the output of the input AWG demultiplexer 620 associated with each input WDM link 610 is directed to one of four star couplers 640-0, 640-1, 640-2, 640-3 (referred to individually or collectively as 640) through an input internal fiber link, an exemplary one of which is identified as 622.

Each star coupler 640 has four input ports and a single output port. A star coupler 640 combines the internal wavelength channels received at the four input ports into a star coupler output signal transmitted at the output port. Handling the star coupler output signals from the four star couplers 640 are four intermediate amplifiers 642-0, 642-1, 642-2, 642-3 (referred to individually or collectively as 642). Individual wavelength channels of the amplified star coupler output signals are then routed by a wavelength router 644 to one of four WDM output links 690-0, 690-1, 690-2, 690-3 (referred to individually or collectively as 690).

Figure 6B:
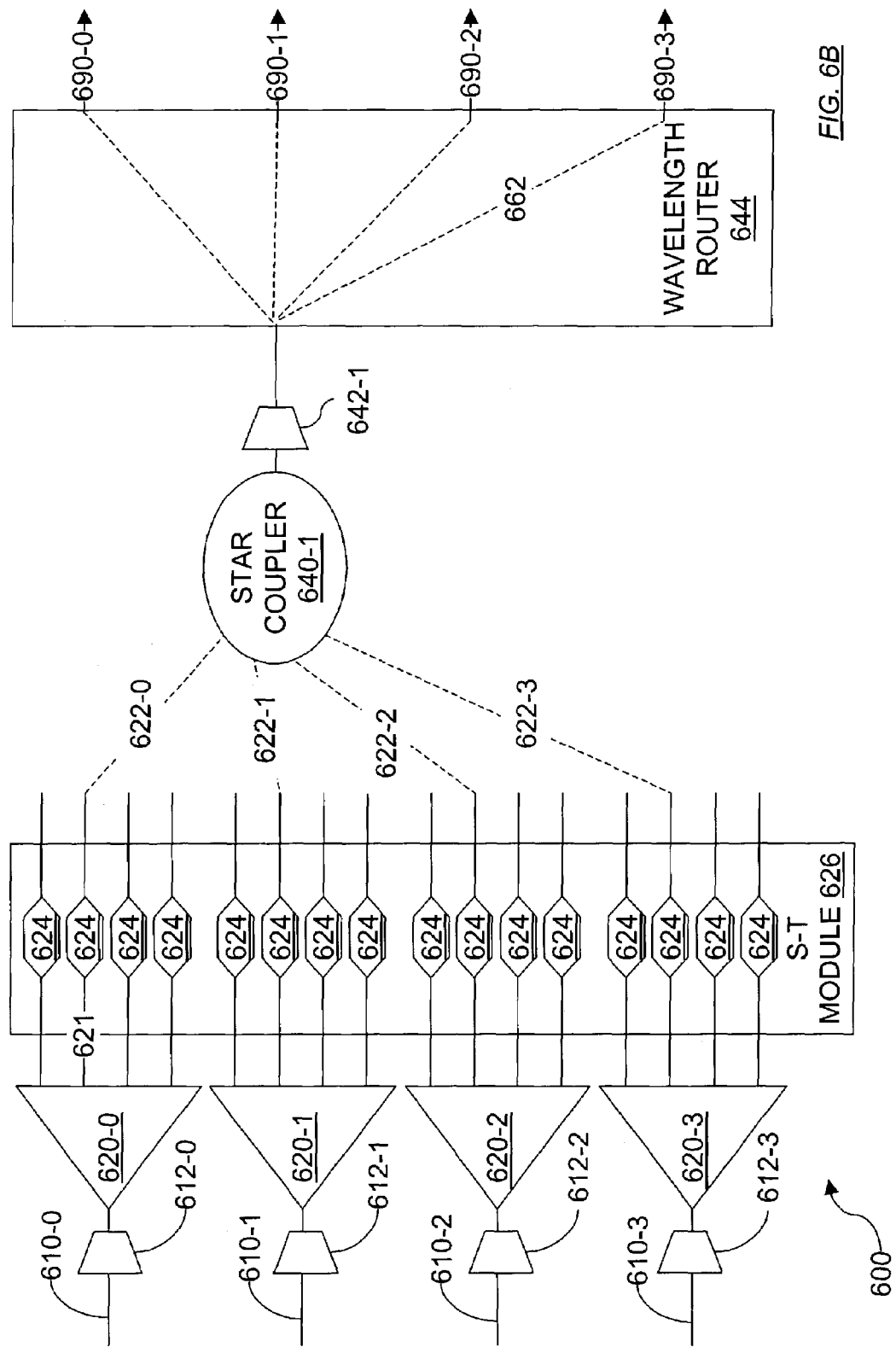
FIG. 6B is a portion of FIG. 6A to be used for explaining some connectivity aspects of the optical switching node of FIG. 6A.

The optical switching node 600 is devised for use to interconnect edge nodes having switching capability so that a particular connection from a traffic source to a traffic sink can be placed on any wavelength channel in an incoming WDM input link 610 and any wavelength channel in a WDM output link 690. An input channel 621 connects to a single star coupler 640 through a wavelength converter 624 and the optical signal carried by an input channel 621 can be directed to any output link 690 by spectral translation in the wavelength converter 624 associated with the input channel 621. However, without the switching capability at the edge node, the payload signals carried by inner wavelength channels carried on input internal fiber links 622 directed to a given star coupler 640 must be evenly distributed among the output links 690. Consider for example the input channels 622-0 to 622-3 leading to star coupler 640-1 of an optical switching node 600 illustrated in FIG. 6B. Each of these input channels 622-0 to 622-3 corresponds to a specific wavelength channel in an input WDM link 610. As illustrated in FIG. 6B, the combined signal at the output of amplifier 642-1, which includes four wavelength channels, is directed, through the wavelength router 644 to four wavelength channels, one in each of the four WDM output links 690-0 to 690-3. The total capacity requirement of all the signals that are directed to a specific output link 690 and carried by channels 622-0 to 622-3 cannot, therefore, exceed the capacity of a single wavelength channel. Thus, under full occupancy of channels 622-0 to 622-3, the total traffic carried by channels 622-0 to 622-3 must be divided evenly among output links 690-0 to 690-3. This connectivity limitation does not present any difficulty if the edge nodes having switching capability. In the example of FIG. 6B, the edge nodes that placed the signals on the four channels 610 that led to star coupler 640-1 could have placed the signals on other channels 621 so that the signals can be directed to output link 690-0 through the four star couplers 640-0 to 640-3 instead of the single star coupler 640-1.

Figure 7:
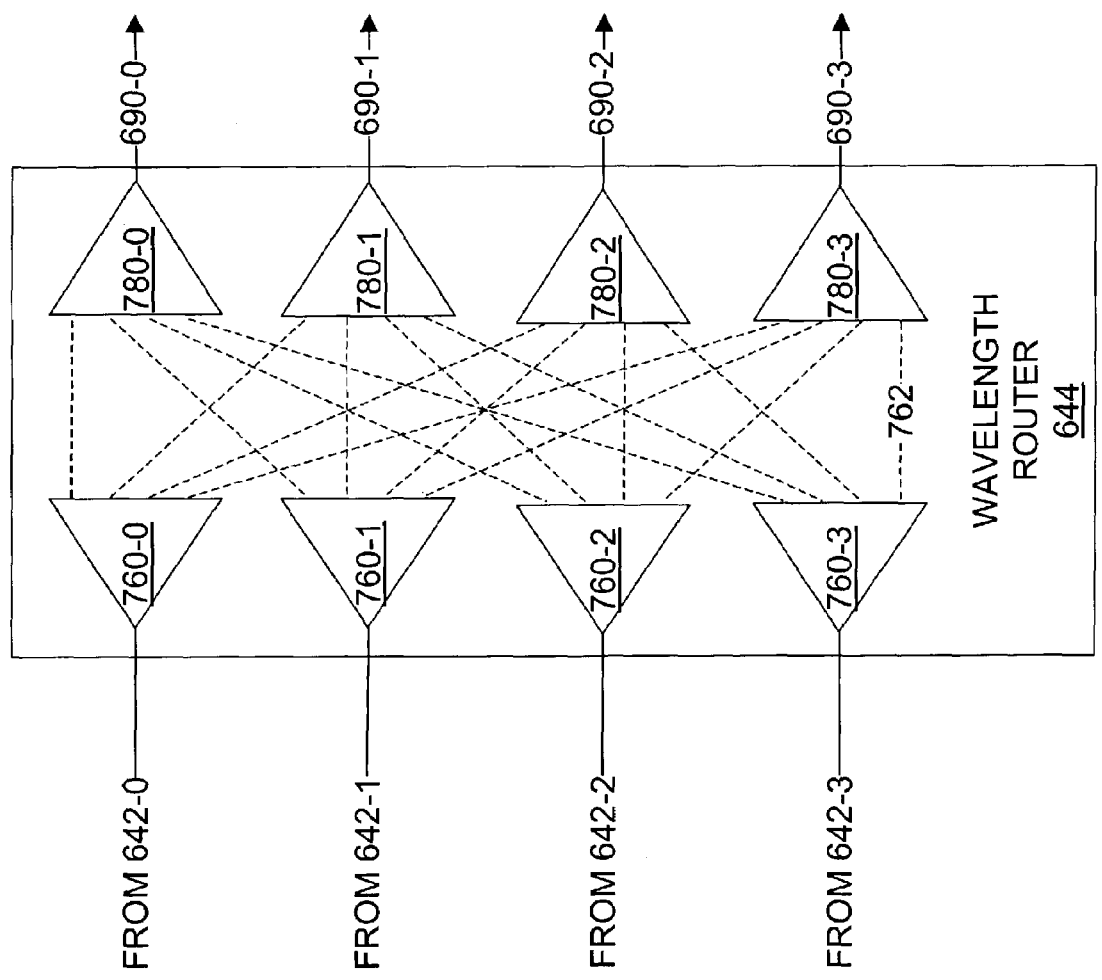
FIG. 7 illustrates an exemplary wavelength router for use in the optical switching node of FIG. 6A according to an embodiment of the present invention.

An exemplary implementation of the structure for the wavelength router 644 is presented in FIG. 7, wherein four output AWG demultiplexers 760-0, 760-1, 760-2, 760-3 (referred to individually or collectively as 760) connect to four AWG multiplexers 780-0, 780-1, 780-2, 780-3 (referred to individually or collectively as 780). A wavelength router may also be available in a single circuit.

The star coupler output signal from a given star coupler 640 is amplified in an associated intermediate amplifier 642 then demultiplexed by an associated output AWG demultiplexer 760 into constituent wavelength channels carried by output internal fiber links, an exemplary one of which is identified as 762 (connecting the fourth output AWG demultiplexer 760-3 to the fourth AWG multiplexer 780-3). The constituent wavelength channels at the output of each output AWG demultiplexer 760 are distributed to the four AWG multiplexers 780 through the output internal fiber links 762 and the multiplexed constituent wavelength channels are carried by four WDM output links 690. Notably, each internal fiber link 622, 762 carries only a single wavelength channel.

Figure 8:
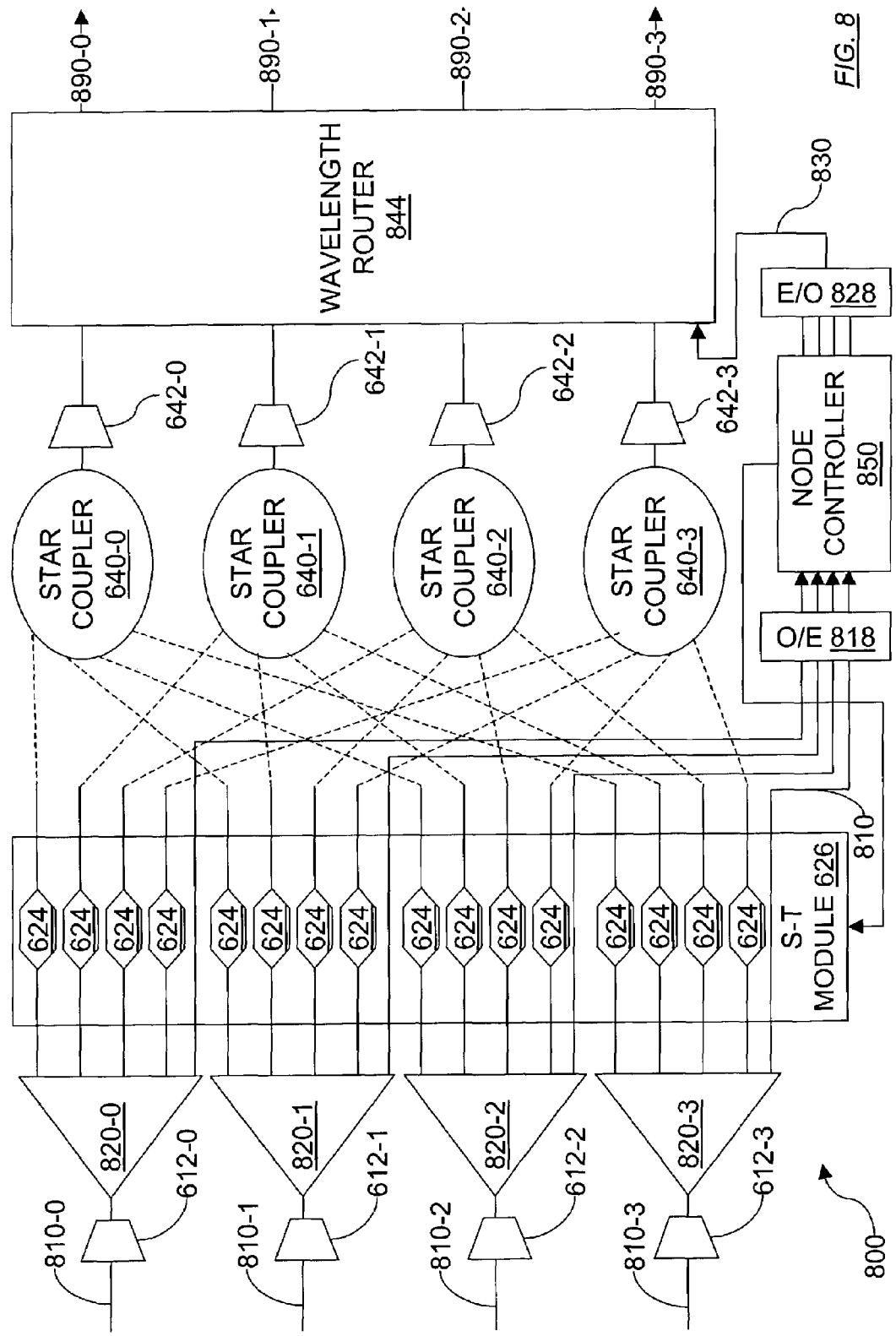
FIG. 8 illustrates out-of-band control paths to a controller of the switching node of FIG. 6A according to an embodiment of the present invention.
Figure 10:
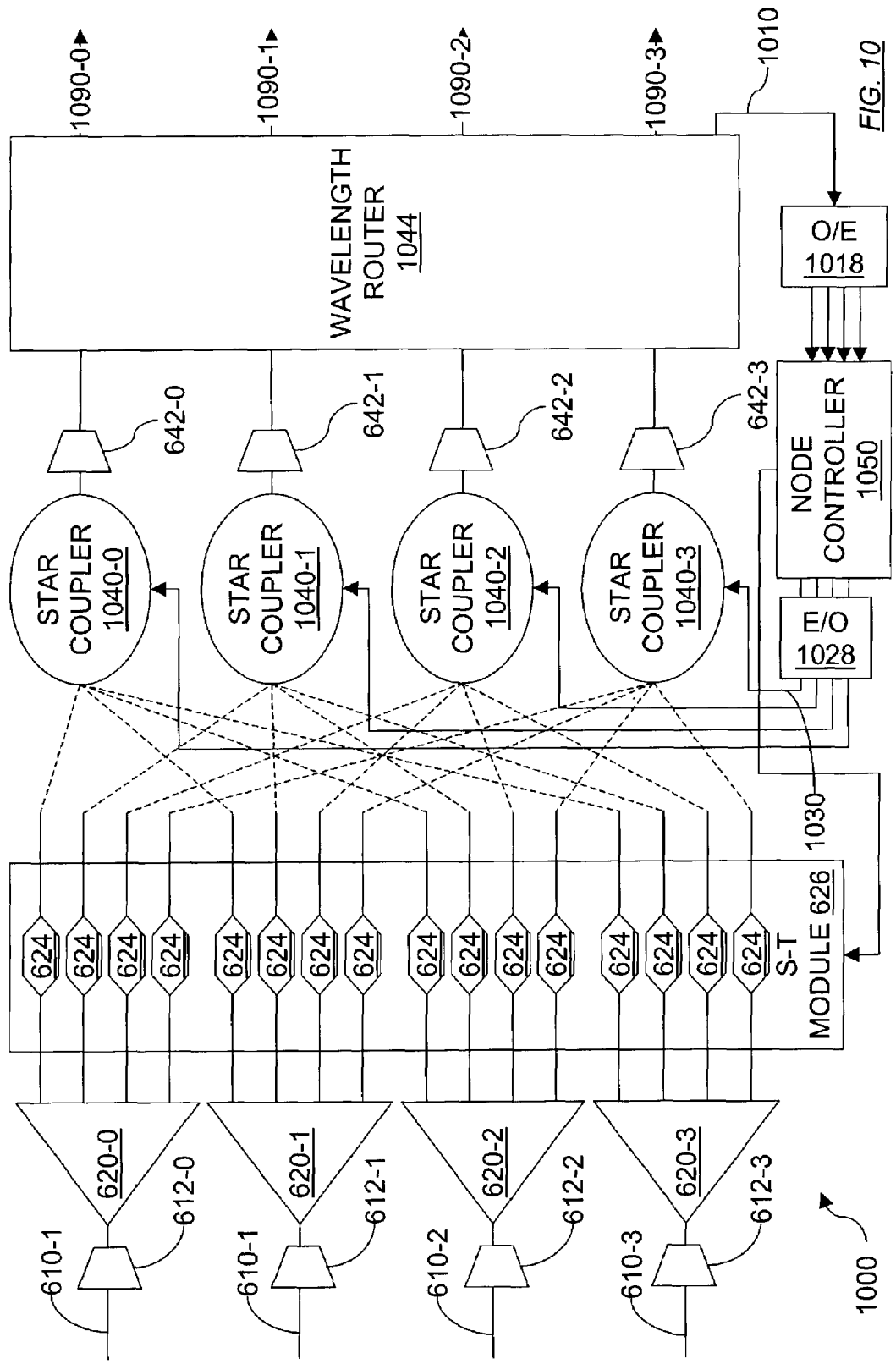
FIG. 10 illustrates in-band control paths to a controller of the optical switching node of FIG. 6A according to an embodiment of the present invention.
Figure 11:
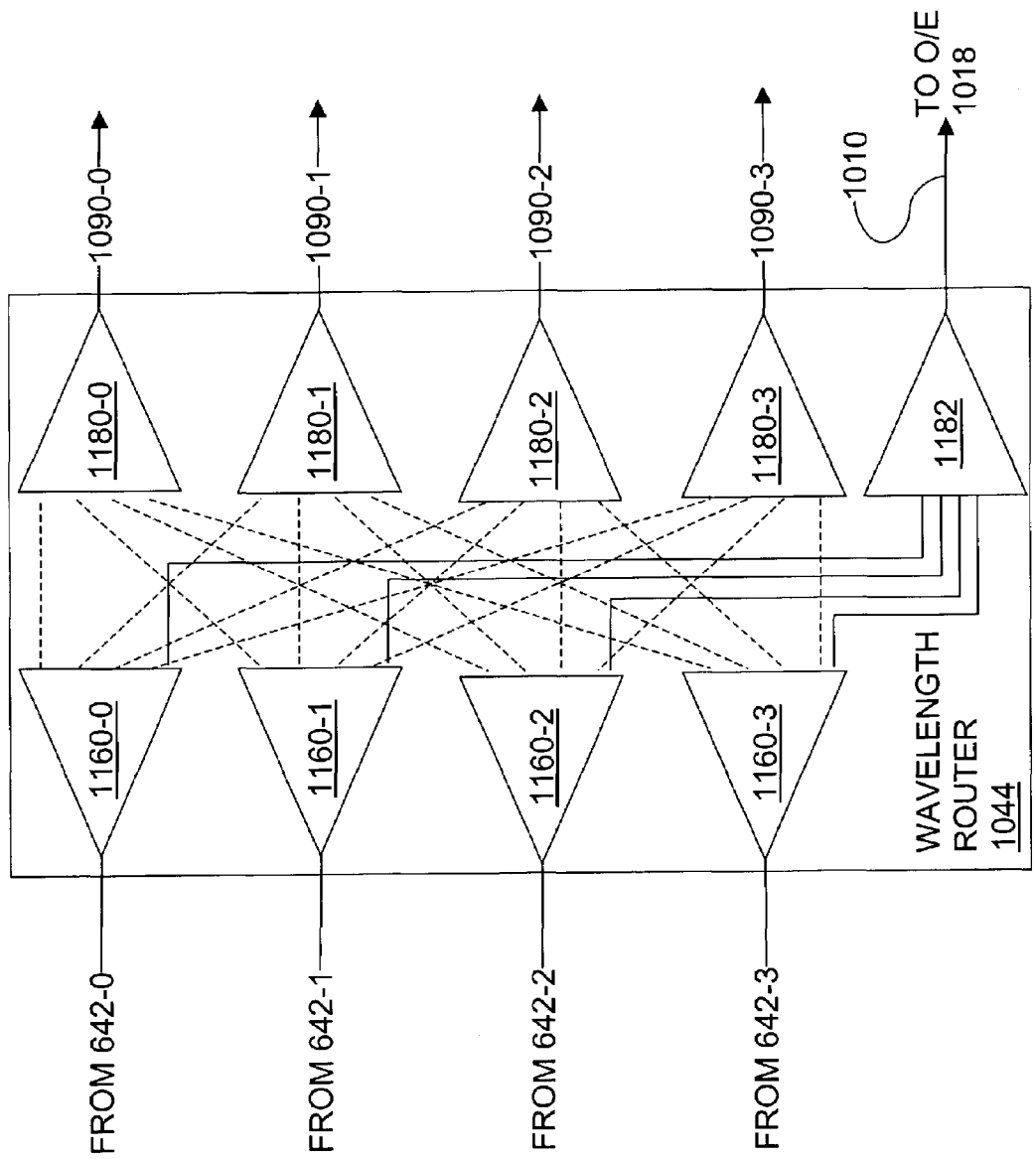
FIG. 11 illustrates an exemplary wavelength router for use in the optical switching node of FIG. 10 according to an embodiment of the present invention.

The optical switching node 600 of FIG. 6A has been illustrated, to reduce complexity, without paths for control signals. There may be many schemes for routing control signals in the optical switching node 600. FIG. 8 and FIG. 10 each illustrate an exemplary scheme.

FIG. 8 illustrates a scheme wherein a separate input control channel is received in each input link 810 and a separate optical output control signal channel is transmitted in each output link 890. Each input AWG demultiplexer 820 is adapted to extract the input control channel from the associated input link 810. The input control channels are then directed to control input ports of a node controller 850 through input control links, an exemplary one of which is identified as 810, and an optical-to-electrical interface 818. The optical-to-electrical interface 818 includes an optical-to-electrical converter corresponding to each of the control input ports. The node controller 850 processes input control channels received on the input control links 810 to determine the required wavelength conversions, if any, in the spectral translation module 626. Wavelength-conversion control signals are distributed to the wavelength converters 624 via a connection between the node controller 850 and the spectral-translation module 626. The node controller 850 communicates with downstream nodes through output control ports that transmit to an electrical-to-optical interface 828 and an output control link 830. The electrical-to-optical interface 828 may be understood to include an electrical-to-optical converter corresponding to each of the output control ports and a multiplexer to multiplex the optical output control signal channels onto an output control link 830. The configuration of FIG. 8, and, as will be seen hereinafter, the configuration of FIG. 10, can be adapted to switch both continuous signals and time-division-multiplexed signals.

As the scheme of FIG. 8 uses a fixed control path and a fixed wavelength channel to create an out-of-band control channel, the node capacity is reduced in the ratio N−1:N, where N is the number of wavelength channels per input link. The use of a single control channel per input link 810 necessitates that either a single edge node be used per input link 810 or that multiple edge nodes contend for access to the control channel. Such access contention is known and will be especially familiar to those well versed in Ethernet-based communication.

Time-lock acquisition or recovery in an optical switch 800 is similar to the time-lock acquisition (for a new source) or recovery (for an active source) process described with reference to FIG. 5A and FIG. 5B.

Figure 9:
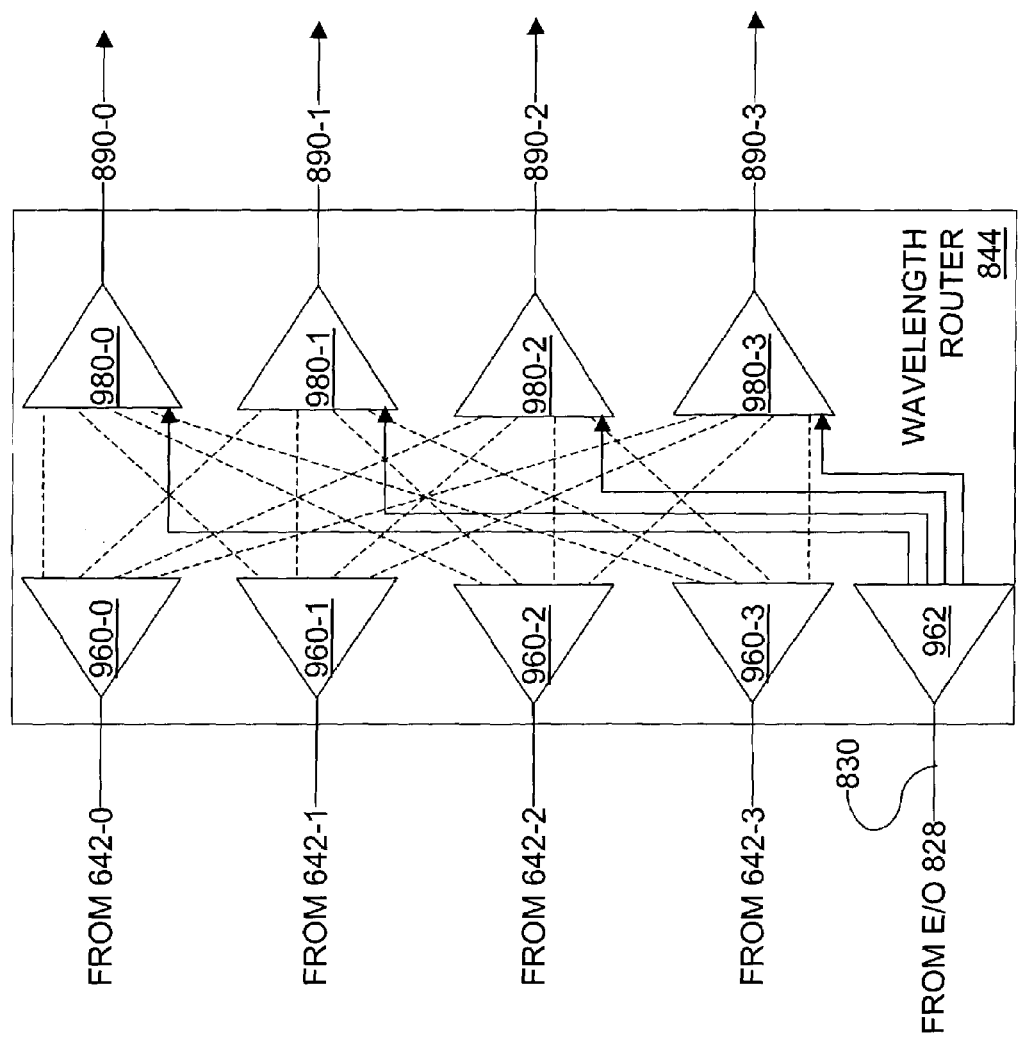
FIG. 9 illustrates an exemplary wavelength router for use in the optical switching node of FIG. 8 according to an embodiment of the present invention.

An exemplary implementation of the structure for the wavelength router 844 is presented in FIG. 9, wherein four output AWG demultiplexers 960-0, 960-1, 960-2, 960-3 (referred to individually or collectively as 960) connect to four AWG multiplexers 980-0, 980-1, 980-2, 980-3 (referred to individually or collectively as 980). As indicated hereinbefore, a wavelength router may also be available in a single circuit. A control AWG demultiplexer 962 is used to receive the control signals over the output control link 830, demultiplex the received control signals and send the control signals to the appropriate edge node via a corresponding AWG multiplexer 980.

FIG. 10 illustrates a scheme wherein the optical switching node 600 is adapted to become an optical switching node 1000 capable of TDM-switching. Briefly, in a TDM-switching arrangement, a TDM frame of predetermined duration is divided into time slots. An edge node transmitting a wavelength channel to an optical switch employing TDM-switching continually sends information signals organized in a TDM frame on the wavelength channel. That is, the edge node may modulate the center wavelength of the wavelength channel with an information signal having a first destination in a first time slot and with an information signal having a second destination in a second time slot. Through control signal communication with a node controller 1050, the edge node may learn which time slots are allocated to which destinations and may request a change in the allocation as traffic composition changes.

In the scheme of FIG. 10 control signals are received "in-band", where control signals share a channel with payload signals. In one implementation, control signals can be received in predetermined control time slots within each TDM frame. The node controller 1050 receives the input control channel carried by a particular input link 610 via an input control link 1010 from the wavelength router 1044.

The optical input control signal channel is converted to an electrical input control signal for use by the node controller 1050 by an optical-to-electrical interface 1018. The optical-to-electrical interface 1018 additionally includes a demultiplexer (not shown) to divide the received multiplex of control signals for presentation to the control input ports of the node controller 1050.

The optical-to-electrical interface 1018 includes an optical-to-electrical converter corresponding to each of the control input ports. The node controller 1050 sends optical output control signal channels to downstream nodes, after conversion from electrical output control signals by an electrical-to-optical interface 1028, on an output control link, an exemplary one of which is identified as 1030, to an input port of a star coupler 1040. The electrical-to-optical interface 1028 includes an electrical-to-optical converter corresponding to each of the output control ports. The optical output control signal channels eventually leave the optical switching node 1000 on WDM output links 1090-0, 1090-1, 1090-2, 1090-3 (referred to individually or collectively as 1090).

As in FIG. 8, wavelength control signals are distributed by the node controller 1050 to the wavelength converters 624 through the spectral-translation module 626.

Figure 12:
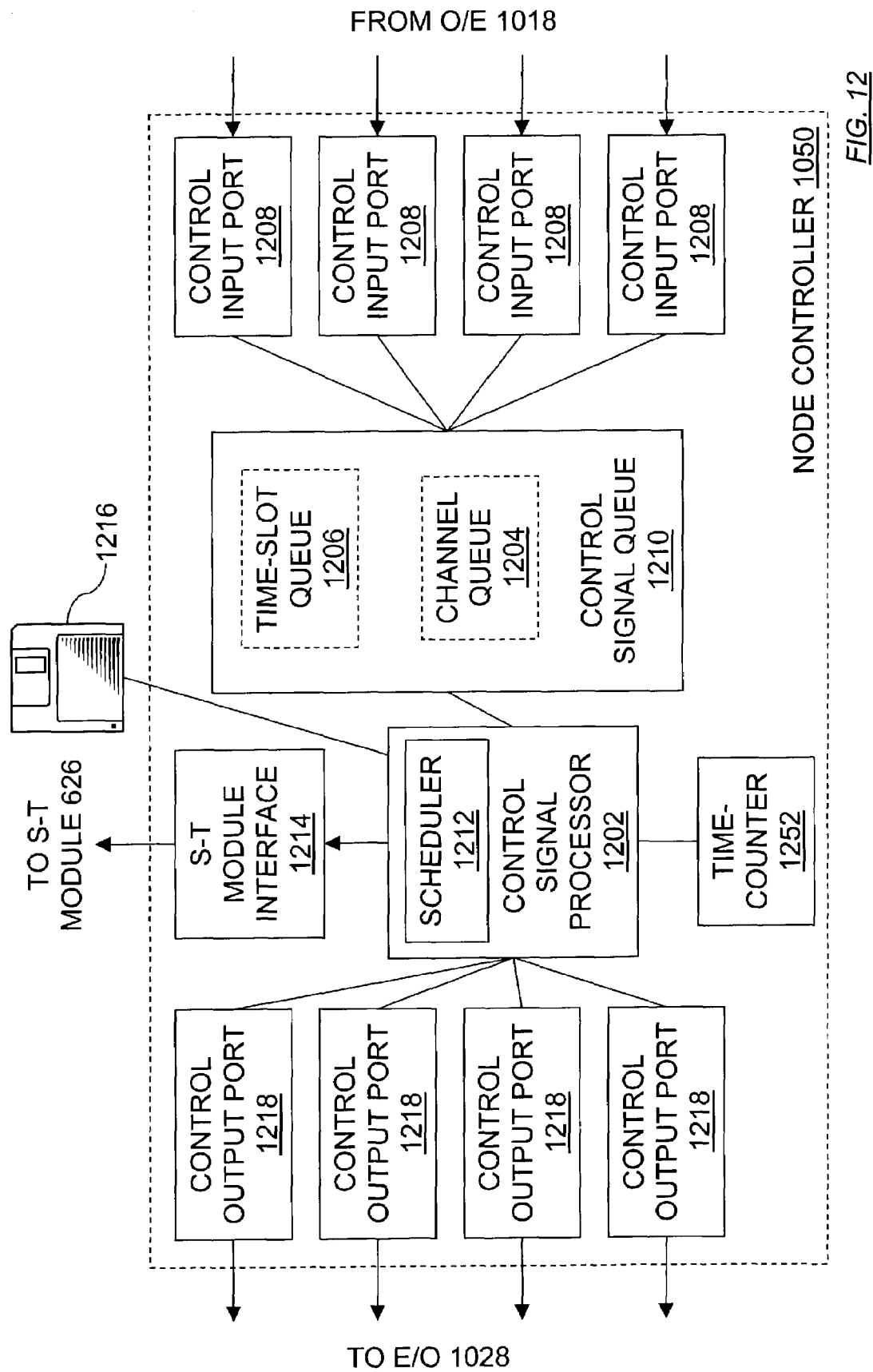
FIG. 12 illustrates an exemplary node controller for the optical switching node of FIG. 10, according to an embodiment of the present invention.

An exemplary structure for the node controller 1050 of FIG. 10 is illustrated in FIG. 12. As discussed hereinbefore, the node controller 1050 has multiple control input ports 1208 and multiple control output ports 1218. The control input ports 1208 pass the electrical input control signals to a control signal queue 1210 where the electrical input control signals may be stored before being processed by a control signal processor 1202. Where the processing of the electrical input control signals leads to the generation of electrical output control signals, the control signal processor 1202 sends such electrical output control signals to the appropriate edge node via the control output ports 1218.

The node controller 1050 also includes a spectral-translation module (S-T module) interface 1214. Once the control signal processor 1202 has determined a new schedule of operation for the optical switching node, the schedule is transferred to the spectral-translation module 626 for implementation via the spectral-translation module interface 1214.

The node controller 1050 also includes a time-counter 1252 for use in the time-locking procedures described hereinbefore.

As many of the electrical input control signals are likely to be connection requests, the control signal queue 1210 may include specific connection request queues for different types of connection requests. In particular, there may be a channel-request queue 1204 for channel-based connection requests and a time-slot-request queue 1206 for time-slot-based connection requests. The connection requests may be processed at the control signal processor 1202 by a scheduler 1212.

Each of the control functions of the control signal processor 1202 can be implemented in application-specific hardware, which is the preferred implementation when high speed is a requirement. However, in an alternative implementation, the control signal processor 1202 may be loaded with control signal processing software for executing methods exemplary of this invention from a software medium 1216 which could be a disk, a tape, a chip or a random access memory containing a file downloaded from a remote source.

FIG. 13 illustrates a first connection-request matrix 1300 indicating the number of channels required to carry the traffic from each input link to each output link of a channel-switching optical switching node.

Note that, up to this point, the most complex optical switching node we have discussed (the optical switching node 1000 of FIG. 10) has four WDM input links 610 and four WDM output links 1090. In order to illustrate mechanisms required to handle more complex systems, the optical switching node to which the first connection-request matrix 1300 of FIG. 13 relates has eight WDM input links and eight WDM output links, where each of the WDM links includes multiple wavelength channels. The first connection-request matrix 1300 indicates, for example, that two wavelength channels are required from a WDM input link with a link index of "4" to a WDM output link with a link index of "2".

FIG. 14 illustrates a second connection-request matrix 1400 indicating the number of time slots (in a TDM frame of 128 time slots) required to carry the traffic from each input link to each output link of a TDM-switching optical switching node. As was the case for the first connection-request matrix 1300, the optical switching node to which the second connection-request matrix 1400 relates has eight WDM input links and eight WDM output links. Notably, the number of time slots specified for a connection need not be an integer multiple of the number of time slots per frame. The second connection-request matrix 1400 indicates, for example, that 212 time slots are required from a WDM input link with a link index of "4" to a WDM output link with a link index of "2".

Each connection request has at least four connection parameters: an identifier of an input link, an identifier of an output link, a required capacity allocation and a connection mode. The connection mode may take on one of three values, 0, 1 or 2. When mode 0 is indicated, the connection requires an integer number of wavelength channels. When mode 1 is indicated, a connection requires a specified integer number of time slots per TDM frame, provided this number does not exceed a number, S, of time slots per TDM frame. When mode 2 is indicated, a connection requires an integer number of wavelength channels and an integer number of time slots per TDM frame.

Figure 15:
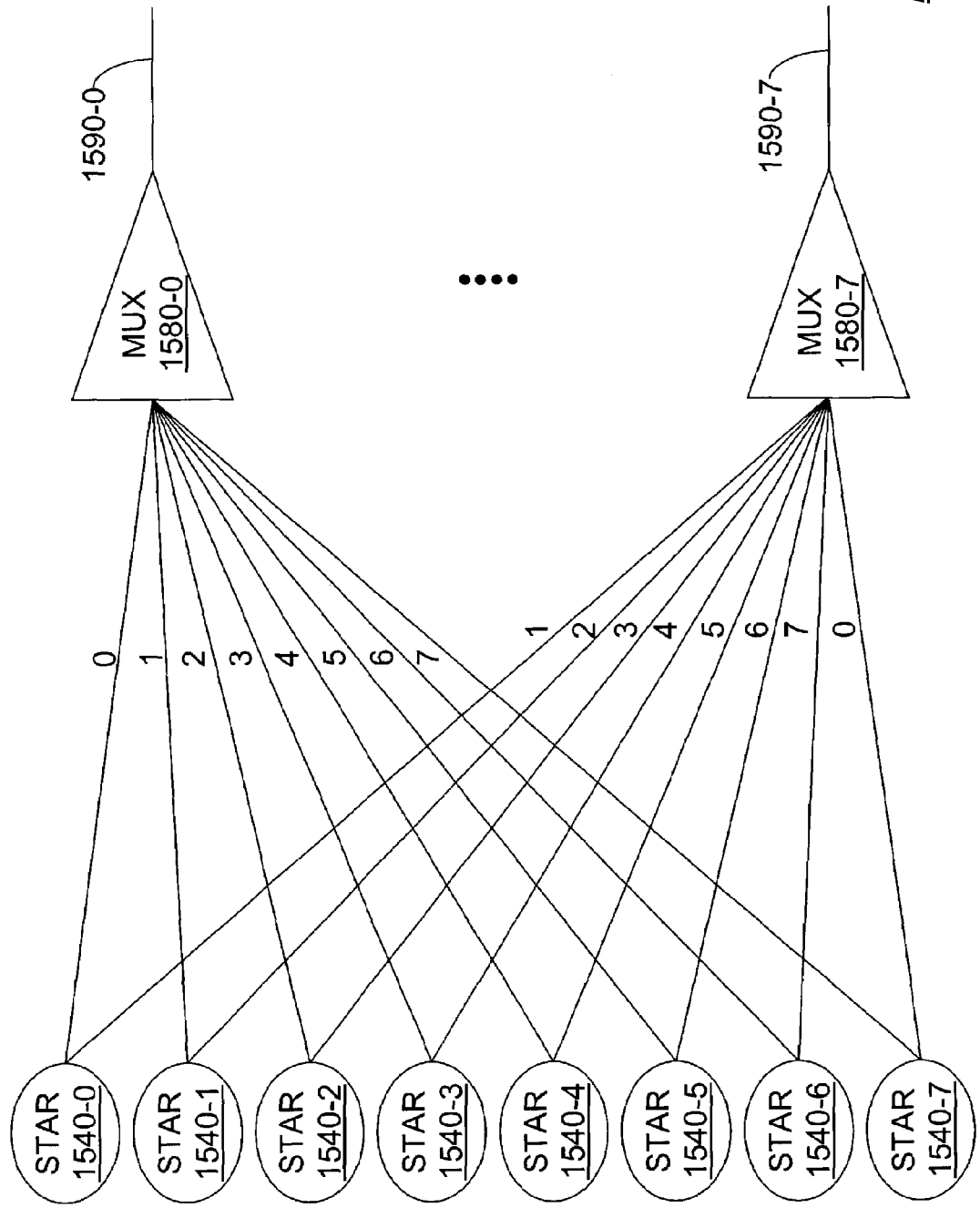
FIG. 15 illustrates an exemplary wavelength-assignment scheme for a switching node of the type of the switching node of FIG. 10.

FIG. 15 illustrates wavelength-assignments for an optical switching node of the form illustrated in FIG. 10. However, where the optical switching node of FIG. 10 includes four star couplers, the portion of the optical switching node illustrated in FIG. 15 includes eight star couplers 1540-0, 1540-1, 1540-2, 1540-3, 1540-4, 1540-5, 1540-6, 1540-7 (referred to individually or collectively as 1540) and two exemplary AWG multiplexers (MUX) 1580-0, 1580-7 of an understood total of eight. As was the case for the discussion of connection-request matrices 1300, 1400, the optical switching node of which a portion is illustrated in FIG. 15 has eight WDM input links and eight WDM output links. The two exemplary AWG multiplexers 1580-0, 1580-7 transmit on two exemplary output links 1590-0, 1590-7. Not shown in FIG. 15 are the amplifiers associated with each star coupler 1540 and the output AWG demultiplexers that divide the output signal from the star couplers 1540 into the (shown) individual wavelength channels.

FIG. 15 illustrates that the first of eight wavelengths output from the first star coupler 1540-0 is sent to the first AWG multiplexer 1580-0 for inclusion on the first output link 1590-0. Additionally, the last of eight wavelengths output from the first star coupler 1540-0 is sent to the last AWG multiplexer 1580-7 for inclusion on the last output link 1590-7. The last of eight wavelengths output from the last star coupler 1540-7 is sent to the first AWG multiplexer 1580-0 for inclusion on the first output link 1590-0 and the first of eight wavelengths output from the last star coupler 1540-7 is sent to the last AWG multiplexer 1580-7 for inclusion on the last output link 1590-7.

The above wavelength assignments may be understood in the context of the assignments of other wavelengths shown in the complete wavelength assignment matrix 1600 illustrated in FIG. 16. An element in the wavelength assignment matrix 1600 is denoted Λ(m, k), where m is an index for referring to one of the star couplers 1540 and k is an index for referring to one of the output links 1590.

Figure 17:
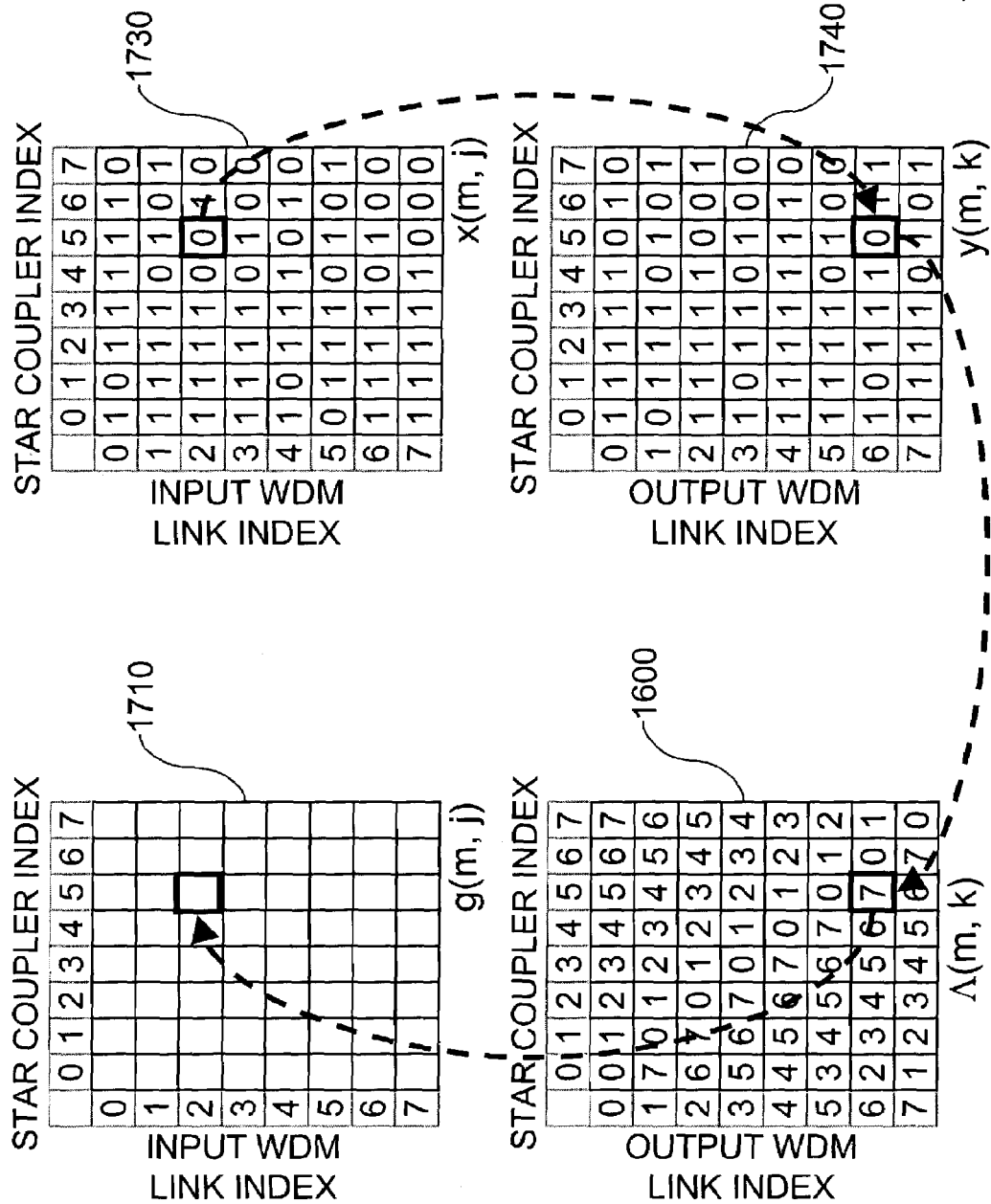
FIG. 17 illustrates a data structure used for wavelength-channel assignment in a switching node of the type of the switching node of FIG. 10 according to an embodiment of the present invention.

FIG. 17 illustrates a data structure used in scheduling the channel connectivity in a channel switch, as will be described below with reference to FIG. 19.

A traffic-dependent matrix 1710 is provided to contain traffic-dependent wavelength assignments for internal fiber links between the wavelength converters and the star couplers (see input internal fiber links 622, FIG. 6A). The information that is eventually contained by the traffic-dependent matrix 1710 is used by the node controller and spectral-translation module to control the wavelength converters. An element in the traffic-dependent matrix 1710 is denoted g(m, j), where m is an index for a star coupler and j is an index for an input WDM link.

The wavelength assignment matrix 1600 is provided to contain static wavelength assignments for the channels from the star couplers to the output links, as described earlier with reference to FIGS. 15 and 16.

A channel input state matrix 1730 is provided to contain an indication of the state, either free (0) or busy (1) of each channel from an input link to a star coupler. An element in the channel input state matrix 1730 is denoted x(m, j), where m and j have been defined hereinbefore and range from zero to N−1, where N is the number of wavelength channels per input link.

A channel output state matrix 1740 is provided to contain an indication of the state, either free (0) or busy (1) of each channel 662 (FIG. 6B) from a star coupler to an output fiber link. An element in the channel output state matrix 1740 is denoted y(m, k), where m and k have been defined hereinbefore and k ranges from zero to N−1.

Figure 18:
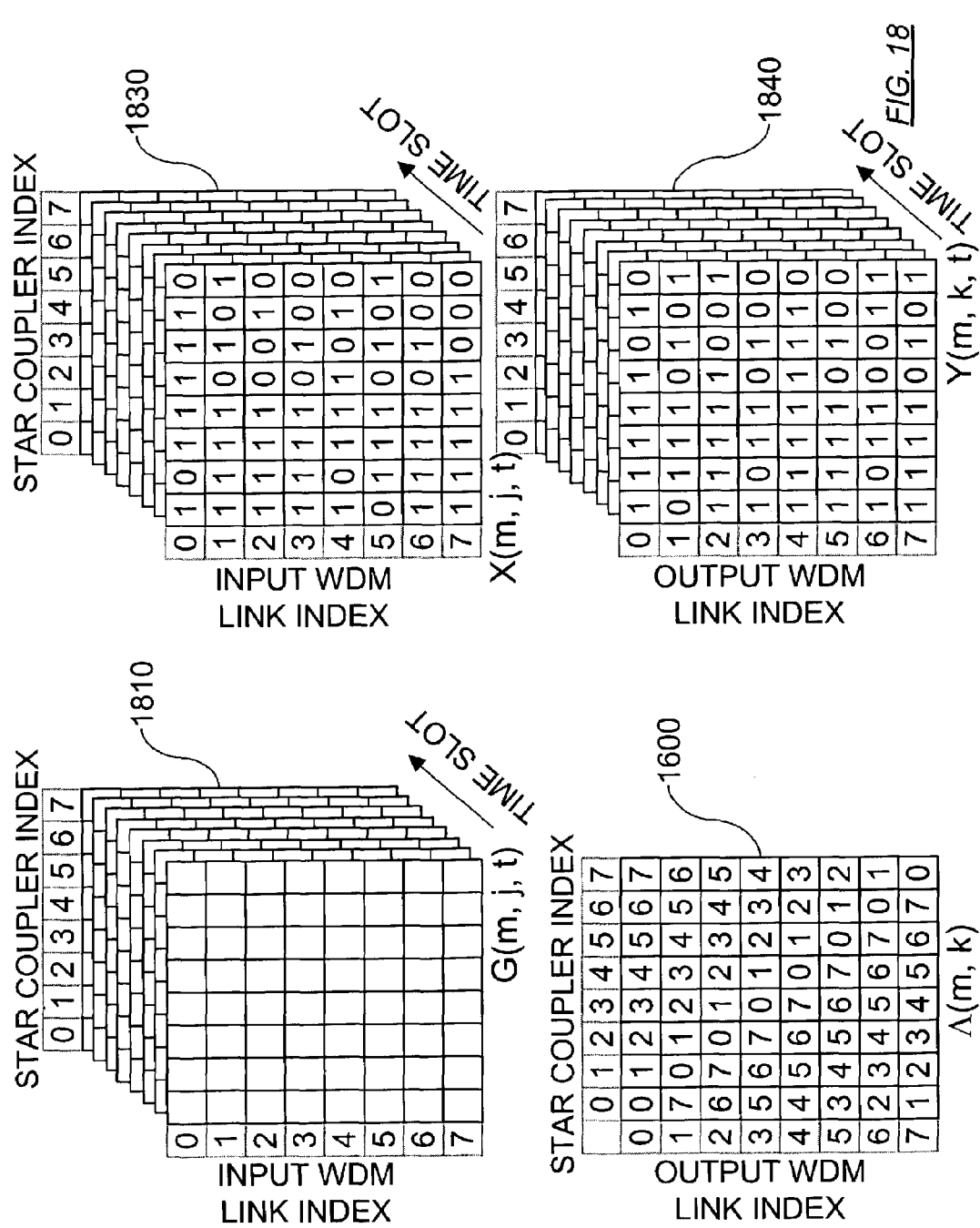
FIG. 18 illustrates a data structure used for time-slot assignment in a switching node of the type of the switching node of FIG. 10 according to an embodiment of the present invention.

FIG. 18 illustrates a data structure used in the scheduling process in an optical switching node operated in the TDM mode. The structure includes the wavelength assignment matrix 1600 (FIG. 16) which indicates the static assignment of wavelengths to output internal fiber links. There are S parallel TDM traffic-dependent matrices 1810, each corresponding to one of the S time slots per TDM frame. A given TDM traffic-dependent matrix 1810 contains traffic-dependent wavelength assignments on input internal fiber links for a given time slot in a TDM frame. There are also S parallel TDM input state matrices 1830 and S parallel TDM output state matrices 1840. The TDM input state matrices 1830 and TDM output state matrices 1840 are similar to the channel input state matrix 1730 and the channel output state matrix 1740, respectively, the only difference being that an entry in the TDM state matrices 1830, 1840 indicates a state (free/busy) of a channel during a time slot in a TDM frame while an entry in the channel state matrices 1730, 1740 indicates a state (free/busy) of a channel reserved over a continuous period of time. A channel reserved over a continuous period of time is hereinafter referenced as a continuous channel.

In a channel-switching mode, the switched capacity unit is a single channel. In a TDM-switching mode, the switched-capacity unit is a time slot in a TDM frame. In a unimodal switch, either channel switching or TDM switching is performed, and the switched capacity unit is either a channel or a time slot.

Figure 19:
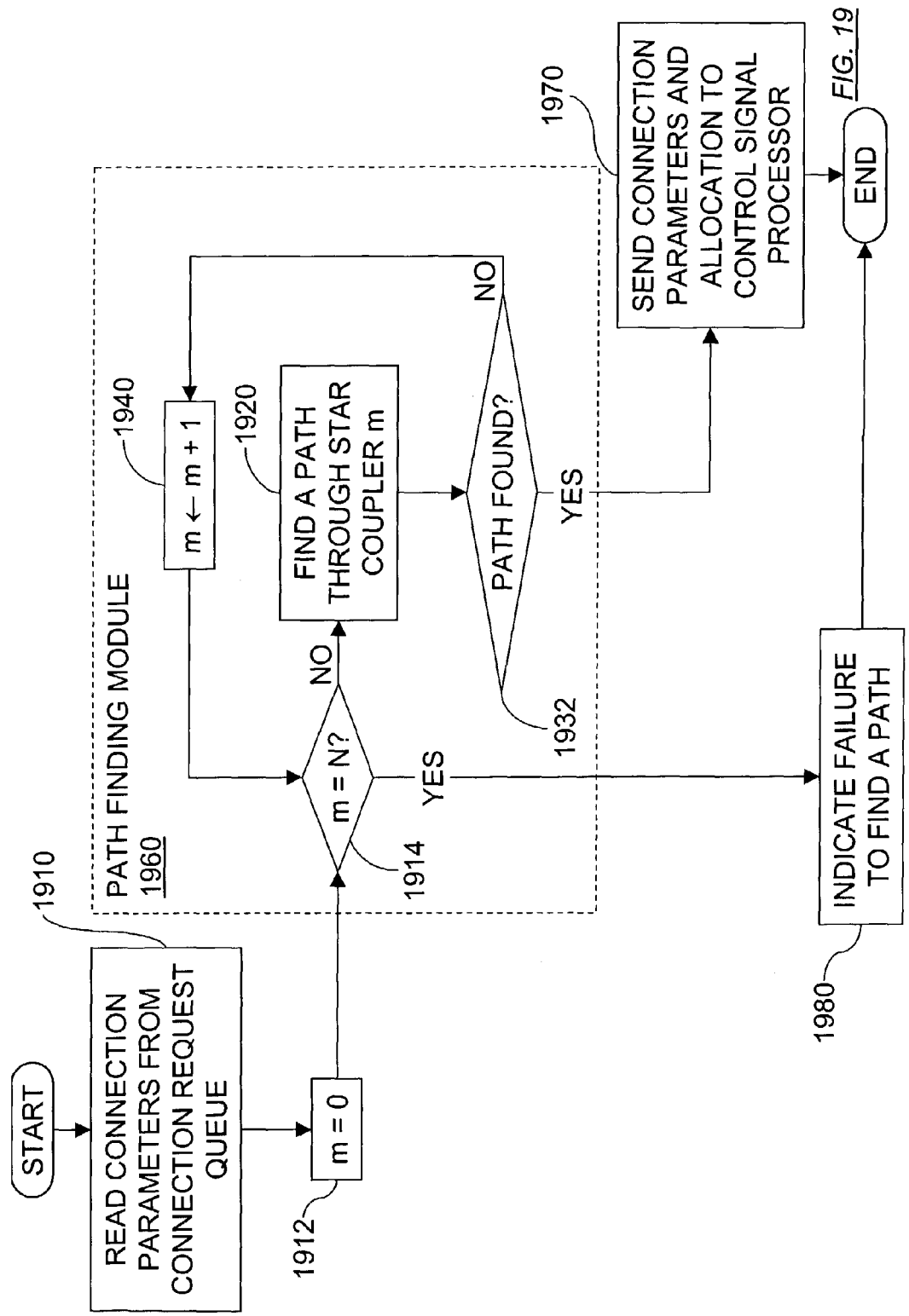
FIG. 19 is a flow chart illustrating the main steps of assigning connections in a switching node of the type of the switching node of FIG. 10 using a single path-finder processing circuit according to an embodiment of the present invention.

FIG. 19 is a flow chart illustrating the main steps of assigning connections in the scheduler 1212 (see FIG. 12) of an optical switching node in channel-switching mode or TDM-switching mode using a single path-finder processing circuit. Initially, the parameters of a connection request are read from a connection-request queue (step 1910) in the control signal queue 1210 (see FIG. 12). The parameters include an input-link index j, an output-link index k and a respective number, Q (j, k), of switched capacity units (channels and/or time slots per TDM frame). The value of Q (j, k) is less than or equal to N in channel-switching mode and is less than or equal to N×S in a TDM-switching mode, where S is the number of time slots per TDM frame.

There are as many candidate paths from an input link to an output link as there are star couplers. A path constitutes one channel in channel-switching mode or a number of time slots, less than or equal to S, in TDM-switching mode. In order to increase the throughput of an optical switching node, conventional connection packing is performed by examining candidate star couplers in a predetermined order. With unimodal connections, where the switched capacity unit is either a channel or a time slot, but not both, the path-finding process starts with the selection of an initial candidate star coupler. To this end, a star coupler index, m, is set to zero (step 1912). It is then determined whether all candidate star couplers have been considered (step 1914). This condition is seen to be met when the index of the star coupler to be considered reaches the number N of star couplers, noting that the star couplers are numbered from 0 to (N−1). Where it has been determined that all candidate star couplers have been considered, an indication of a failure to find a path is sent (step 1980) to the control signal processor 1202. Responsive to receiving such an indication, the control signal processor 1202 sends a rejection to the source of the connection request, indicating that a path across the optical switching node, having the required free capacity, was not found. Otherwise, i.e., where it has been determined that candidate star couplers remain to be considered, a path-finding process is implemented (step 1920). Alternatively, when all star couplers have been considered and the allocable capacity is less than the requested capacity, it may be decided to accept the connection. In any case, when a connection request is rejected, or an accepted connection is terminated, respective allocated resources are released and corresponding control data are updated in a conventional manner.

The path-finding process is a single "state comparison" in channel-switching mode. That is, it is first determined whether the input wavelength channel, in input link j, associated with said candidate star coupler is available. This determination is performed with the assistance of the channel input state matrix 1730 of FIG. 17. If that input wavelength channel is available in the candidate star coupler, it is then determined whether an output wavelength channel, in output link k, associated with said candidate star coupler is available. This determination is performed with the assistance of the channel output state matrix 1740 of FIG. 17. A path is considered to have been found in channel-switching mode where an input wavelength channel in input link j and an output wavelength channel in output link k are available for the candidate star coupler. The available input wavelength channel and the available output wavelength channel are then allocated to satisfy the connection request.

A connection may require several wavelength channels which may be allocated in more than one star coupler.

The path-finding process is a sequence of state comparisons in TDM-switching mode. That is, it is first determined whether the input wavelength channel, in input link j, associated with said candidate star coupler is available in an initial time slot. This determination is performed with the assistance of the TDM input state matrix 1830 of FIG. 18. If that input wavelength channel is available in the candidate star coupler, it is then determined whether an output wavelength channel, in output link k, associated with said candidate star coupler is available in the initial time slot. This determination is performed with the assistance of the TDM output state matrix 1840 of FIG. 18. Before a new candidate star coupler is selected, each of the time slots in the TDM frame is considered. A path is considered to have been found in TDM-switching mode where the input wavelength channel and the output wavelength channel are available in the candidate star coupler for enough, i.e., Q (j, k), time slots. The available time slots are then allocated to satisfy the connection request. The required number of time slots Q(j, k) for a connection may be allocated through more than one star coupler.

If more than one wavelength channel in an input link can be directed to a given star coupler, then more than one channel and/or more than S time slots can be allocated through the given star coupler for a connection, S being the number of time slots per TDM frame as indicated earlier.

It is then determined whether a path has been found (step 1932). If it is determined that a path has been found, the connection parameters, i.e., the respective allocations of wavelength channels or time slots, are reported (step 1970) to the control signal processor 1202. Responsive to receiving such connection parameters, the control signal processor 1202 sends the connection parameters to respective edge nodes and to the spectral-translation module. The allocations include specifications of wavelengths channels in the input internal fiber links (hence required wavelength bands at output of the wavelength converters). In a TDM node, the allocations also include time-slot identifiers.

Once either a failure to find a path has been indicated (step 1980) or connection parameters have been reported (step 1970), the connection assigning method of FIG. 19 is considered to be complete.

If it is determined (step 1932) that a path has not been found, the star coupler index m is increased by one (step 1940), thus pointing to a subsequent star coupler. If, after being increased by one, the star coupler index m reaches the value N, as determined in step 1914, then it may be considered that the allocation of a path through each star coupler has been attempted and the attempts have collectively failed to allocate the required capacity. As discussed hereinbefore, such a failure to allocate results in a rejection message being sent (step 1980) to a respective edge node. As described above, partial capacity allocation may be acceptable. If the value of m is determined, in step 1914, to be less than N, then an attempt is made to allocate a path through the subsequent star coupler (step 1920).

The path finding steps (1914, 1920, 1932, 1940) may be grouped together, as illustrated in FIG. 19, as one path finding module 1960 that either succeeds or fails to find an appropriate path.

Figure 20:
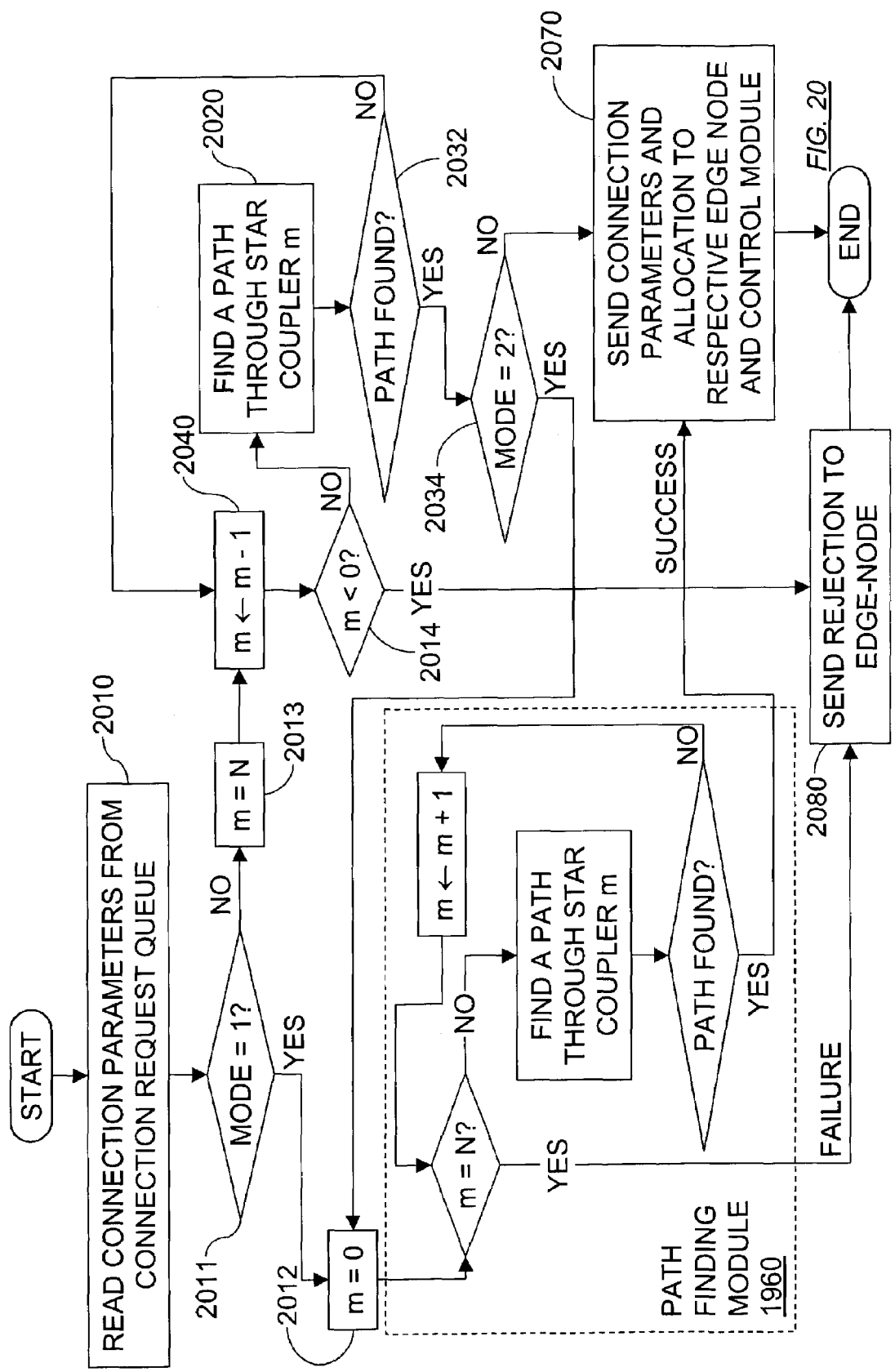
FIG. 20 is a flow chart illustrating the main steps of assigning both wavelength channels and time-slots within a wavelength channel in a switching node of the type of the switching node of FIG. 10 using a single path-finder processing circuit according to an embodiment of the present invention.

FIG. 20 extends the procedure of FIG. 19 to the case wherein an optical switching node may employ either of two switching modes, channel-switching mode and TDM-switching mode. As in the single mode case of FIG. 19, the parameters of a connection are initially read (step 2010) from a connection-request queue. The parameters include an index of an input link and an index of an output link as well as an indication of the number of switched capacity units (channels and/or time slots) required for the connection. A connection mode may also be associated with a connection request. As described earlier with reference to FIG. 13 and FIG. 14, a connection mode may take one of three values, 0, 1 or 2, where mode 0 indicates that the connection request is a channel switching request, mode 1 indicates that the connection request is a TDM-switching request and mode 2 indicates that both channels and time slots are required.

If the mode is determined (step 2011) to be mode 1, time-slot allocation is required and the path-finding process starts with the star coupler having an index, m, of zero (step 2012). The path finding module 1960 then proceeds to attempt to allocate time slots in the wavelength channels related to the input link and the output link and the candidate star coupler, with either success or failure being the result. In the case of failure, an indication of the failure to find a path is sent (step 2080) to the control signal processor 1202. Responsive to receiving such an indication, the control signal processor 1202 sends a rejection to the edge node that generated the connection request. In the case of success, the connection parameters, i.e., the respective allocations of wavelength channels or time slots, are reported (step 2070) to the control signal processor 1202. Responsive to receiving such connection parameters, the control signal processor 1202 sends the connection parameters to respective edge nodes and to the spectral-translation module. Once the parameters have been reported or the failure has been indicated, the method is complete.

If the mode is determined (step 2011) not to be mode 1, then at least channel allocation is required. Channel allocation is attempted starting with the star coupler having the greatest index, (N−1), and proceeds towards the star coupler having the least index, 0. This order is implemented by initially setting the star coupler index m, to N (step 2013) and subsequently subtracting one from the index (step 2040). After the subtraction, if m is less than zero, the attempt to find a channel has failed and an indication of the failure to find a path is sent (step 2080) to the control signal processor 1202. Responsive to receiving such an indication, the control signal processor 1202 sends a rejection to the edge node that was the source of the connection request.

If, after the subtraction, m is greater than zero, a channel switching mode path-finding process is implemented (step 2020). If the path-finding process of step 2020 is determined (step 2032) to have been a success, and the mode is determined (step 2034) to be other than 2 (i.e., the mode is 0), the connection parameters are reported (step 2070) to the control signal processor 1202. Responsive to receiving such connection parameters, the control signal processor 1202 sends the connection parameters to respective edge nodes and to the spectral-translation module. If the path-finding process is determined (step 2032) to have been a failure, the value of the star coupler index is reduced by 1 (step 2040).

If the path-finding process is determined (step 2032) to have been a failure and, after the subtraction, if m is less than zero, the attempt to find a channel has failed and an indication of the failure to find a path is sent (step 2080) to the control signal processor 1202. Responsive to receiving such an indication, the control signal processor 1202 sends a rejection to the edge node that was the source of the connection request.

If the path-finding process is determined (step 2032) to have been a success, and the mode is determined (step 2034) to be mode 2, the star coupler index is initialized to zero (step 2012). Recall that, where the mode is indicated as mode 2, both channel allocation and time-slot allocation are required.

Subsequent to the initializing, the path finding module 1960 then proceeds to attempt to find available time slots with either success or failure being the result. In the case of failure, an indication of the failure to find a path is sent (step 2080) to the control signal processor 1202. Responsive to receiving such an indication, the control signal processor 1202 sends a rejection to the edge node that was the source of the connection request.

In the case of success, the connection parameters are reported (step 2070) to the control signal processor 1202. Responsive to receiving such connection parameters, the control signal processor 1202 sends the connection parameters to respective edge nodes and to the spectral-translation module. Once the parameters have been reported or the failure has been indicated, the method is complete.

In review, where the mode equals 2, channel allocation is attempted first, starting with consideration of star coupler (N−1) and proceeding towards consideration of star coupler 0. If the channel allocation is successful, then time-slot allocation follows, starting with consideration of star coupler 0 and proceeding towards consideration of star coupler (N−1).

Figure 21A:
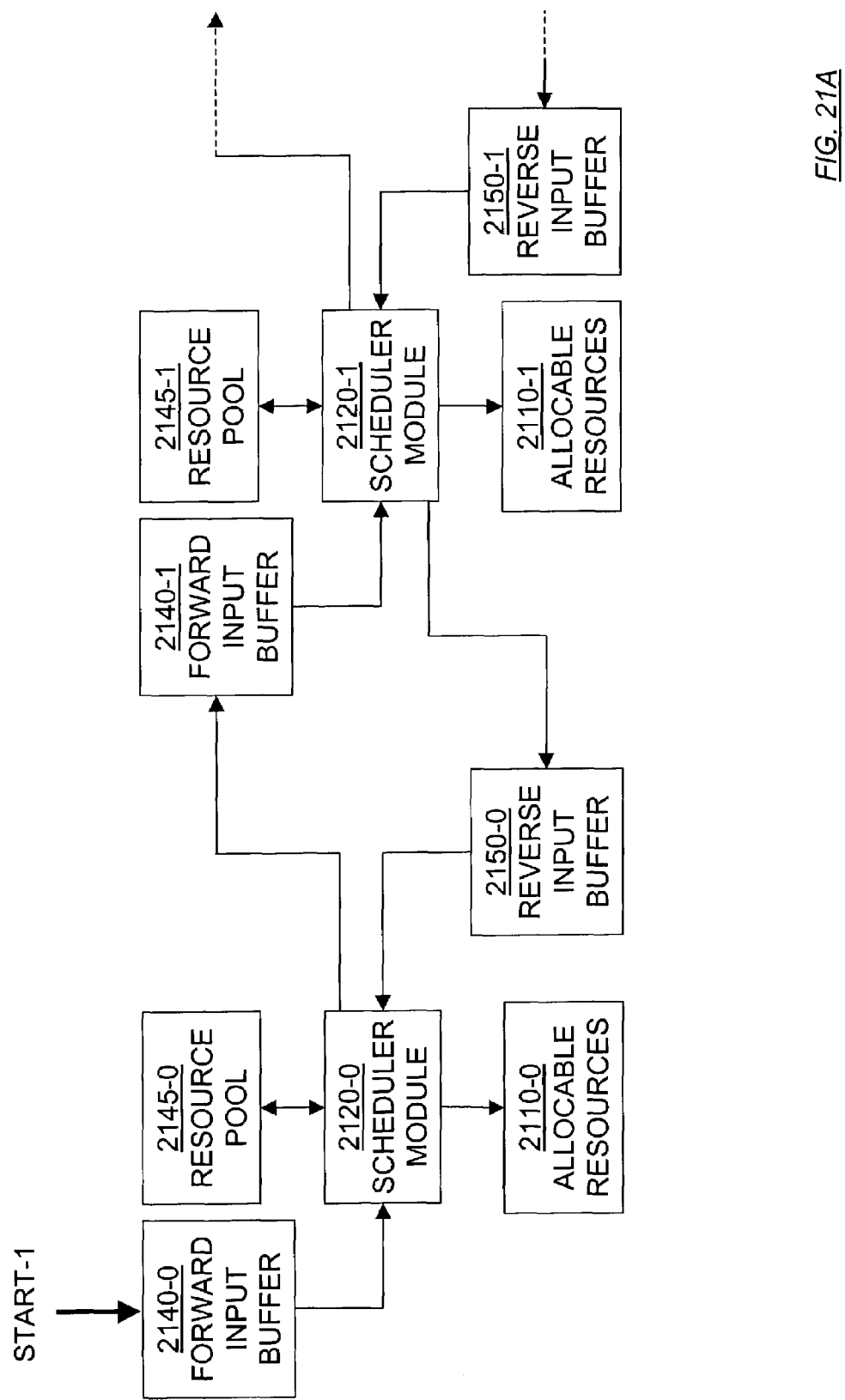
FIG. 21A illustrates a first portion of a generic high-speed scheduler according to an embodiment of the present invention.
Figure 21B:
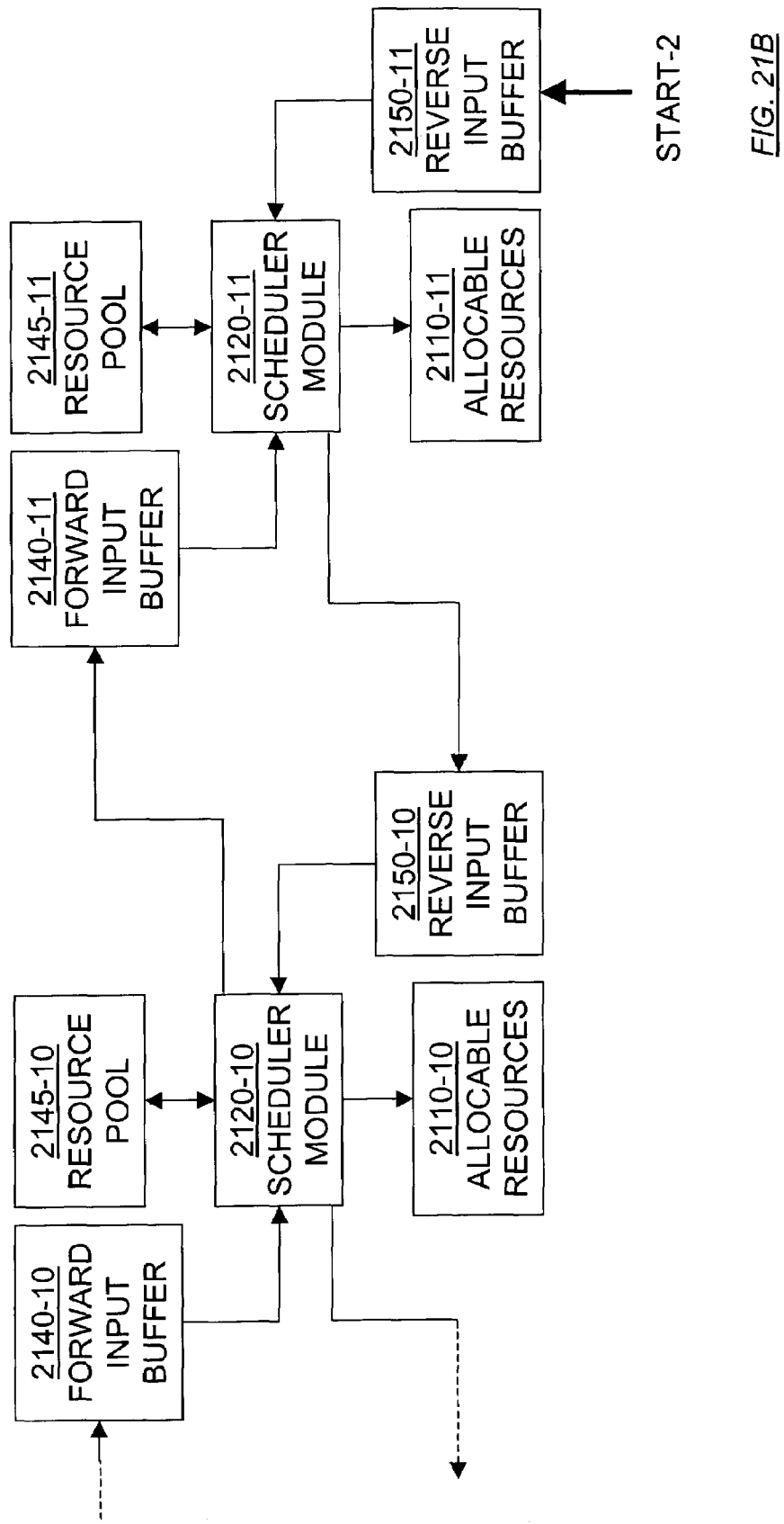
FIG. 21B illustrates a second portion of the generic high-speed scheduler of FIG. 21A according to an embodiment of the present invention.

FIGS. 21A and 21B illustrate first and second end portions of an exemplary generic high-speed scheduler respectively. The exemplary generic high-speed scheduler includes twelve scheduler modules 2120-0, 2120-1, ..., 2120-10, 2120-11 (individually or collectively 2120). Each scheduler module 2120 is associated with four corresponding components. The components include forward input buffers 2140-0, 2140-1, ..., 2140-10, 2140-11 (individually or collectively 2140) for receiving connection requests that are in consideration of star coupler 0 first. The components also include reverse input buffers 2150-0, 2150-1, ..., 2150-10, 2150-11 (individually or collectively 2150) for receiving connection requests that are in consideration of star coupler 11 first. The components further include resource pools 2145-0, 2145-1, ..., 2145-10, 2145-11 (individually or collectively 2145). The components additionally include storage for allocable resources 2110-0, 2110-1, ..., 2110-10, 2110-11 (individually or collectively 2110) as the allocable resources determined by the scheduler modules 2120.

FIG. 22 presents a unimodal TDM histogram 2202 illustrating normalized occupancy of 12 star couplers in an exemplary unimodal optical switching node of the sort illustrated in FIG. 10. In particular, the node controller (see the node controller 1050 of FIG. 10) of the exemplary optical switching node is considered to have a scheduler (see the scheduler 1212 of FIG. 12) including a pipeline of scheduler modules 2120 as illustrated in FIGS. 21A and 21B. The exemplary optical switching node is unimodal, only TDM switching is scheduled. The unimodal TDM histogram 2202 shows the occupancy to be monotone and decreasing as the star coupler index increases. Such a pattern is realized when connection requests arrive at a scheduler module 2120-0 associated with star coupler 0 and progress towards a scheduler module 2120-11 associated with star coupler 11.

FIG. 22 also presents a unimodal channel histogram 2204 illustrating normalized occupancy of 12 star couplers in an exemplary unimodal optical switching node of the sort illustrated in FIG. 8. In particular, the node controller (see the node controller 850 of FIG. 8) of the exemplary optical switching node is considered to have a scheduler (see the scheduler 1212 of FIG. 12) including a pipeline of scheduler modules 2120 as illustrated in FIGS. 21A and 21B. The exemplary optical switching node is unimodal, only channel switching is scheduled. The unimodal channel histogram 2204 shows the occupancy to be monotone and increasing as the star coupler index increases. Such a pattern is realized when connection requests arrive at a scheduler module 2120-11 associated with star coupler 11 and progress towards a scheduler module 2120-0 associated with star coupler 0.

Figure 23:
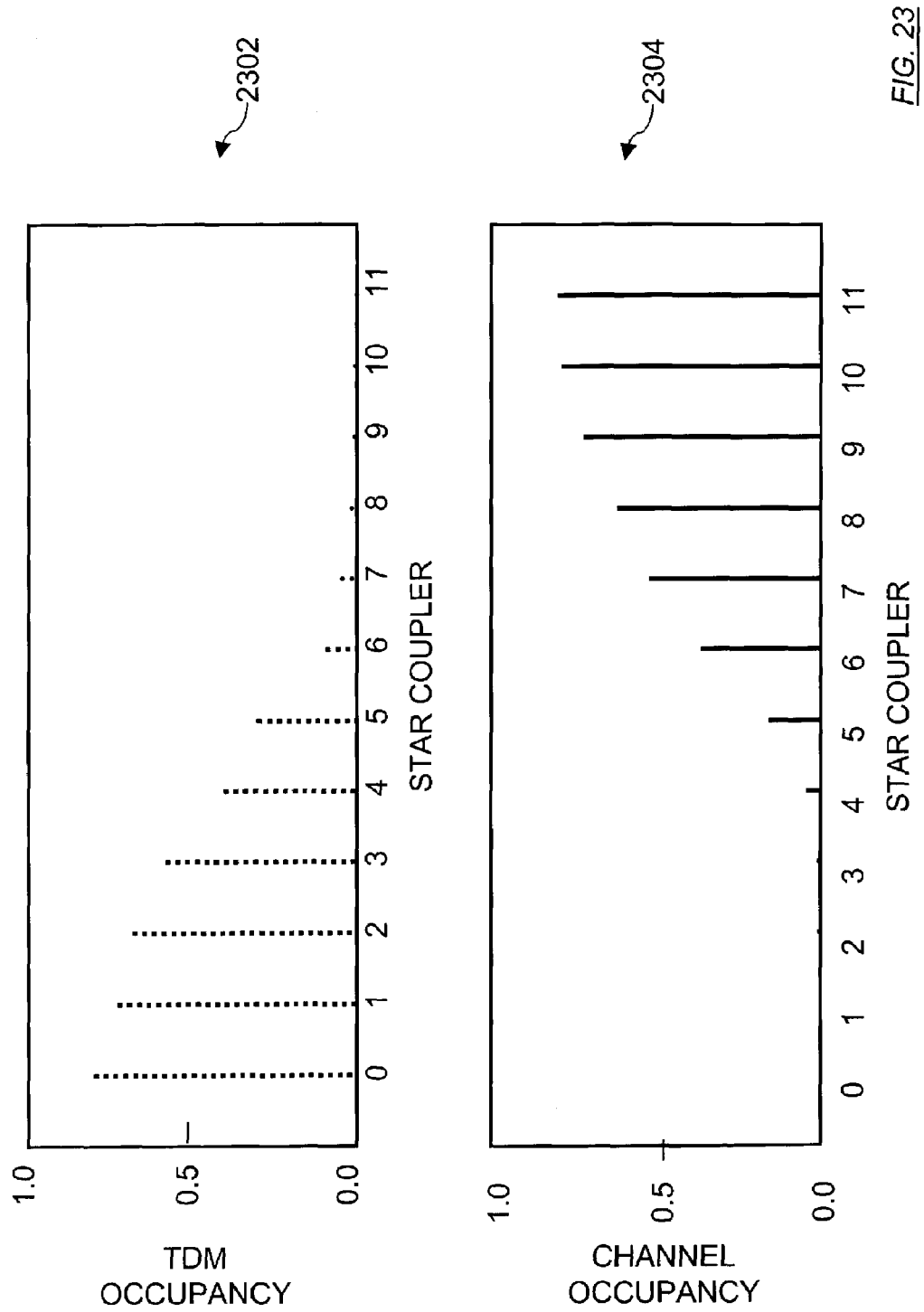
FIG. 23 illustrates separate bimodal occupancy histograms of exemplary star couplers in an exemplary bimodal optical switching node.

FIG. 23 presents a TDM-occupancy histogram 2302, in a bimodal optical switching node, illustrating normalized occupancy of 12 star couplers in an exemplary bimodal optical switching node of the sort illustrated in FIG. 10. In particular, the node controller (see the node controller 1050 of FIG. 10) of the exemplary optical switching node is considered to have a scheduler (see the scheduler 1212 of FIG. 12) including a pipeline of scheduler modules 2120 as illustrated in FIGS. 21A and 21B. The exemplary optical switching node is bimodal, that is, both TDM switching and channel switching are scheduled.

TDM switching connection requests are arranged to arrive at a scheduler module 2120-0 associated with star coupler 0 and progress towards a scheduler module 2120-11 associated with star coupler 11 while channel switching connection requests arrive at a scheduler module 2120-11 associated with star coupler 11 and progress towards a scheduler module 2120-0 associated with star coupler 0. As such, as TDM switching connection requests reach higher-index star couplers, scheduled channel switching events tend to exclude use of scheduled channels for the scheduling of TDM switching. Consequently, the bimodal TDM histogram 2302 of FIG. 23 is monotone decreasing, like the unimodal TDM histogram 2202 of FIG. 22. However, the magnitude of the gradient in the bimodal TDM histogram 2302 is greater than the gradient in unimodal TDM histogram 2202. Similarly, a bimodal channel histogram 2304 in FIG. 23 is monotone increasing, like the unimodal channel histogram 2204 of FIG. 22. However, the gradient in the bimodal channel histogram 2304 is greater than the gradient in unimodal channel histogram 2204.

Figure 24:
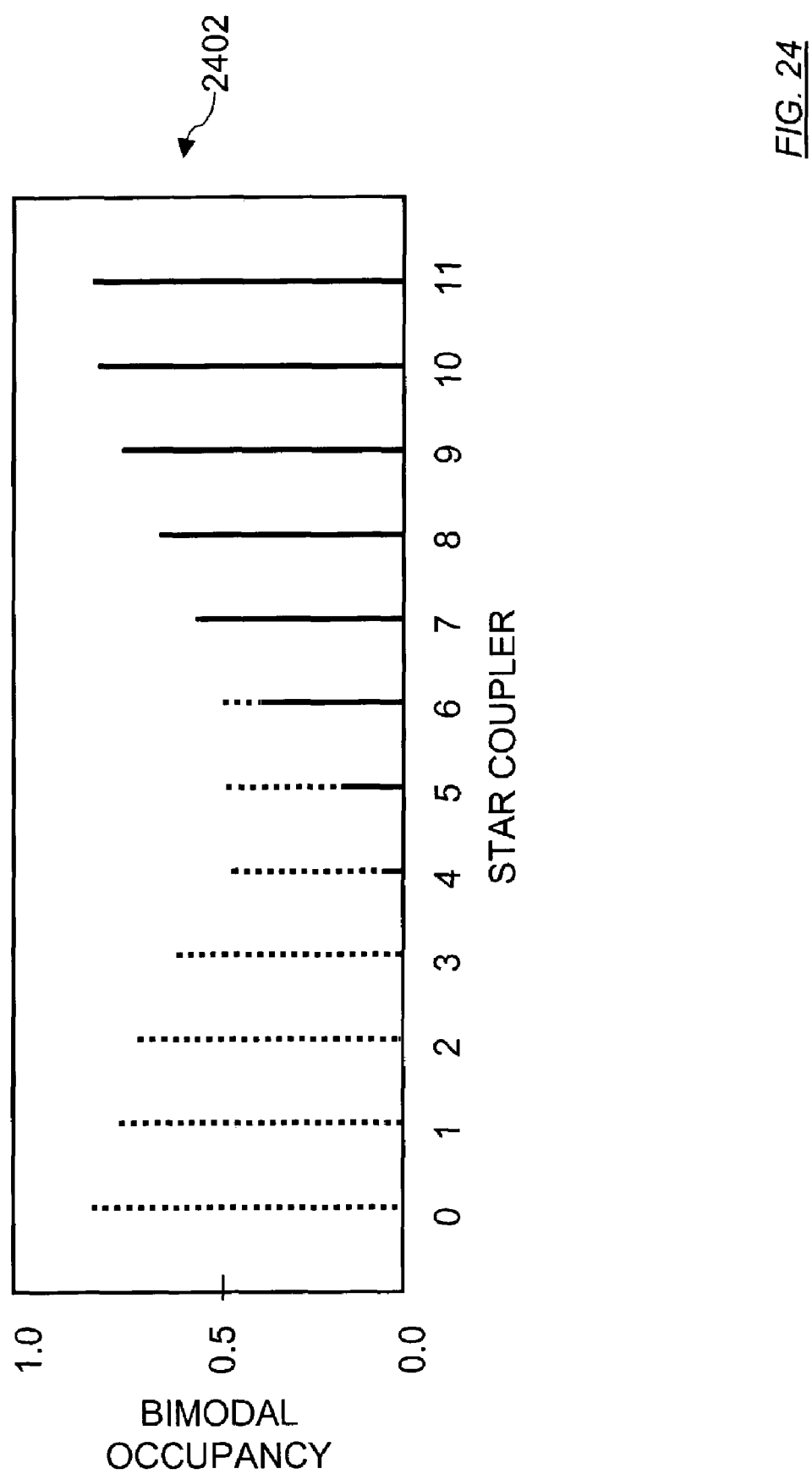
FIG. 24 illustrates a combined bimodal occupancy histogram combining the bimodal histograms of FIG. 23.

FIG. 24 illustrates a combined bimodal occupancy histogram 2402 combining the bimodal TDM histogram 2302 and the bimodal channel histogram 2304 of FIG. 23. Notably, the total occupancy of the exemplary bimodal optical switching node may be shown to be greater than either the exemplary unimodal optical TDM switching node or the exemplary unimodal optical channel switching node whose histograms are illustrated in FIG. 22.

FIGS. 22, 23 and 24 relate to a process of traversing the scheduler modules 2120 in an ascending order, left- to right, of star-coupler labels for time-slot switching and in a descending order, right to left, for channel switching. The order of traversing the scheduler module can be interchanged for the time-switching and channelswitching modes.

Figure 25:
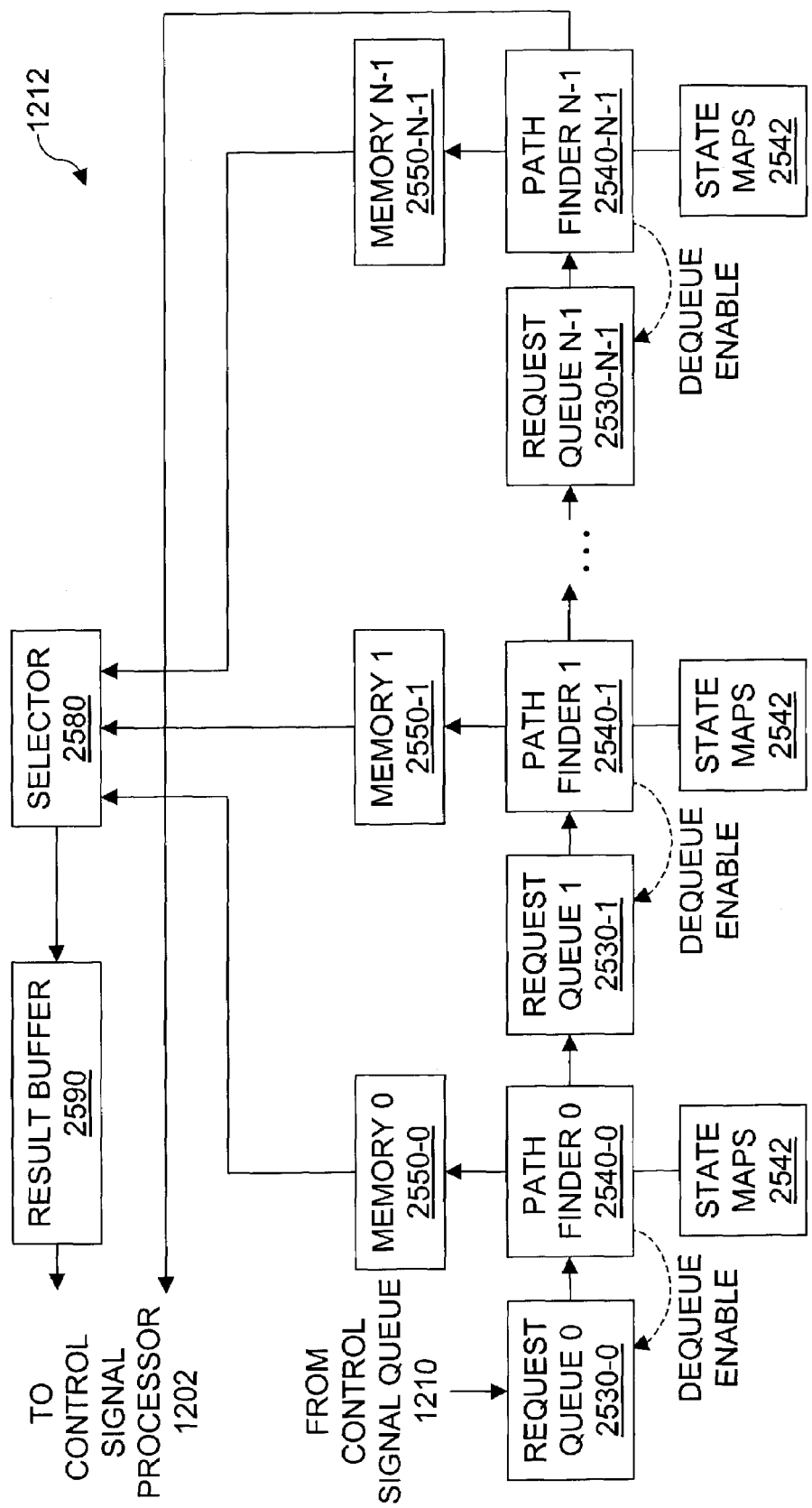
FIG. 25 illustrates a scheduler comprising multiple path-finder processing circuits, in a controller of a switching node of the type of the switching node of FIG. 10, arranged in a pipeline structure according to an embodiment of the present invention.

FIG. 25 illustrates an exemplary pipelined hardware implementation of times-lot allocation in the scheduler 1212 of FIG. 12. The exemplary pipelined hardware implementation partially follows the pattern established in FIGS. 21A and 21B while leaving out an equivalent to the reverse input buffer 2150. Path-finder processing circuits 2540-0, 2540-1, ..., 2540-(N−1) (collectively or individually 2540) are provided, in a one-to-one correspondence with the N star couplers. Storing connection requests until each stored connection request is processed by a path-finder processing circuit 2540 are a set of corresponding connection request queues 2530-0, 2530-1, ..., 2530-(N−1) (collectively or individually 2530). The state maps of FIGS. 17 and 18 may be stored in state map memories 2542 corresponding to each of the path-finder processing circuits 2540. Also associated with each of the path-finder processing circuits 2540 is a memory 2550-0, 2550-1, ..., 2550-(N−1) (collectively or individually 2550), for storing connection parameters generated as a result of successful path finding. A selector 2580 is provided for cycling through the memories 2550 to transmit connection parameters to a result buffer 2590.

Hereinafter, the star coupler associated with the leftmost path-finder processing circuit 2540-0 is referenced as the 'first star coupler' and the star coupler associated with the right-most path-finder processing circuit 2540-(N−1) is referenced as the 'last star coupler'.

In operation, connection requests are received at the first connection request queue 2530-0 from the control signal queue 1210 of FIG. 12. The first path-finder processing circuit 2540-0 sends a "dequeue enable" signal to the first connection request queue 2530-0 to prompt the first connection request queue 2530-0 to transmit a connection request. Processing at the first path-finder processing circuit 2540-0 is outlined in FIG. 26. The first path-finder processing circuit 2540-0 receives the connection parameters of the connection request (step 2610). The parameters of a connection request include an input link index, j, an output link index, k, and a required number, Q(j, k), of time slots. If the required number of time slots for the connection exceeds the number, S, of time slots per TDM frame, the connection request may be divided into a number of connection requests, each requiring at most S time slots per TDM frame.

The first path-finder processing circuit 2540-0 then attempts to find a path through the associated star coupler (1040-0) (step 2620). If it is determined (step 2624) that the first path-finder processing circuit 2540-0 has succeeded in finding (allocating) a path to satisfy the connection request, the path description is stored in the associated memory 2550-0 (step 2628). Note that, in TDM-switching mode, the path may require several time slots per TDM frame. If it is determined (step 2624) that the first path-finder processing circuit 2540-0 has failed to find a path to satisfy the connection request and it is determined that the star coupler under consideration is not the last star coupler to be considered (step 2630), the connection request parameters, possibly with reduced capacity-allocation requirements, are placed in the subsequent connection request queue 2530-1 (step 2650) to be processed by the subsequent path-finder processing circuit 2540-1 associated with the subsequent star coupler (1040-1).

Once the path description is stored or the connection request parameters are placed in the subsequent connection request queue 2530, the processing in the first path finder is complete and the first path-finder processing circuit 2540-0 may send another "dequeue enable" signal to the first connection request queue 2530-0 to receive another connection request.

In the meantime, the subsequent path-finder processing circuit 2540-1 may be sending "dequeue enable" signal to the subsequent connection request queue 2530-1 to receive a connection request. The subsequent path-finder processing circuit 2540-1 may then process the connection request according to the steps of FIG. 26.

The process may continue to attempt to allocate resources to satisfy the connection request at succeeding scheduler modules. If the connection request is not fully satisfied after processing in a given scheduler module, an internal scheduling request specifying an amount of resources yet to be allocated is passed from the given scheduler module to a succeeding scheduler module, if any. Upon completion of an allocation process in any scheduler module, a "dequeue enable" signal is sent to a respective request queue 2530 as described earlier.

Where the last path-finder processing circuit 2540-N-1 fails to find a path to satisfy a given connection request, there is no subsequent queue in which to place the connection request parameters. Instead, once it is determined that the star coupler under consideration is the last star coupler to be considered (step 2630), the last path-finder processing circuit 2540-N-1 indicates, to the control signal processor 1202 of FIG. 12, a failure to find a path (step 2640) to satisfy the connection request. Responsive to receiving such an indication, the control signal processor 1202 sends a rejection to the edge node that generated the connection request.

The rejection indicates that a path could not be found to satisfy the connection request. It is understood that connection requests will include a connection-request identifier so that the edge node receiving a rejection can identify the connection request that is being rejected and, perhaps, accept a partial allocation or re-generate the connection request.

The selector 2580 cyclically visits the memories 2550 and dequeues path descriptions, if any, into the result buffer 2590. Individual path descriptions in the result buffer 2590 are transferred to the edge nodes that generated the associated connection requests. Additionally, the path descriptions in the result buffer 2590 are transferred to the spectral-translation module which controls the wavelength converters.

Figure 26:
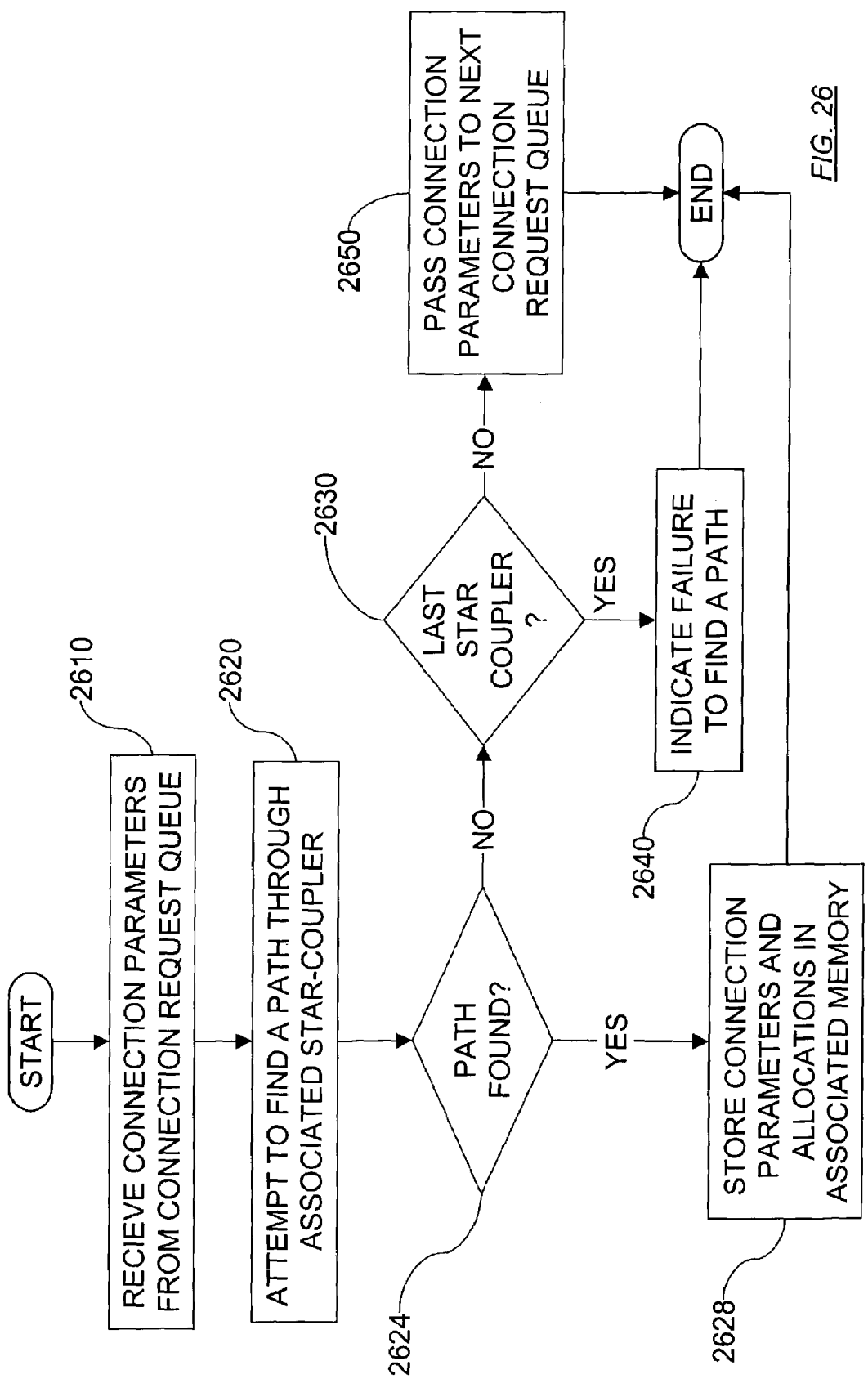
FIG. 26 is a flow chart illustrating the main steps of a method of path finding executed at one of the path-finder processing circuits of FIG. 25.

The main reason for using the pipelined process discussed in conjunction with FIGS. 25 and 26, rather than other, concurrent, processing techniques, is to pack the connections to increase the probability of finding a path. Notably, this use of multiple pipelined path-finding processing circuits is contemplated as most necessary when the optical switching node employs bimodal channel and TDM-switching. Multiple path-finding processing circuits may also be required in an optical switching node that employs a burst-switching mode, where the required processing effort is even higher than that of TDM-switching mode. A burst-switching mode is not, however, considered in this disclosure.

Figure 27:
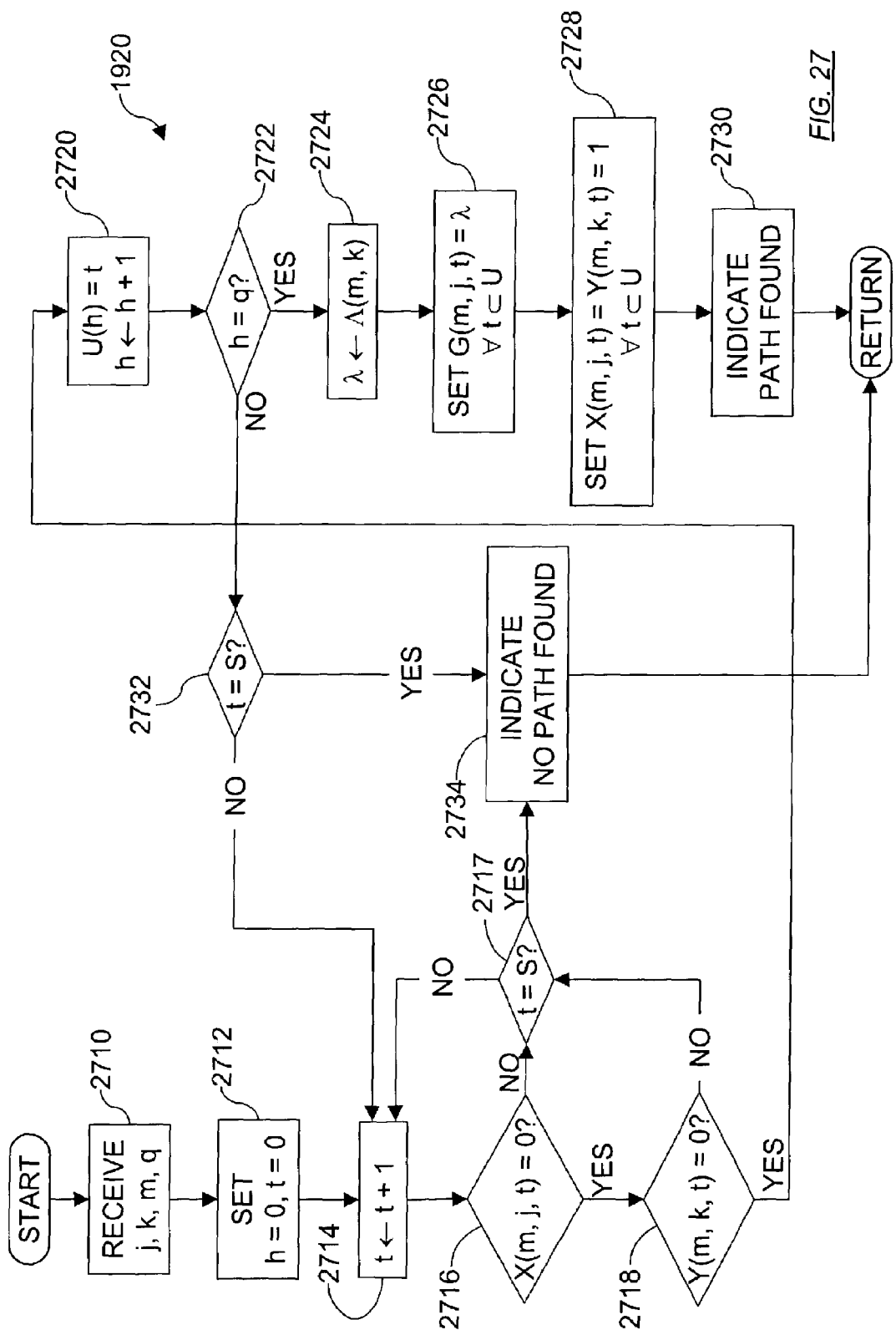
FIG. 27 is a flow chart illustrating details of a step of the flow chart of FIG. 26 concerned with assigning time slots.

FIG. 27 illustrates steps followed in path finding processing in TDM-switching mode, i.e., time-slot allocation in a path through a star coupler, for the path-finder processing circuit as indicated in steps 1920, 2020 and 2620 of FIGS. 19, 20 and 26, respectively. Notably, the star coupler index, m, is constant for the entirety of the method of FIG. 27. The star coupler index, m, is either set explicitly, as in the methods of FIGS. 19 and 20, or is associated directly with the processor as in the method of FIG. 26.

Connection-request parameters j, k, m, and q are initially received (step 2710) from a connection request queue, where j is an input link index, k is an output link index, m is a star coupler index and q (q=Q (j, k)) is the number of time slots to be allocated in a path from input link j to output link k through star coupler m. An allocation index h, to be used for counting the number of successful time-slot matching attempts, and a time-slot index t, are then initialized to zero (step 2712). An indication of whether a respective channel is entirely assigned to a connection or is entirely available for allocation to a connection may be associated with the TDM input state matrix 1830 and the TDM output state matrix 1840 (see FIG. 18). This facilitates combined channel and time-slot switching.

The time-slot index t is then increased by one (step 2714). It is then determined (step 2716) whether the input link having index j is free for the star coupler having index m in the time-slot having index t. To make this determination, the entry in the TDM input state matrix X(m, j, t) corresponding to the star coupler m, input link j and time-slot index t is examined. If the input link is free for the time-slot under consideration, it is then determined (step 2718) whether the output link having index k is free for the star coupler having index m in the time-slot having index t. To make this determination, the entry in the TDM output state matrix Y(m, k, t) corresponding to the star coupler m, output link k and time-slot index t is examined.

If the output link is also free for the time-slot under consideration, the time-slot having index t is tentatively allocated. To confirm this allocation the index t is placed in an entry U(h) in an allocation array U and the allocation index h is increased (step 2720). The allocation is considered only tentative because the connection request may demand that the entire number of requested time slots be allocated, which can not be guaranteed before processing is complete.

A connection request may be considered to be satisfied if all q time slots can be allocated. The number of allocated time slots is equivalent to the current value of the allocation index, h. If it is determined (step 2722) that enough time slots have been allocated to satisfy the connection request (i.e., h=q), the particular wavelength, $\lambda$, required at the output of a wavelength converter corresponding to an input internal fiber channel connecting input link j to star coupler m is then determined (step 2724) from the static wavelength assignment matrix 1600.

Indications of the particular wavelength are then placed in the TDM traffic-dependent matrix G(m, j, t) for the star coupler m, input link index j and for each allocated time slot in U (step 2726). Additionally, the TDM input state matrix X(m, j, t) and the TDM output state matrix Y(m, k, t) are updated to show a busy state for each allocated time slot in U (step 2728). Success in satisfying the connection request is then indicated (step 2730) and the processing is complete.

If either the input link or the output link is found (step 2716 or 2718) to be busy for the time-slot under consideration, it is determined whether all time slots in the TDM frame have been considered (step 2717). That is, it is determined whether t=S, where S is the number of time slots per TDM frame. If the time-slot index has not yet reached S, the time slot index is increased (step 2714) and the state of the input link and the output link is considered for the new time slot (step 2716 or 2718). If the time-slot index has reached S, failure to satisfy the connection request is indicated (step 2734) and the processing is complete. Note that the value of t varies between 0 and (S−1); $0 \leq t < S$.

If it is determined (step 2722) that insufficient time slots have been allocated to satisfy the connection request (i.e., h<q), it is determined whether all time slots in the TDM frame have been considered (step 2732). If the time-slot index has not yet reached S, the time slot index is increased (step 2714) and the states of the input link and the output link are considered for the new time slot (step 2716 or 2718). If the time-slot index has reached S, failure to satisfy the connection request is indicated (step 2734) and the processing is complete. Note that step 2732 is preceded by step 2722 which has already indicated that h is less than q; the value of h can not exceed q.

If the attempt to satisfy the connection request fails and the number of allocated time slots, h, is greater than zero, the entries in the TDM input state matrix X(m, j, t) and the TDM output state matrix Y(m, k, t) corresponding to the allocated time slots are restored to a free state.

In a bimodal pipelined implementation of a scheduler comprising a plurality of scheduler modules, in accordance with the present invention, scheduling requests of a first type are processed by the plurality of scheduler modules in a first predetermined order and scheduling requests of a second type are processed by the plurality of scheduler modules in a second predetermined order. Preferably, the second predetermined order is the reverse of the first predetermined order. Thus, the first scheduler module to be considered for a connection request of the first type would be the last scheduler module to be considered for a connection request of the second type, and vice versa. With identical scheduler modules, the scheduler modules would be numbered sequentially and the predetermined order would be a sequential order. A connection request of the first type may be a connection requesting an integer number of time slots per TDM frame and a connection request of the second type may be a connection requesting an integer number of channels. A switching node accepting both time-slot switching and channeling switching is said to be a bimodal switching node with a mode of switching associated with a type of connection requests.

Figure 28:
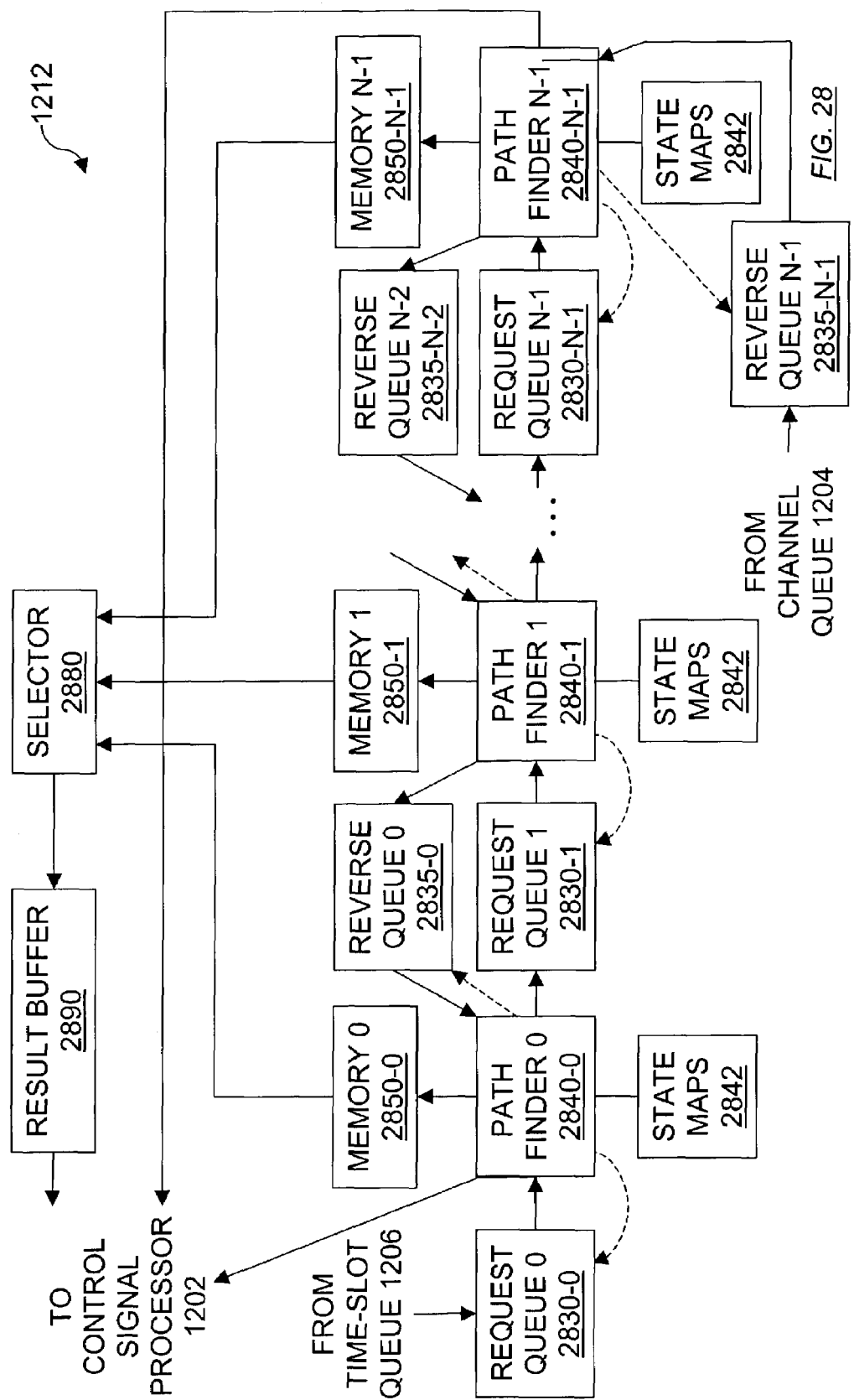
FIG. 28 illustrates a dual pipelined implementation in a switching node in which channel-switching and TDM switching coexist according to an embodiment of the present invention.

FIG. 28 illustrates a bimodal pipelined implementation for a scheduler in which connection requests specifying channel-switching mode and TDM-switching mode are processed simultaneously. Such an implementation naturally results in a type of connection packing wherein TDM-switching connections are prone to be satisfied by star couplers with low index values and channel-switching connections are prone to be satisfied by star couplers with high index values.

There is a one-to-one correspondence between a path-finder processing circuit 2840 and one of the star couplers. Hereinafter, the star coupler associated with the leftmost path-finder processing circuit 2840-0 is referenced as the 'first star coupler' and the star coupler associated with the right-most path-finder processing circuit 2840-(N−1) is referenced as the 'last star coupler'. Each of the star couplers may be used for combining continuous and time-slotted optical signals and, in conjunction with wavelength converters and a wavelength demultiplexer, functions as a switching unit as described with reference to FIGS. 1A, 1B, 6A, and 6B. In a bimodal switching mode, path-finder processing circuits 2840 are traversed from left to right in the process of scheduling time slots for a connection request and from right to left in the process of scheduling continuous channels for a connection request; this order is optional and may be reversed. Hereinafter, when a star coupler is considered for switching a signal during a time slot, it is referenced as a 'time-slots-witching' star coupler and when a star coupler is considered for switching a continuous signal, it is referenced as a 'channel-switching' star coupler. Any star coupler may be considered for switching both time-slotted and continuous signals, thus functioning as a 'time-slot-switching' and a 'channel-switching' star coupler.

Path-finder processing circuits 2840-0, 2840-1, . . . , 2840-N−1 (collectively or individually 2840) are provided, in a one-to-one correspondence with the N star couplers. Storing time-slot-based connection requests until a connection request is required by a path-finder processing circuit 2840 are a set of corresponding connection request queues 2830-0, 2830-1, . . . , 2830-N−1 (collectively or individually 2830). The state maps of FIGS. 17 and 18 may be stored in a state map memory 2842 associated with each of the path-finder processing circuits 2840. Also associated with path-finder processing circuits 2840 are memories 2850-0, 2850-1, . . . , 2850-N−1 (collectively or individually 2850), for storing connection parameters generated as a result of successful path finding. A selector 2880 is provided for cycling through the memories 2850 to transmit connection parameters to a result buffer 2890.

In addition to the connection request queues 2830, there is provided a set of reverse queues 2835-0, 2835-1, . . . , 2835-N−1 (collectively or individually 2835) corresponding to the path-finder processing circuits 2840.

In operation, TDM-switching mode connection requests are received at the first connection request queue 2830-0 from the time-slot queue 1206 of FIG. 12. The first path-finder processing circuit 2840-0 sends a "dequeue enable" signal to the first connection request queue 2830-0 to prompt the first connection request queue 2830-0 to transmit a connection request, if at least one connection request is waiting. Processing at the first path-finder processing circuit 2840-0 then proceeds as outlined in FIG. 26 with an initial step defined by the first path-finder processing circuit 2840-0 receiving the connection parameters of the TDM-switching mode connection request (step 2610).

The first path-finder processing circuit 2840-0 then attempts to find a path through the associated star coupler (0) (step 2620). If it is determined (step 2624) that the first path-finder processing circuit 2840-0 has succeeded in finding (allocating) a path to satisfy the connection request, the path description is stored in the associated memory 2850-0 (step 2628). The path description includes the description of resources allocable by the processing circuit 2840-0. Note that, in TDM-switching mode, the path may require several time slots per TDM frame. If it is determined (step 2624) that the first path-finder processing circuit 2840-0 has failed to find a path to satisfy the connection request and it is determined that the star coupler under consideration is not the last star coupler to be considered (step 2630), the connection request parameters are placed in the subsequent connection request queue 2830-1 (step 2650) to be processed by the subsequent path-finder processing circuit 2840-1 associated with the subsequent star coupler 1040-1.

Once the path description is stored or the connection request parameters are placed in the subsequent connection request queue 2830, the processing is complete and the first path-finder processing circuit 2840-0 may send another "dequeue enable" signal to the first connection request queue 2830-0 to receive another connection request. In the meantime, the subsequent path-finder processing circuit 2840-1 may be sending "dequeue enable" signal to the subsequent connection request queue 2830-1 to receive a connection request. The subsequent path-finder processing circuit 2840-1 may then process the connection request. Thus, all processing circuits 2840 can operate concurrently.

The process may continue to attempt to allocate resources to satisfy the connection request at succeeding scheduler modules. If the connection request is not fully satisfied after processing in a given scheduler module, an internal scheduling request specifying an amount of resources yet to be allocated is passed from the given scheduler module to a succeeding scheduler module, if any. Upon completion of an allocation process in any scheduler module, a "dequeue enable" signal is sent to a respective request queue 2830 as described earlier.

The left-to-right (as seen in FIG. 28) processing of TDM-switching mode connection requests proceeds as discussed in conjunction with FIGS. 25 and 26. However, the addition of the reverse queues 2835 allows for simultaneous processing of channel-switching mode connection requests. The main purpose of the additional reverse queues is to enable the coexistence of channel connections and TDM connections in the optical switching node. The mechanism of FIG. 28 allows connection packing which increases the opportunity of accommodating channel-connection requests. It is preferable that the reverse queue 2835 associated with each processing circuit (path finder module) 2840 be given priority over the request queue 2830 associated with the same processing circuit.

Figure 29:
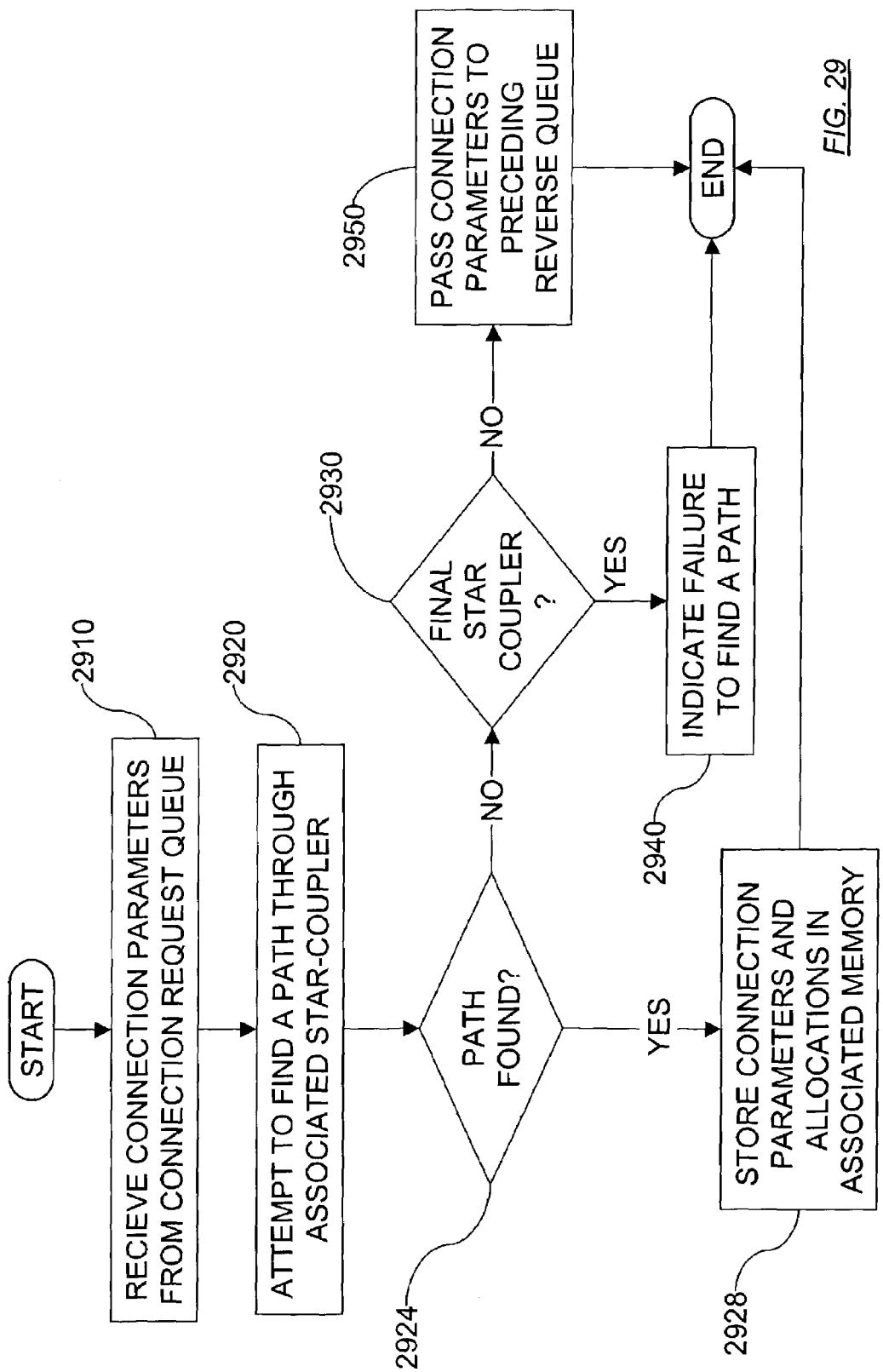
FIG. 29 is a flow chart illustrating the main steps of a method of path finding executed at one of the path-finder processing circuits of FIG. 28.

The right-to-left (as seen in FIG. 28) processing of channel-switching mode connection requests begins when channel-switching mode connection requests are received at the last reverse queue 2835-N-1 from the channel queue 1204 of FIG. 12. The last path-finder processing circuit 2840-N-1 sends a "dequeue enable" signal to the last reverse queue 2835-N-1 to prompt the last reverse queue 2835-N-1 to transmit a connection request. Processing at the last path-finder processing circuit 2840-N-1 then proceeds as outlined in FIG. 29. The last path-finder processing circuit 2840-N-1 receives the connection parameters of the channel-switching mode connection request (step 2910).

At each processing circuit 2840, descriptors of allocable resources, whether continuous channels or time slots, are stored in a respective associated memory 2850.

The last path-finder processing circuit 2840-N-1 then attempts to find a path through the associated star coupler (N-1) (step 2920). If it is determined (step 2924) that the last path-finder processing circuit 2840-(N-1) has succeeded in finding a path to satisfy the connection request, the path description is stored in the associated memory 2850-(N-1) (step 2928). If it is determined (step 2924) that the last path-finder processing circuit 2840-(N-1) has failed to find a path to satisfy the connection request and it is determined that the star coupler under consideration is not the final star coupler to be considered (step 2930), the connection request parameters are placed in the preceding reverse queue 2830-(N-2) (step 2950) to be processed by the preceding path-finder processing circuit 2840-(N-2) (not shown) associated with the subsequent star coupler (N-2).

Once the path description is stored or the connection request parameters are placed in the preceding reverse queue 2835, the processing is complete and the last path-finder processing circuit 2840-N-1 may send another "dequeue enable" signal to the last reverse queue 2835-N-1 to permit it to transmit another connection request.

The process may continue to attempt to allocate resources to satisfy the connection request at preceding scheduler modules, if any. If the connection request is not fully satisfied after processing in a given scheduler module, an internal scheduling request specifying an amount of resources yet to be allocated is passed from the given scheduler module to a preceding scheduler module, if any. Upon completion of an allocation process in any scheduler module, a "dequeue enable" signal is sent to a respective request queue 2835 as described earlier.

Where the first (leftmost) path-finder processing circuit 2840-0 fails to find a path to satisfy a given channel-switching connection request, it is determined that the star coupler under consideration is the final star coupler to be considered (step 2930), there is no preceding reverse queue in which to place the connection request parameters. Instead, the first path-finder processing circuit 2840-0 indicates, to the control signal processor 1202 of FIG. 12, a failure to find a path (step 2940) to satisfy the connection request. Responsive to receiving such an indication, the control signal processor 1202 sends a rejection to the edge node that generated the channel-switching connection request. The rejection indicates that a path could not be found to satisfy the channel-switching connection request. When there is a mixture of channel-connection requests and time-slot-connection requests, it is unlikely that channel-connection requests reach the first (leftmost) processing circuit 2840-0. The bimodal pipelined scheduling system of FIG. 28 may, however, be required to process only channel-connection requests, in which case channel-connection requests would reach processing circuit 2840-0.

It is important to note that a given space switch, comprising a star coupler 640/1040 (FIG. 6/FIG. 10) and an AWG demultiplexer 760 (FIG. 7) for example, can simultaneously receive continuous channel connections at some input ports and time-division-multiplexed connections at other input ports.

The selector 2880 cyclically visits the memories 2850 and dequeues path descriptions, if any, into the result buffer 2890. Individual path descriptions in the result buffer 2890 are transferred to the edge nodes that generated the associated connection requests. Additionally, the path descriptions in the result buffer 2890 are transferred to the spectral-translation module which controls the wavelength converters.

Internal scheduling requests traverse scheduler modules from left to right for a connection request of the first type (time-slot) and from right to left for connection requests of the second type (continuous channels). An internal scheduling request is modified according to the allocable resources determined by the individual scheduler modules.

Figure 34:
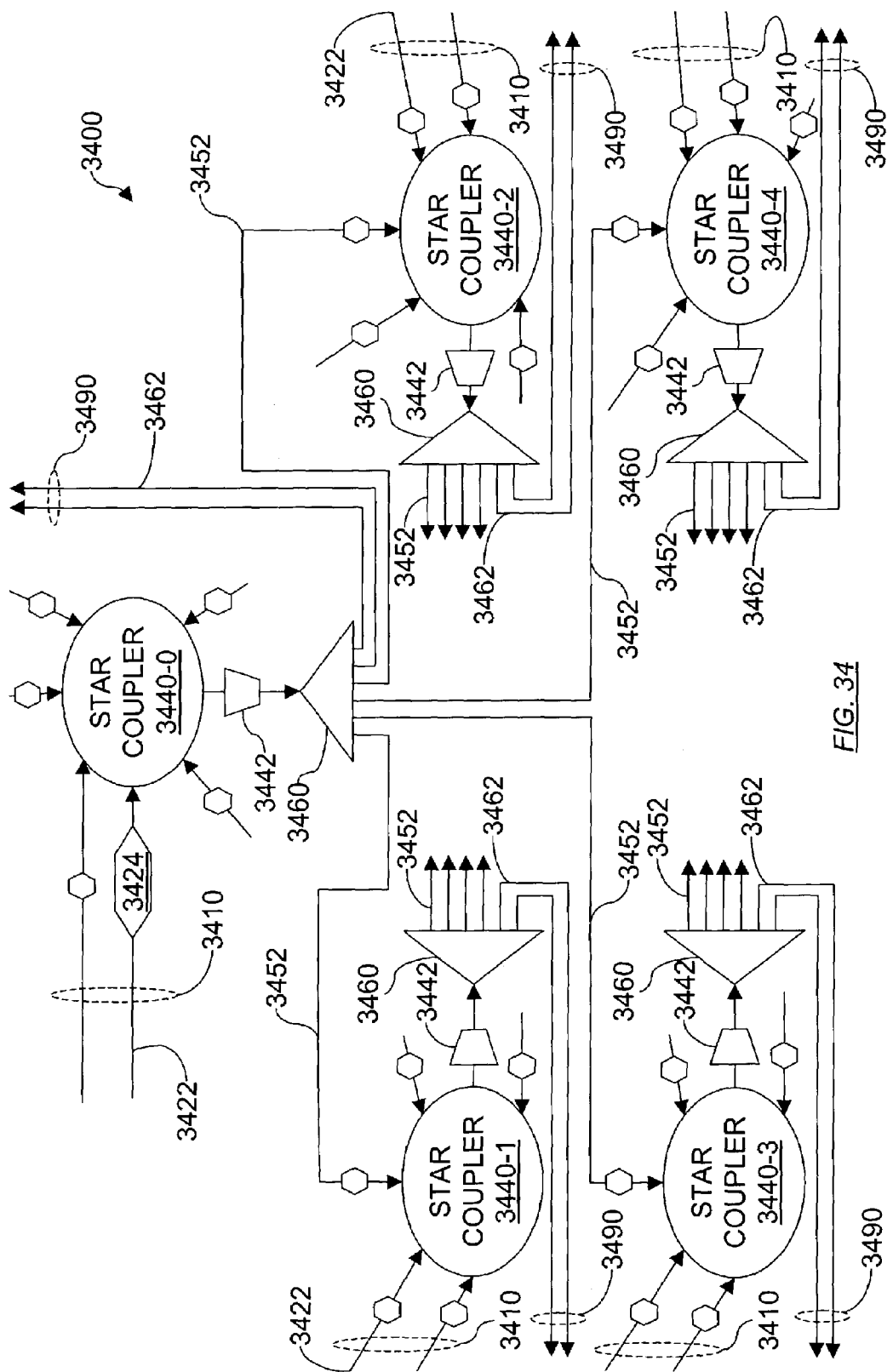
FIG. 34 illustrates a mesh structure of switch modules according to an embodiment of the present invention.

The optical switching node 600 of FIG. 6A allows any channel in any input link 210 to connect to a specific channel in each output link 690 during any time slot. However, it has connectivity limitations as described earlier with reference to FIG. 6B. These limitations dictate that each input fiber link 610 originate from a switching edge node and each output fiber link 690 terminate in a switching edge node. In order to relax this requirement, a multi-stage arrangement may be used. As a basic rule, the number of stages in a modular switch is preferably selected to be an odd number. The arrangement of FIG. 30, to be described below, uses three switching stages for each connection. An arrangement that permits single-stage, double-stage, and three-stage switching is further described with reference to FIG. 34. The arrangement of FIG. 34 is superior to the arrangement of FIG. 30 and, of course, the arrangement of FIG. 34 conforms to the above rule. The arrangement of FIG. 34 still conforms to the above basic rule because a three-stage path may be available when a two-stage path can not be found.

Figure 30:
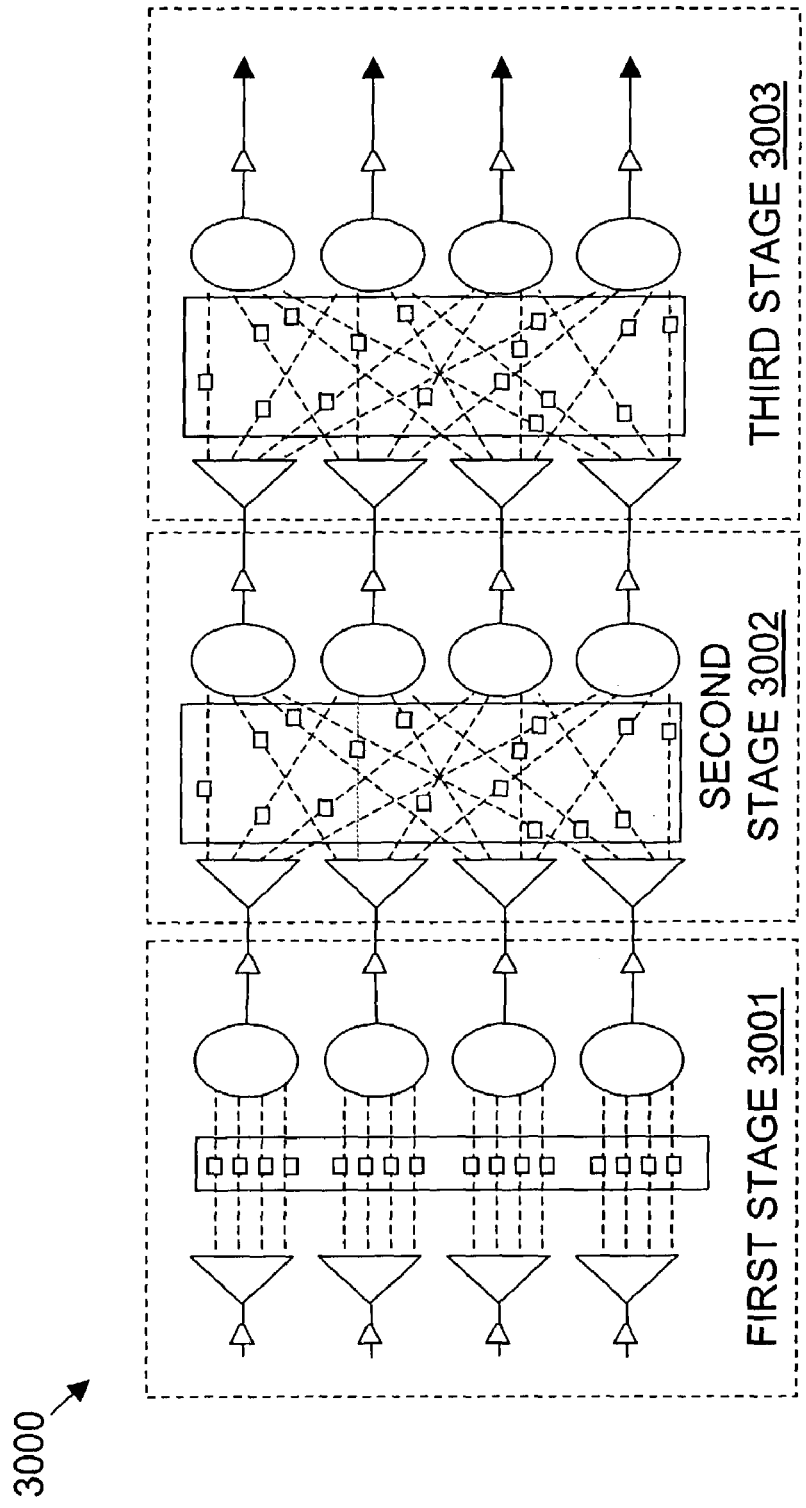
FIG. 30 illustrates a three-stage structure of a switching node using star couplers according to an embodiment of the present invention.

FIG. 30 illustrates the use of a three-stage structure to construct an optical switching node 3000 of a higher dimension (larger number of ports) than the optical switching node 600 of FIG. 6A. The structure requires three arrays of star couplers and each array must be preceded by wavelength converters as illustrated. The three stages of the three stage optical switching node 3000 are labeled as a first stage 3001, a second stage 3002 and a third stage 3003.

Figure 31:
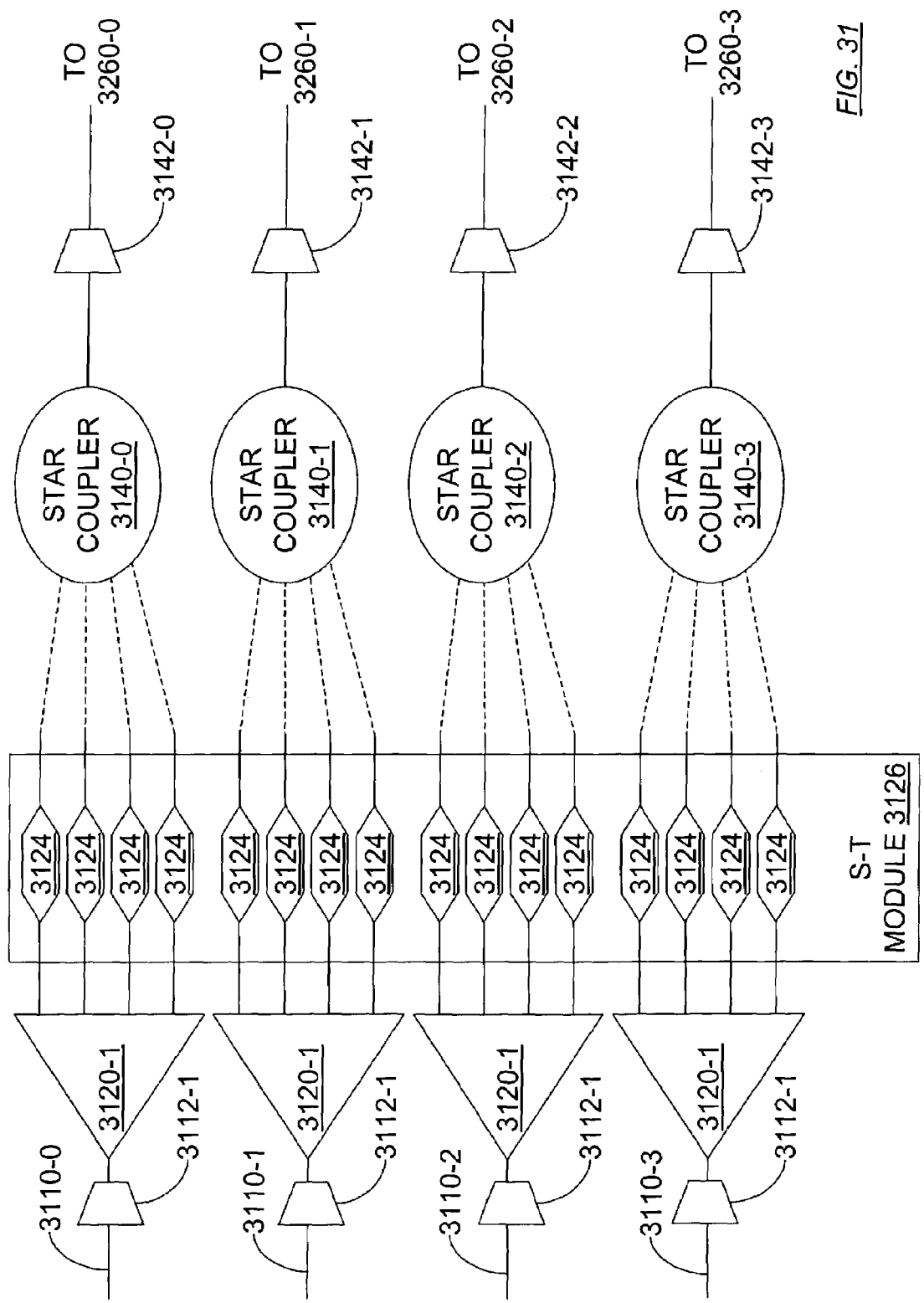
FIG. 31 illustrates a first stage of the three-stage switching node of FIG. 30.

The first stage 3001 is illustrated in FIG. 31 where it may be seen that four input WDM links 3110-0, 3110-1, 3110-2, 3110-3 (referred to individually or collectively as 3110) each carries a WDM optical signal comprising four wavelength channels, where each wavelength channel carries a modulated wavelength. Associated with the four input links 3110 are four input amplifiers 3112-0, 3112-1, 3112-2, 3112-3 (referred to individually or collectively as 3112) and four stage-one Arrayed Waveguide Grating (AWG) demultiplexers 3120-0, 3120-1, 3120-2, 3120-3 (referred to individually or collectively as 3120).

The optical signal in each input link 3110 is first amplified by the associated input amplifier 3112 then demultiplexed into individual wavelength channels by the associated stage-one AWG demultiplexer 3120. A stage-one wavelength converter 3124 is associated with each input wavelength channel. A given stage-one wavelength converter 3124 receives a modulated wavelength occupying a given wavelength band and may shift it to another wavelength band chosen according to a control signal from a stage-one spectral-translation module 3126. Each signal at the output of the associated stage-one AWG demultiplexer 3120 associated with each input link 3110 is, after possible wavelength conversion, directed to one of four stage-one star couplers 3140-0, 3140-1, 3140-2, 3140-3 (referred to individually or collectively as 3140) through an input internal fiber link.

Figure 32:
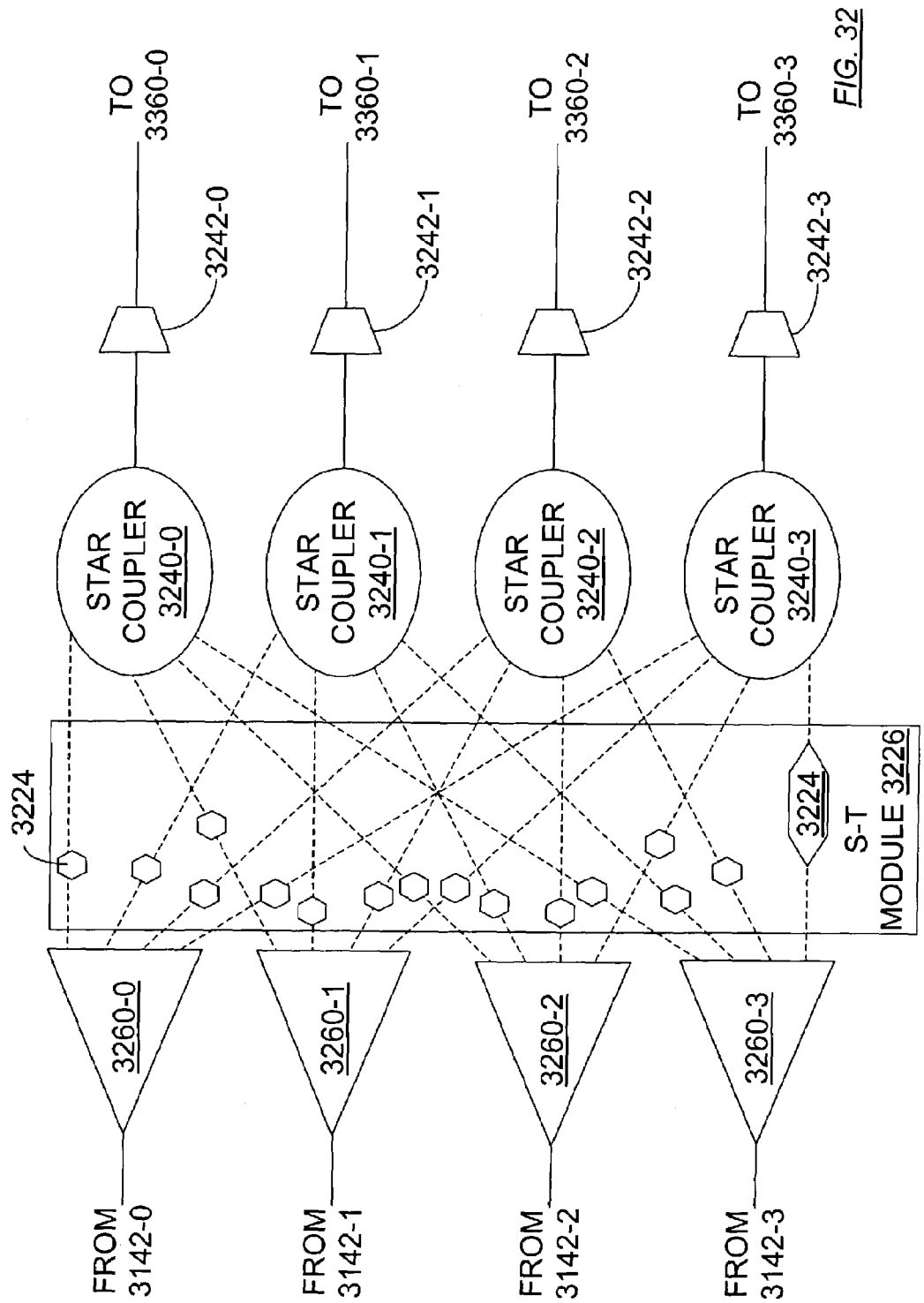
FIG. 32 illustrates a second stage of the three-stage switching node of FIG. 30.

Handling the output signals from the four stage-one star couplers 3140 are four stage-one amplifiers 3142-0, 3142-1, 3142-2, 3142-3 (referred to individually or collectively as 3142). The four stage-one amplifiers 3142 pass respective signals to the second stage 3002, which is illustrated in FIG. 32.

The respective signals from the four stage-one amplifiers 3142 are received at the second stage 3002 by four stage-two AWG demultiplexers 3260-0, 3260-1, 3260-2, 3260-3 (referred to individually or collectively as 3260). The respective signals are demultiplexed into constituent stage-two wavelength channels by the four stage-two AWG demultiplexers 3260. A stage-two wavelength converter 3224 is associated with each stage-two wavelength channel. A given stage-two wavelength converter 3224 receives a modulated wavelength occupying a given wavelength band and may shift it to another wavelength band chosen according to a control signal from a stage-two spectral-translation module 3226. Each of the stage-two wavelength channels at the output of each of the stage-two AWG demultiplexers 3260 is, after possible wavelength conversion, directed to one of four stage-two star couplers 3240-0, 3240-1, 3240-2, 3240-3 (referred to individually or collectively as 3240) through an input internal fiber link.

Figure 33:
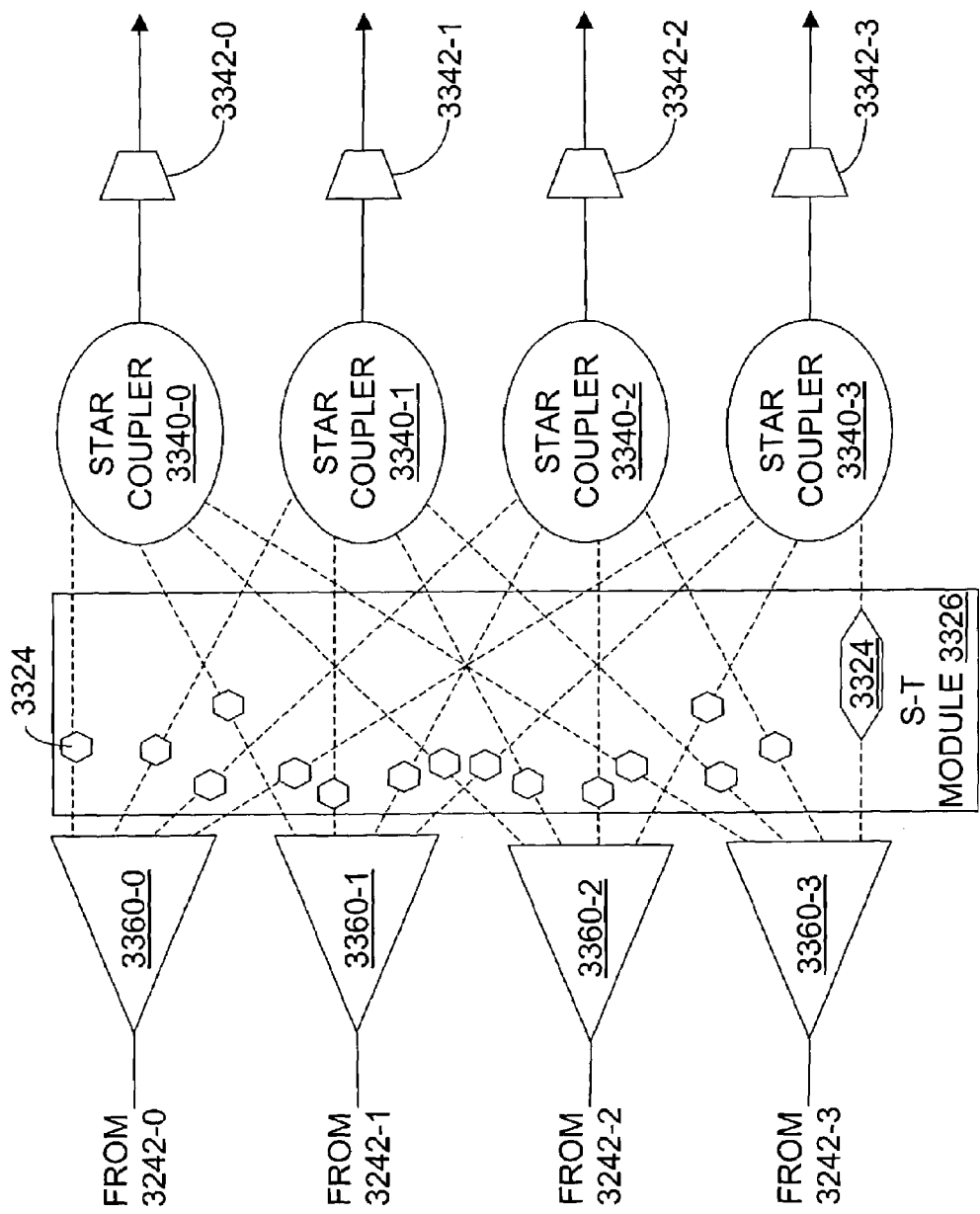
FIG. 33 illustrates a third stage of the three-stage switching node of FIG. 30.

Handling the output signals from the four stage-two star couplers 3240 are four stage-two amplifiers 3242-0, 3242-1, 3242-2, 3242-3 (referred to individually or collectively as 3242). The four stage-two amplifiers 3242 pass respective signals to the third stage 3003, which is illustrated in FIG. 33.

The respective signals from the four stage-two amplifiers 3242 are received at the third stage 3003 by four stage-three AWG demultiplexers 3360-0, 3360-1, 3360-2, 3360-3 (referred to individually or collectively as 3360). The respective signals are demultiplexed into constituent stage-three wavelength channels by the four stage-three AWG demultiplexers 3360. A stage-three wavelength converter 3324 is associated with each stage-three wavelength channel. A given stage-three wavelength converter 3324 receives a modulated wavelength occupying a given wavelength band and may shift it to another wavelength band chosen according to a control signal from a stage-three spectral-translation module 3326. Each of the stage-three wavelength channels at the output of each of the stage-three AWG demultiplexers 3360 is, after possible wavelength conversion, directed to one of four stage-three star couplers 3340-0, 3340-1, 3340-2, 3340-3 (referred to individually or collectively as 3340) through an input internal fiber link.

Handling the output signals from the four stage-three star couplers 3340 are four stage-three amplifiers 3342-0, 3342-1, 3342-2, 3342-3 (referred to individually or collectively as 3342). The four stage-three amplifiers 3342 pass respective signals as output of the three stage optical switching node 3000.

In the single stage optical switching node 600 of FIG. 6A, N input links, each having N wavelength channels, connect to N output links, each having N wavelength channels, through N star couplers, 2×N AWG demultiplexers, and N AWG multiplexers. The single stage optical switching node 600 supports $N^2$ wavelength channels. In the three stage optical switching node 3000 of FIG. 30, N input links, each having N wavelength channels, connect to N output links, each having N wavelength channels, through 3×N star couplers (compared to N star couplers in the single stage optical switching node 600 or 800), 3×N AWG demultiplexers (instead of 2×N in the single stage optical switching node 600 or 800) and no AWG multiplexers.

The outer capacity of the single stage optical. switching node 600 is the same as the outer capacity of the three stage optical switching node 3000. However, in the three stage optical switching node 3000, any channel in any input link can connect to any channel in any output link during any time slot while, in the single stage optical switching node 600, any channel in any input link can connect to a specific channel in each output link during any time slot. In addition, the single stage optical switching node 600, which comprises parallel single-stage switching nodes 100 of FIG. 1, has connectivity limitations that require its input and output WDM fiber links to connect to switching edge nodes as described earlier with reference to FIG. 6B. Thus, to permit full and arbitrary connectivity, an input link 610 in the single stage optical switching node 600 must originate from a single edge node and each output link 690 must terminate in a single edge node that provides full connectivity from any of its input ports to any of its output ports. In the three stage optical switching node 3000, the individual channels of an input link or an output link can be associated with different edge nodes. Thus, while the single stage optical switching node 600 is much simpler than the three stage optical switching node 3000, the use of the single stage optical switching node 600 restricts the connectivity of the single stage optical switching node 600 to edge nodes having switching capability as described earlier with reference to FIG. 6B. It is noted, however, that when an optical switch connects to high-capacity edge nodes, the simpler structure of the single stage optical switching node 600 is preferred.

In order to realize higher capacities, an optical node may comprise a plurality of three stage optical switching nodes 3000. Each WDM link, arriving from a single edge node and having M>1 wavelength channels, may be demultiplexed into individual wavelength channels that may be connected to K different three stage optical switching nodes 3000, where M≧K>1. In such a structure, the total number of input wavelength channels can grow to K×$N^2$. Thus, with K=N=32, for example, the number of wavelength channels can grow to 32,768. With each channel modulated at 10 Gb/s, the total capacity of the node would exceed 320 Terabits/second. The use of parallel optical switches will be described with reference to FIG. 35.

FIG. 34 illustrates an exemplary mesh switching network 3400 of five switching-modules. Each of the five switching modules has the structure as illustrated by the optical switch 100B of FIG. 1B and may be seen to be defined by a central star coupler 3440-0, 3440-1, 3440-2, 3440-3, 3440-4 (referred to individually or collectively as 3440). Each star coupler 3440 has a plurality of input ports and a single output port. The input ports receive optical signals from inlet wavelength channels 3422 and internal wavelength channels 3452 after wavelength conversion in associated wavelength converters 3424 (see the wavelength converters 124 of FIG. 1B). The combined optical signals at the output port of each star coupler 3440 is amplified, at an intermediate amplifier 3442, and then demultiplexed by an associated AWG demultiplexer 3460 into internal wavelength channels 3452, which are sent to inbound ports of other star couplers 3440, and outlet wavelength channels 3462, which are multiplexed onto an output WDM link 3490. Each inlet wavelength channel 3422 is demultiplexed from an input WDM link 3410 and each internal wavelength channel 3452 is demultiplexed from the output of another star coupler 3440 by way of the associated AWG demultiplexer 3460. Note that each internal wavelength channel 3452 may appear to be an inbound wavelength channel from the perspective of a switching module receiving the internal wavelength channel 3452, while appearing as an outbound wavelength channel to the switching module transmitting the internal wavelength channel 3452.

In order to reduce, or eliminate, connection-request rejection, the number of internal links carrying the demultiplexed internal wavelength channels 3452 from each star coupler to the other star couplers is preferably selected to exceed the total number of wavelength channels in the input WDM links 3410. If the number of input ports per star coupler is 32, for example, then the number of wavelength channels received in the input WDM links and the number of internal wavelength channels can be selected to be 12 and 20, respectively, for 21 star couplers. This results in 252 (12×21) channels on input WDM links and 252 (21×12) channels on output WDM links. With wavelength channels modulated at 10 Gb/s each, the total capacity of such exemplary mesh structure would be 2.52 Terabits per second. Increasing N to 64 yields a capacity of approximately 10 Terabits per second.

A disadvantage of the three-stage structure of FIG. 30 is that each connection must traverse the three stages. A structure for a mesh switching network 3400, as illustrated in FIG. 34, allows some connections to traverse a single switching module, other connections to traverse two switching modules, with the remaining connections traversing three switching modules. This saving of switching resources is realized at the expense of scalability. For a given value of N, the outer capacity of a three stage optical switching node 3000 is $N^2$ channels, while the outer capacity of the mesh switching network 3400 is slightly less than $N^2/4$. In the above example, node 3000 uses 96 star couplers and their associated components and has an access capacity of approximately 10 Terabits per second while node 3400 uses 21 star couplers and their associated components and has an access capacity of approximately 2.5 Terabits per second. Thus, while the mesh switching network 3400 is more efficient than the three stage optical switching node 3000, i.e., using fewer resources per connection, the three stage optical switching node 3000 scales to higher capacity, given a constrained value of N. To realize the same capacity of the three stage optical switching node 3000, the number of ports in the mesh switching network 3400 would be approximately double the number of ports in the three-stage optical switching node 3000, i.e., the dimension of the space-switch is doubled. However, the mesh switching network 3400 would still be more economical.

Figure 35:
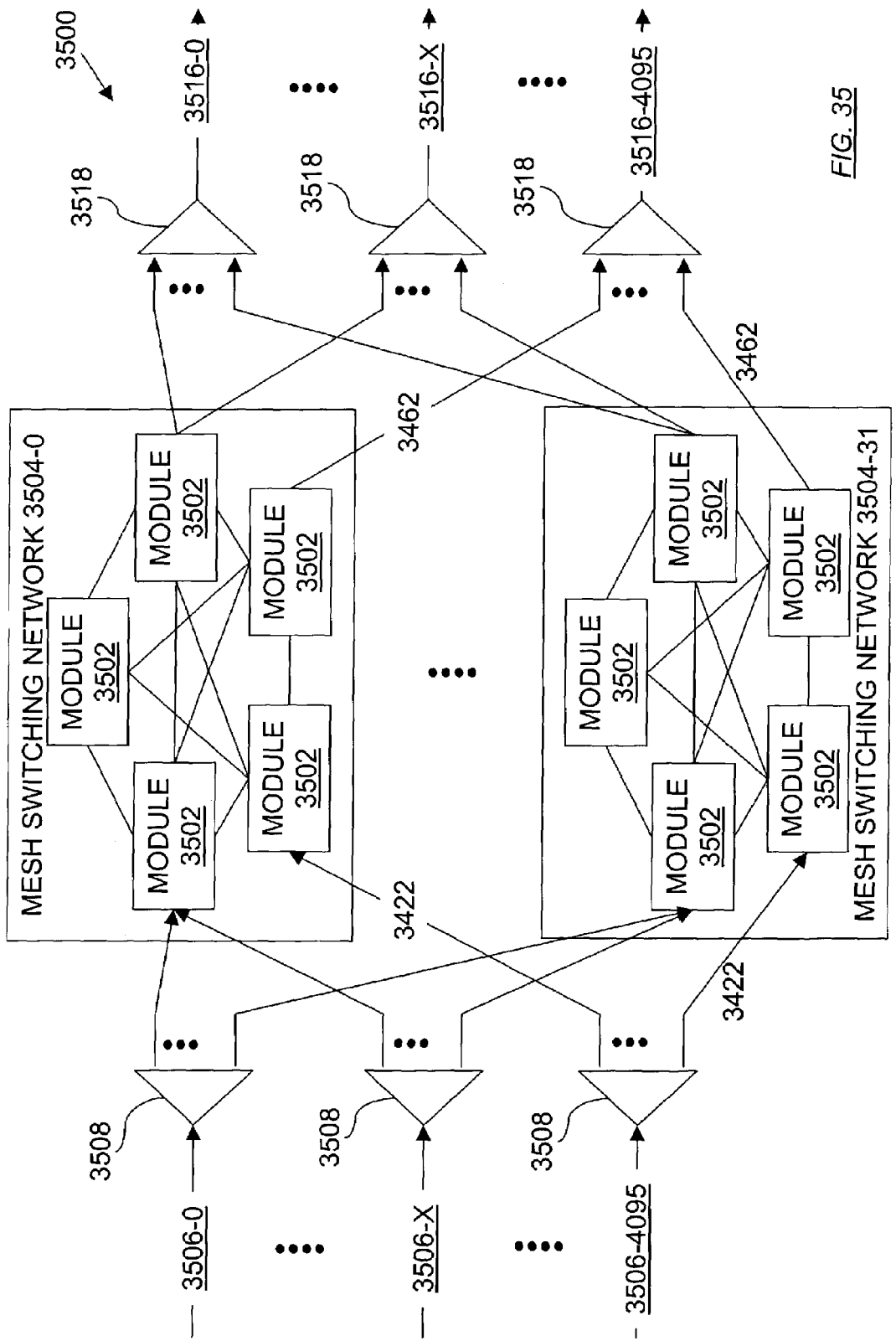
FIG. 35 illustrates a parallel arrangement of mesh structures, each mesh structure configured in the manner of the mesh structure of FIG. 34, according to an embodiment of the present invention.

FIG. 35 illustrates a parallel network switching node 3500 made up of 32 parallel mesh switching networks 3504-0, . . . , 3504-31 (referred to individually or collectively as 3504). Each mesh switching network 3504 includes a number of switching modules 3502 arranged in a mesh structure as illustrated in the mesh switching network 3400 illustrated in FIG. 34. Input WDM links 3506-0, . . . , 3506-X, . . . , 3506-4095 are demultiplexed at corresponding demultiplexers 3508-0, . . . , 3508-X, . . . , 3508-4095 into inlet wavelength channels 3422. The outlet wavelength channels 3462 at the output of each mesh switching network 3504 are multiplexed by AWG multiplexers 3518-0, . . . , 3518-X, . . . , 3518-4095 into output WDM links 3516-0, . . . , 3516-X, . . . , 3516-4095. Each switch module 3502 receives optical signals from input WDM links and transmits optical signals to output WDM links 3516. For clarity, FIG. 35 illustrates only input WDM links 3506 on the left-hand side and only output WDM links 3516 on the right-hand side. It is understood however that all modules 3502 are similarly, but not necessarily identically, configured to connect to the input and output WDM links 3506 and 3516.

The parallel mesh switching networks 3504 are used to realize a capacity of K×$N^2/4$, which is much higher than the capacity of a single mesh switching network, where K is the number of parallel mesh switching networks 3504, which, in this example, is equal to the number of wavelength channels per input WDM link. Thus, with K=N=32, the outer capacity is about 8,000 channels, and with a 10 Gb/s channel, the outer capacity is about 80 Terabits per second. The outer capacity is the access capacity of the switching node.

It is noted that, in such a parallel structure, each input WDM link must originate from a single edge node and each output link must terminate in a single edge node.

In the example of FIG. 35, each input WDM link carries 32 wavelength channels. The optical signal received from each input WDM link is demultiplexed into 32 wavelength channels that connect to 32 input ports, one input port in each of the 32 mesh switching networks 3504. The mesh switching networks 3504 are controlled independently. Notably, connection from an input WDM link to an output WDM link can be routed through more than one mesh switching network 3504.

Other modifications will be apparent to those skilled in the art and, therefore, the invention is defined in the claims.

What is claimed is:

1. A method of bimodal pipelined scheduling in a scheduling system, said scheduling system including N scheduler modules, indexed as 1 to N, N>1, arranged in a predatermined order between a first scheduler module of index 1 and a last scheduler module of index N, where each scheduler module is exclusively associated with a pool of resources comprising resources of a first granularity and resources of a second granularity, said method comprising:

receiving a first scheduling request specifying a first amount of resources of said first granularity;

at a selected scheduler module, starting with said first scheduler module of index 1, attempting to allocate resources to satisfy said first scheduling request;

where said attempting at said selected scheduler module fails to completely satisfy said first scheduling request, selecting a subsequent scheduler module according to said predetermined order;

receiving a second scheduling request specifying a second amount of resources of said second granularity;

at an other selected scheduler module, starting with said last scheduler module of index N, attempting to allocate resources to satisfy said second scheduling request; and where said attempting, at said other scheduler module, fails to completely satisfy said second scheduling request, selecting a preceding scheduler module sequentially following a reverse order towards said first scheduler module.

2. The method of claim 1 wherein said first scheduling request is satisfied by at least one of said scheduler modules and said second scheduling request is satisfied by at least one of said scheduler modules.

3. The method of claim 2 further comprising, at a given scheduler module having received said first scheduling request and said second scheduling request, performing said attempting to allocate resources to satisfy said second scheduling request before performing said attempting to allocate resources to satisfy said first scheduling request.

4. The method of claim 3 wherein, at said given scheduler module, said attempting to allocate resources comprises selecting resources from a pool of allocable resources exclusively associated with said given scheduler module.

5. The method of claim 4 wherein said allocable resources are defined in fine resource units and coarse resource units.

6. The method of claim 5 wherein said first amount of resources is specified in said fine resource units and said second amount of resources is specified in said coarse resource units.

7. The method of claim 6 further comprising:

receiving a third scheduling request including a first request portion specifying an amount of coarse resource units and a second request portion specifying an amount of fine resource units;

at said last scheduler module, attempting to allocate resources to satisfy said first request portion;

where said attempting fails to completely satisfy said first request portion, selecting a preceding scheduler module according to said predetermined order;

at said preceding scheduler module, attempting to allocate resources to satisfy said first request portion;

continuing said attempting to allocate resources to satisfy said first request portion at further preceding scheduler modules, selected according to said predetermined order, until said first request portion is satisfied or said first scheduler module fails to completely satisfy said first request portion;

at said first scheduler module, attempting to allocate resources to satisfy said second request portion;

where said attempting fails to completely satisfy said second request portion, selecting a subsequent scheduler module according to said predetermined order;

at said subsequent scheduler module, attempting to allocate resources to satisfy said second request portion; and continuing said attempting to allocate resources to satisfy said second request portion at further succeeding scheduler modules, selected according to said predetermined order, until said second request portion is satisfied or said last scheduler module fails to completely satisfy said first request portion.

8. A pipelined scheduling system comprising:

a number N of scheduler modules, N>1, indexed as 1 to N, arranged in a predetermined order between a first scheduler module of index 1 and a last scheduler module of index N; and a plurality of distinct pools of resources each pool of resources comprising resources of a first granularity and resources of a second granularity, wherein each of said scheduler modules is exclusively associated with a respective pool of resources;

said system operable to:

receive scheduling requests of a first type, each specifying a first amount of resources of said first granularity;

attempt, at said scheduler modules selected in said predetermined order starting from a scheduler module of index 1, to allocate resources to satisfy said scheduling requests of said first type;

receive scheduling requests of a second type, each specifying a second amount of resources of said second granularity; and attempt, at said scheduler; modules selected sequentially in a reverse order of said predetermined order, starting from a scheduler module of index N, to allocate resources to satisfy said scheduling requests of said second type.

9. The system of claim 8 further comprising:
a forward input buffer associated with each of said scheduler modules for receiving said scheduling requests of said first type; and
a backward input buffer associated with each of said scheduler modules for receiving said scheduling requests of said second type.

10. The system of claim 9 further comprising a result buffer associated with each of said scheduler modules.

11. The system of claim 10 wherein each said scheduler module is operable to, upon successfully allocating given resources to satisfy a given one of said scheduling requests of said first type, pass identifiers of said given resources to said associated result buffer.

12. The system of claim 11 wherein said first scheduler module is operable to:
subtract an amount representative of said given resources from said first amount of resources, specified in said given one of said scheduling requests of said first type, to produce a first remaining amount; and
pass an indication of said first remaining amount to a subsequent scheduler module, said subsequent scheduler module selected according to said predetermined order.

13. The system of claim 11 further comprising a cyclic selector for cyclically accessing said result buffers associated with said scheduler modules to obtain said identifiers of said given resources.

14. The system of claim 10 wherein each said scheduler module is operable to, upon successfully allocating given resources to satisfy a given one of said scheduling requests of said second type, pass identifiers of said given resources to said associated result buffer.

15. The system of claim 14 wherein said last scheduler module is operable to:
subtract an amount representative of said given resources from said second amount of resources, specified in said given one of said scheduling requests of said second type, to produce a second remaining amount; and
pass an indication of said second remaining amount to a preceding scheduler module, said preceding scheduler module selected according to said predetermined order.

16. The system of claim 14 further comprising a cyclic selector for cyclically accessing said result buffers associated with said scheduler modules to obtain said identifiers of said given resources.

17. The system of claim 8 wherein each said scheduler module is further operable to terminate said attempt to allocate resources for a given one of said scheduling requests of said first type when an amount of allocated resources equals said first amount of resources specified by said given one of said scheduling requests.

18. The system of claim 8 wherein said associated pool of resources comprises paths through at least one space switch in a switching node having a plurality of space switches, each space switch of said plurality of space switches having a plurality of input ports and a plurality of output ports.

19. The system of claim 18 wherein said at least one space switch switches both continuous channels and time-slots in time-slotted-channnd paths from said input ports to said output ports.

20. The system of claim 19 wherein said first amount of resources is a number of said time slots.

21. The system of claim 19 wherein said second amount of resources is a number of said continuous channels.

22. The system of claim 19 wherein said at least one space switch comprises a star coupler having a plurality of input ports and an output port, said output port connecting, through an optical amplifier, to a wavelength demultiplexer having a plurality of output ports.

23. A method of bimodal pipelined scheduling in a scheduling system, said scheduling system including N scheduler modules, indexed as 1 to N, N>1, arranged in a predetermined order between a first scheduler module of index 1 and a last scheduler module of index N, where each scheduler module is exclusively associated with a pool of resources comprising resources of a first granularity and resources of a second granularity, said method comprising:
receiving a first scheduling request specifying a first amount of resources of said first granularity;
at said first scheduler module:
determining a first part of a first subset of allocable resources for satisfying said first scheduling request; and
passing a first internal scheduling request, specifying an amount of resources equivalent to said first amount of resources reduced by the amount of resources in said first subset of allocable resources, to a subsequent scheduler module selected according to said predetermined order;
receiving a second scheduling request specifying a second amount of resources of said second granularity;
at said last scheduler module:
determining a first part of a second subset of allocable resources for satisfying said second scheduling request; and
passing a second internal scheduling request, specifying an amount of resources equivalent to said second amount of resources reduced by the amount of resources in said second subset of allocable resources, to a preceding scheduler module of index (N−1) sequentially following a reverse order towards said first scheduler module.

24. The method of bimodal pipelined scheduling of claim 23 wherein said resources of said first granularity are time slots in a time-slotted frame and said resources of said second granularity are wavelenath channels and wherein said first amount of resources comprises an integer number of time slots in a time-shared wavelength channel and said second amount of resources comprises an integer number of wavelength channels.

25. A pipehned scheduling system comprising N scheduler modules, indexed as 1 to N, N>1, arranged in a predetermined order between a first scheduler module of index 1 and a last scheduler module of index N, each scheduler module being exclusrvely associated with a pool of resources comprising resources of a first granularity and resources of a second granularity,
said first scheduler module operable to:
receive a first scheduling request specifying a first amount of resources of said first granularity;
determine a first part of a first subset of allocable resources for satisfying said first scheduling request; and
pass a first internal scheduling request, specifying an amount of resources equivalent to said first amount of resources reduced by the amount of resources in said first subset of allocable resources, to a subsequent scheduler module selected according to said predetermined order;
said last scheduler module operable to:
receive a second scheduling request specifying a second amount of resources of said second granularity;

determine a first part of a second subset of allocable resources for satisfying said second scheduling request; and pass a second internal scheduling request, specifying an amount of resources equivalent to said second amount of resources reduced by the amount of resources in said second subset of allocable resources, to a preceding scheduler module of index (N−1) sequentially following a reverse order towards said first scheduler module.

* * * * *